US012506282B2

(12) United States Patent
Taki

(10) Patent No.: US 12,506,282 B2
(45) Date of Patent: Dec. 23, 2025

(54) ANTENNA DEVICE

(71) Applicant: Murata Manufacturing Co., Ltd., Kyoto (JP)

(72) Inventor: Shota Taki, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 214 days.

(21) Appl. No.: 18/500,455

(22) Filed: Nov. 2, 2023

(65) Prior Publication Data

US 2024/0178578 A1 May 30, 2024

(30) Foreign Application Priority Data

Nov. 24, 2022 (JP) ................................ 2022-187718
Apr. 18, 2023 (JP) ................................ 2023-067854

(51) Int. Cl.
*H01Q 21/28* (2006.01)
*H01Q 9/04* (2006.01)
*H01Q 9/06* (2006.01)

(52) U.S. Cl.
CPC ........... *H01Q 21/28* (2013.01); *H01Q 9/0414* (2013.01); *H01Q 9/065* (2013.01)

(58) Field of Classification Search
CPC ...... H01Q 21/28; H01Q 9/0414; H01Q 9/065; H01Q 1/243; H01Q 5/321; H01Q 9/42
See application file for complete search history.

(56) References Cited

U.S. PATENT DOCUMENTS 3,470,560 A * 9/1969 Fray ....................... H01Q 19/30 343/912
6,016,434 A * 1/2000 Mizuno ................... H01P 7/086 505/700
6,281,843 B1 * 8/2001 Evtioushkine ........... H01Q 1/38 343/815
2005/0093130 A1 * 5/2005 Horie ..................... H01Q 13/10 257/693
2005/0195119 A1 * 9/2005 Gaucher .................. H01Q 9/42 343/702
(Continued)

FOREIGN PATENT DOCUMENTS

CN 105431978 A * 3/2016 ........... H01Q 9/0421
JP 2007-535836 A 12/2007
(Continued)

*Primary Examiner* — Dameon E Levi
*Assistant Examiner* — Jordan E. DeWitt
(74) *Attorney, Agent, or Firm* — McDonald Hopkins LLC

(57) ABSTRACT

An antenna board of an antenna device includes a connection portion, and first and second conductor elements. The connection portion includes an inner side portion electrode and an outer side portion electrode connected to a coaxial cable. The first conductor element includes first conductor portion connected to the inner side portion electrode at first end, and second conductor portion disposed such that first mounting region is present between second and third ends. The second conductor is disposed such that second and third mounting regions are respectively present between fifth end and the inner side portion electrode and between the fifth end and the outer side portion electrode. An electrical length between the first and second ends of the first conductor portion is equal to an electrical length between the fifth and sixth ends of the second conductor element.

5 Claims, 24 Drawing Sheets

(56) References Cited

U.S. PATENT DOCUMENTS

2006/0006973 A1* 1/2006 Iwase .................. H01F 17/0013 336/200
2006/0033666 A1* 2/2006 Su .................. H01Q 9/0414 343/702
2006/0054710 A1* 3/2006 Forster .................. H01Q 1/52 343/745
2006/0238425 A1* 10/2006 Oodachi .................. H01Q 9/285 343/702
2007/0046542 A1* 3/2007 Andrenko .................. H01Q 1/32 343/700 MS
2007/0285202 A1* 12/2007 Ito .................. H01F 17/0013 336/200
2009/0096698 A1* 4/2009 Semonov .................. H01Q 25/005 343/872
2009/0121951 A1* 5/2009 Kaneda .................. H01Q 9/285 334/45
2009/0195471 A1* 8/2009 Semonov .................. H01Q 1/246 343/810
2009/0284431 A1* 11/2009 Meharry .................. H01Q 9/065 343/822
2011/0193761 A1* 8/2011 Shinkai .................. H01Q 25/005 343/836
2011/0267086 A1* 11/2011 Pagani .................. G01R 31/2884 324/754.21
2012/0068801 A1* 3/2012 Duwel .................. H01Q 3/44 336/20
2012/0146870 A1* 6/2012 Brown .................. H01Q 19/005 343/797
2013/0002503 A1* 1/2013 Tan .................. H01Q 9/26 343/893
2013/0009836 A1* 1/2013 Islam .................. H01Q 21/30 343/810
2013/0271265 A1* 10/2013 Finn .................. H01Q 1/2225 235/492
2016/0111195 A1* 4/2016 Nishyama .................. H01F 17/04 336/200
2016/0190681 A1* 6/2016 Huang .................. H01Q 9/42 343/848
2016/0321535 A1* 11/2016 Ban .................. H01Q 7/00
2017/0103852 A1* 4/2017 Ando .................. H01G 4/242
2017/0256854 A1* 9/2017 Hu .................. H01Q 9/40
2018/0006369 A1* 1/2018 Higaki .................. H01Q 3/247
2018/0137399 A1* 5/2018 Kato .................. G06K 19/07771
2018/0137982 A1* 5/2018 Sawada .................. H01G 4/012
2020/0321929 A1* 10/2020 Daimon .................. H03F 3/245
2020/0335881 A1* 10/2020 Le .................. H01Q 9/28
2020/0380327 A1* 12/2020 Ueki .................. G06K 19/07771
2020/0382152 A1* 12/2020 Tsukamoto .................. H03H 7/461
2021/0304942 A1* 9/2021 Kawashima .................. H01F 27/2804
2022/0200118 A1* 6/2022 Nagai .................. H01P 5/028
2023/0253141 A1* 8/2023 Okumura .................. H01F 27/292 336/200
2023/0291109 A1* 9/2023 Dai .................. H01Q 5/378
2024/0136712 A1* 4/2024 Chuang .................. H01Q 3/24
2024/0178578 A1* 5/2024 Taki .................. H01Q 1/243
2025/0007169 A1* 1/2025 Panther .................. H01Q 9/0428
2025/0047003 A1* 2/2025 Chen .................. H01Q 9/285
2025/0070473 A1* 2/2025 Lin .................. H01Q 13/10
2025/0141109 A1* 5/2025 Takayama .................. H01Q 1/50
2025/0149795 A1* 5/2025 Chen .................. H01Q 5/378

FOREIGN PATENT DOCUMENTS

JP 2024076323 A * 6/2024
WO WO-2021085055 A1 * 5/2021 .................. H01Q 5/20

* cited by examiner

ANTENNA DEVICE

CROSS REFERENCE TO RELATED APPLICATION

This application claims priority from Japanese Patent Application No. 2023-067854 filed on Apr. 18, 2023 and Japanese Patent Application No. 2022-187718 filed on Nov. 24, 2022. The content of this application is incorporated herein by reference in its entirety.

BACKGROUND

The present disclosure relates to an antenna device.

Japanese Unexamined Patent Application Publication (Translation of PCT Application) No. 2007-535836 discloses a multiband antenna (antenna device). An embodiment of the multiband antenna disclosed in Japanese Unexamined Patent Application Publication (Translation of PCT Application) No. 2007-535836 includes a monopole multiband antenna, a dipole multiband antenna, and an inverted-F antenna, which have one or more coupling radiating elements and/or branch radiating elements for providing a multiband operation in two or more frequency bands. For example, a multiband antenna includes a ground element, a monopole radiator connected to the ground element and having a feed terminal extending from the monopole radiator, a coupled radiator connected to the ground element, and a branch radiator connected to the monopole radiator.

BRIEF SUMMARY

The multiband antenna disclosed in Japanese Unexamined Patent Application Publication (Translation of PCT Application) No. 2007-535836 is fed by using, for example, a coaxial cable. A center conductor (inner side portion conductor) of the coaxial cable is electrically connected to a feed element by a solder connection, and an outer conductor (outer side portion conductor) is electrically connected to the ground element by a solder connection.

In the antenna device, the antenna characteristics may change due to the external environment. The external environment is the environment surrounding the antenna device, not the antenna device itself, and includes the installation environment and the connection environment of the antenna device. The installation environment of the antenna device can include, for example, the number, the sizes, the shapes, and the disposition of metal members around a location in which the antenna device is installed. The connection environment of the antenna device can include a length of the coaxial cable connected to the antenna device. For example, in a case in which the coaxial cable is long, there is probability that the antenna characteristics deteriorate as compared to a case in which the coaxial cable is short. Conversely, in a case in which the coaxial cable is short, the antenna characteristics may differ greatly between frequency bands as compared to a case in which the coaxial cable is long.

The present disclosure provides an antenna device that enables the improvement of a change in characteristics caused by the external environment.

An aspect of the present disclosure relates to an antenna device including a substrate, a connection portion located on the substrate and having an inner side portion electrode and an outer side portion electrode that are respectively connected to an inner side portion conductor and an outer side portion conductor of a coaxial cable, a first conductor element located on the substrate, and a second conductor element located on the substrate. The first conductor element includes a first conductor portion having a first end and a second end and connected to the inner side portion electrode at the first end, and a second conductor portion having a third end and a fourth end and disposed such that a first mounting region is present between the second end and the third end. The second conductor element has a fifth end and a sixth end and is disposed such that a second mounting region is present between the fifth end and the inner side portion electrode and a third mounting region is present between the fifth end and the outer side portion electrode. An electrical length between the first end and the second end of the first conductor portion is equal to an electrical length between the fifth end and the sixth end of the second conductor element.

An aspect of the present disclosure relates to an antenna device including a substrate, a connection portion located on the substrate and having an inner side portion electrode and an outer side portion electrode that are respectively connected to an inner side portion conductor and an outer side portion conductor of a coaxial cable, a first conductor element located on the substrate, and a second conductor element disposed on the substrate to face the first conductor element. The first conductor element includes a first conductor portion having a first end facing the second conductor element and a second end on an opposite side to the second conductor element with respect to the first end, and connected to the inner side portion electrode at the first end, and a second conductor portion having a third end facing the second end, a fourth end facing the third end, and a fifth end and a sixth end that are respective ends in a direction along the second end, and disposed such that a first mounting region and a second mounting region on a side of the sixth end with respect to the first mounting region are present between the second end and the second conductor portion. The second conductor element includes a third conductor portion having a seventh end facing the first conductor element and an eighth end on an opposite side to the first conductor element with respect to the seventh end, and disposed such that a third mounting region is present between the seventh end and the outer side portion electrode, and a fourth conductor portion having a ninth end facing the eighth end, a tenth end facing the ninth end, and an eleventh end and a twelfth end that are respective ends in a direction along the eighth end, and disposed such that a fourth mounting region and a fifth mounting region on a side of the eighth end with respect to the fourth mounting region are present between the eighth end and the fourth conductor portion. An electrical length of a first path connecting the inner side portion electrode, the first mounting region, and the sixth end is equal to an electrical length of a second path connecting the third mounting region, the fourth mounting region, and the twelfth end. An electrical length of a third path connecting the inner side portion electrode, the first mounting region, and the fourth end is equal to an electrical length of a fourth path connecting the third mounting region, the fifth mounting region, and the tenth end.

The aspects of the present disclosure enable the improvement of the change in the characteristics caused by the external environment.

DETAILED DESCRIPTION

1. Embodiment

Figure 1:
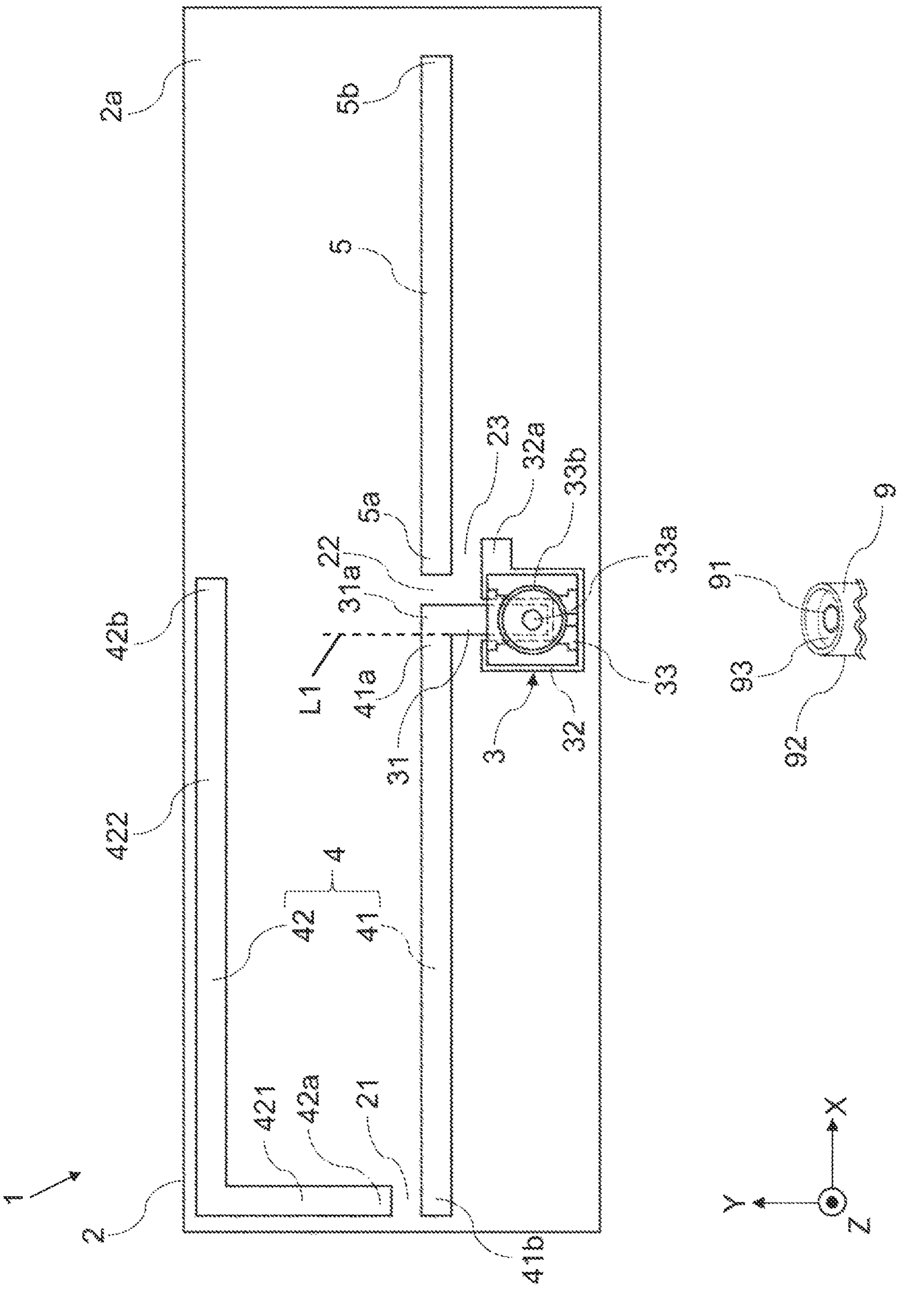
FIG. 1 is a plan view of a configuration example of an antenna board according to Embodiment 1.

Embodiments of the present disclosure will be described below with reference to the drawings as appropriate. However, the following embodiments are examples for describing the present disclosure, and are not intended to limit the present disclosure to the following contents (for example, the shape, the size, the disposition, and the like of each component). Positional relationships in the up-down direction, the left-right direction, and the like are based on the positional relationships illustrated in the drawings unless otherwise specified. Each drawing described in the following embodiments is a schematic drawing, and the ratio of the size and thickness of each component in each drawing does not always reflect the actual dimensional ratio. In addition, the dimensional ratio of each element is not limited to the ratio illustrated in the drawings.

In the following description, in a case in which it is suitable to distinguish a plurality of components from each other, prefixes, such as "first" and "second," are added to the component names, but in a case in which the components are distinguishable from each other by using reference numerals added to the components, prefixes, such as "first" and "second," may be omitted for ease of reading.

1.1 Embodiment 1

1.1.1 Configuration

Figure 2:
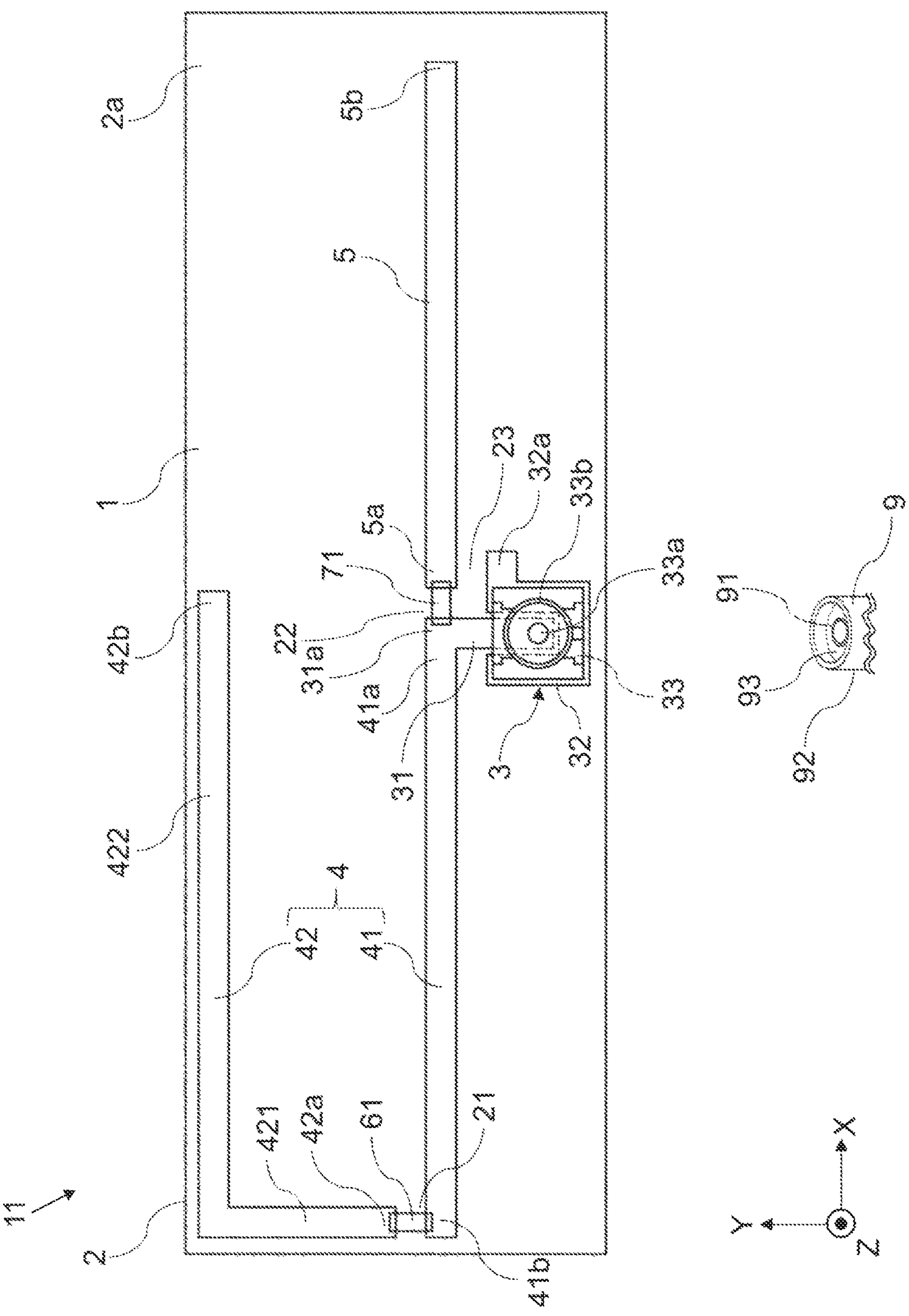
FIG. 2 is a plan view of Configuration Example 1 of an antenna device including the antenna board of FIG. 1.
Figure 3:
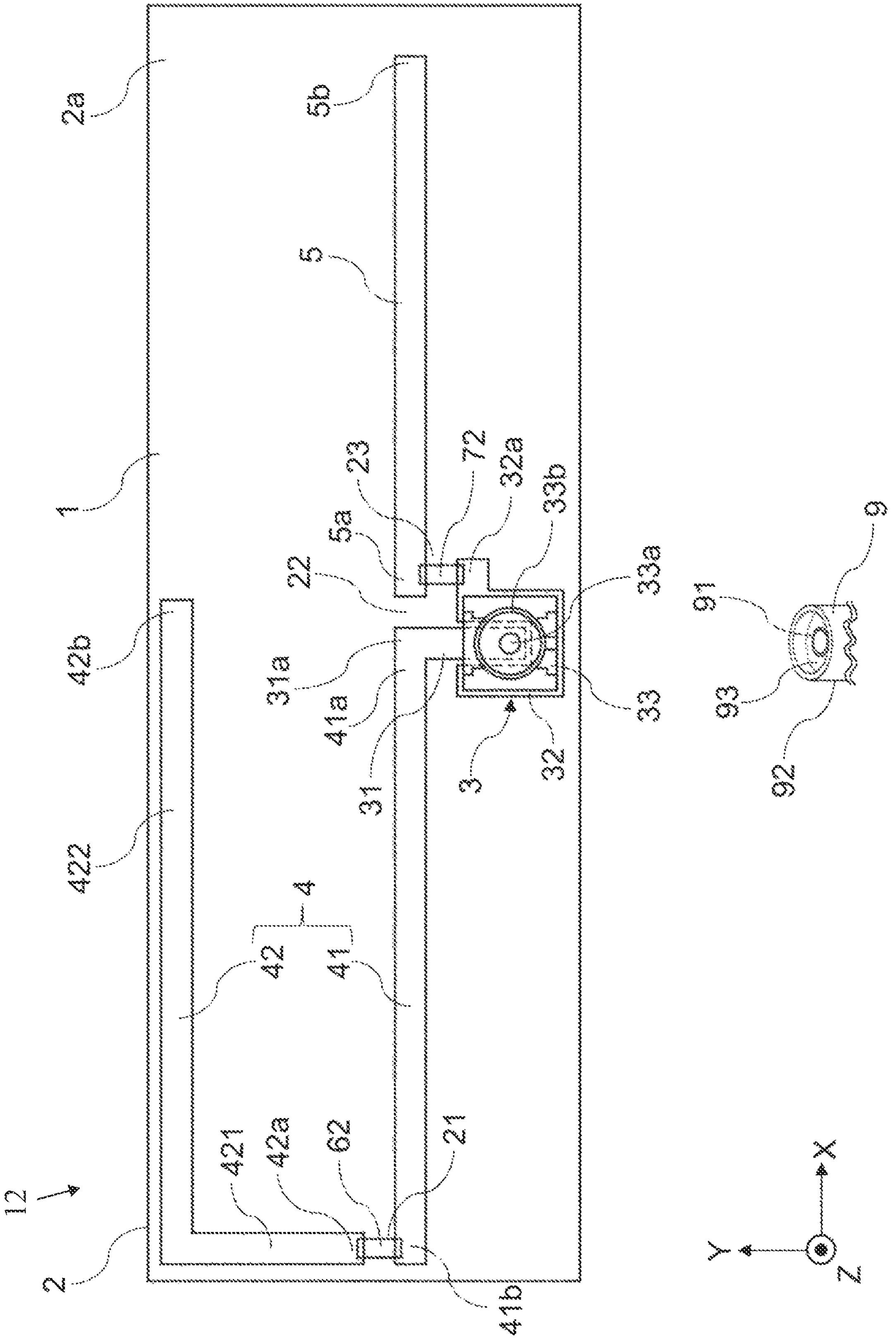
FIG. 3 is a plan view of Configuration Example 2 of the antenna device including the antenna board of FIG. 1.

FIG. 1 is a plan view of a configuration example of an antenna board 1 according to Embodiment 1. The antenna board 1 of FIG. 1 is used for an antenna device (multiband antenna) that enables wireless communication in a plurality of frequency bands. The antenna device is installed in various devices, such as communication devices, home appliances, and computing devices. FIG. 2 is a plan view of Configuration Example 1 (hereinafter, referred to as antenna device 11) of an antenna device including the antenna board 1 of FIG. 1. FIG. 3 is a plan view of Configuration Example 2 (hereinafter, referred to as antenna device 12) of the antenna device including the antenna board 1 of FIG. 1.

The antenna board 1 of FIG. 1 will be described first. The antenna board 1 of FIG. 1 includes a substrate 2, a connection portion 3, a first conductor element 4, and a second conductor element 5.

The substrate 2 of FIG. 1 has a thickness direction Z, a first direction X orthogonal to the thickness direction Z, and a second direction Y orthogonal to each of the thickness direction Z and the first direction X. In the present embodiment, the substrate 2 has a rectangular plate shape. For example, the first direction X is a width direction of the substrate 2, and the second direction Y is a length direction of the substrate 2.

The substrate 2 is, for example, a dielectric substrate. Examples of dielectric substrates include a low temperature co-fired ceramic (LTCC) multilayer substrate, a multilayer resin substrate formed by laminating a plurality of resin layers including resins, such as epoxy and polyimide, a multilayer resin substrate formed by laminating a plurality of resin layers including a liquid crystal polymer (LCP) having a lower dielectric constant, a multilayer resin substrate formed by laminating a plurality of resin layers including fluororesin, and a ceramic multilayer substrate other than the LTCC.

As illustrated in FIG. 1, the connection portion 3, the first conductor element 4, and the second conductor element 5 are located on the substrate 2. In FIG. 1, the connection portion 3, the first conductor element 4, and the second conductor element 5 are located on a main surface 2*a* of the substrate 2. That is, in the present embodiment, the first conductor element 4 and the second conductor element 5 are located on the same surface (main surface) 2*a* of substrate 2. In more detail, the connection portion 3, the first conductor element 4, and the second conductor element 5 are located on the same surface (main surface) 2*a* of substrate 2.

The connection portion 3 of FIG. 1 is used for connection with a coaxial cable 9.

The coaxial cable 9 is used for connecting the antenna board 1 and an external circuit. The coaxial cable 9 includes an inner side portion conductor 91 and an outer side portion conductor 92 surrounding the inner side portion conductor 91. The coaxial cable 9 further includes an insulator 93 disposed between the inner side portion conductor 91 and the outer side portion conductor 92. Since a well-known configuration in the related art can be adopted for the configuration of the coaxial cable 9, the detailed description thereof will be omitted.

The connection portion 3 of FIG. 1 includes an inner side portion electrode 31 and an outer side portion electrode 32. The inner side portion electrode 31 is connected to the inner side portion conductor 91 of the coaxial cable 9. The inner side portion electrode 31 can act as a feed point on the antenna board 1. The outer side portion electrode 32 is connected to the outer side portion conductor 92 of the coaxial cable 9. The outer side portion electrode 32 can act as a ground on the antenna board 1. The inner side portion electrode 31 and the outer side portion electrode 32 are formed by conductor patterns formed on the main surface 2*a* of the substrate 2.

The connection portion 3 of FIG. 1 further includes a coaxial connector 33. The coaxial connector 33 eliminates the need of soldering between the inner side portion conductor 91 and the outer side portion conductor 92 of the coaxial cable 9, and the inner side portion electrode 31 and the outer side portion electrode 32, and facilitates connection with the coaxial cable 9. The coaxial connector 33 includes an inner side portion contact 33*a* and an outer side portion contact 33*b* that are respectively coupled to the inner side portion conductor 91 and the outer side portion conductor 92 of the coaxial cable 9.

The coaxial connector 33 of FIG. 1 is a surface mount-type component. The coaxial connector 33 is mounted on the main surface 2*a* of the substrate 2. The inner side portion contact 33*a* and the outer side portion contact 33*b* are respectively connected to the inner side portion electrode 31 and the outer side portion electrode 32. In FIG. 1, the inner side portion electrode 31 has a first extension portion 31*a* that extends from the coaxial connector 33 in the second direction Y and does not overlap the coaxial connector 33 in plan view. In FIG. 1, the outer side portion electrode 32 has a second extension portion 32*a* that extends from the coaxial connector 33 in the first direction X and does not overlap the coaxial connector 33 in plan view.

The first conductor element 4 of FIG. 1 is configured to function as an antenna element. The first conductor element 4 includes a first conductor portion 41 and a second conductor portion 42. The first conductor portion 41 and the second conductor portion 42 are formed by conductor patterns formed on the main surface 2*a* of the substrate 2.

The first conductor portion 41 has a first end 41*a* and a second end 41*b*. In the present embodiment, the first conductor portion 41 has a linear shape. The first conductor portion 41 of FIG. 1 extends along a direction opposite to the first direction X (left direction of FIG. 1) with respect to the first extension portion 31*a* of the inner side portion electrode 31. The first end 41*a* is an end of the first conductor portion 41 on a side of the first extension portion 31*a* of the inner side portion electrode 31, and the second end 41*b* is an end of the first conductor portion 41 on an opposite side to the first extension portion 31*a* of the inner side portion electrode 31. The first conductor portion 41 is connected to the inner side portion electrode 31. In more detail, the first conductor portion 41 is connected to the inner side portion electrode 31 at the first end 41*a*. In the present embodiment, the first end 41*a* is continuously and integrally connected to the first extension portion 31*a* of the inner side portion electrode 31. Accordingly, the first conductor portion 41 and the inner side portion electrode 31 are different portions of the same conductor pattern. In the present embodiment, a virtual line L1 of FIG. 1 indicates a design boundary between the first conductor portion 41 and the first extension portion 31*a*. In FIG. 1, the first conductor portion 41 is a portion that does not overlap the first extension portion 31*a* in a view seen in the second direction Y, and extends from the first extension portion 31*a* in the direction opposite to the first direction X. The virtual line L1 of FIG. 1 is a line extending along the second direction Y from a side of the inner side portion electrode 31 on an opposite side to the first direction X. In a conductor pattern in which the first conductor portion 41 and the inner side portion electrode 31 are continuously integrated, a portion extending from the virtual line L1 in the direction opposite to the first direction X is the first conductor portion 41, and the first end 41*a* is a portion in contact with the virtual line L1.

The second conductor portion 42 has a third end 42*a* and a fourth end 42*b*. In the present embodiment, the second conductor portion 42 does not have a linear shape. The second conductor portion 42 has a bent shape. The second conductor portion 42 of FIG. 1 has an L-shape. In more detail, the second conductor portion 42 includes a first portion 421 and a second portion 422. The first portion 421 extends along the second direction Y with respect to the second end 41*b* of the first conductor portion 41. Here, as described above, the first conductor portion 41 extends along the direction opposite to the first direction X with respect to the first extension portion 31*a* of the inner side portion electrode 31. Accordingly, the second conductor portion 42 extends in a direction intersecting the first conductor portion 41 from the second end 41*b* of the first conductor portion 41. The second portion 422 extends along the first direction X with respect to a distal end of the first portion 421.

The second conductor portion 42 is disposed such that a first mounting region 21 is present between the first conductor portion 41 and the second conductor portion 42. In more detail, the second conductor portion 42 is disposed such that the first mounting region 21 is present between the second end 41*b* and the third end 42*a*. The first mounting region 21 is a region reserved to enable the disposition of a circuit component. The circuit component can be used for connecting the second end 41*b* to the third end 42*a*. The circuit component can include, for example, at least one of a circuit element, such as a chip component, and a conductor pattern. The second conductor portion 42 and the first conductor portion 41 are not electrically connected in a state in which no circuit component is disposed in the first mounting region 21. The size of the first mounting region 21 is set as appropriate depending on the size of the circuit component scheduled to be disposed in the first mounting region 21.

The second conductor element 5 of FIG. 1 is configured to function as an antenna element. The second conductor element 5 is formed by a conductor pattern formed on the main surface 2*a* of the substrate 2. The second conductor element 5 has a fifth end 5*a* and a sixth end 5*b*. In the present embodiment, the second conductor element 5 has a linear shape. The second conductor element 5 of FIG. 1 extends along the first direction X with respect to the first extension portion 31*a* of the inner side portion electrode 31. The fifth end 5*a* is an end of the second conductor element 5 on a side of the first extension portion 31*a* and the second extension portion 32*a*, and the sixth end 5*b* is an end of the second conductor element 5 on an opposite side to the first extension portion 31*a* and the second extension portion 32*a*. As described above, the first conductor portion 41 extends along the direction opposite to the first direction X with respect to the first extension portion 31*a* of the inner side portion electrode 31. Therefore, the first conductor portion 41 and the second conductor element 5 extend in directions opposite to each other with respect to the connection portion 3. This configuration enables the improvement of the antenna efficiency.

The second conductor element 5 is disposed such that a second mounting region 22 is present between the inner side portion electrode 31 and the second conductor element 5 and a third mounting region 23 is present between the outer side portion electrode 32 and the second conductor element 5. In more detail, the second conductor element 5 is disposed such that the second mounting region 22 and the third mounting region 23 are respectively present between a portion of the second conductor element 5 on a side of the connection portion 3, and the inner side portion electrode 31 and the outer side portion electrode 32. In the present embodiment, the second conductor element 5 is disposed such that the second mounting region 22 is present between the fifth end 5*a* and the inner side portion electrode 31 and the third mounting region 23 is present between the fifth end 5*a* and the outer side portion electrode 32. The second mounting region 22 and the third mounting region 23 are regions reserved to enable the disposition of the circuit component. In the second mounting region 22 and the third mounting region 23, the circuit component can be used for connecting the fifth end 5*a* to one of the inner side portion electrode 31 and the outer side portion electrode 32. The circuit component can include, for example, at least one of a circuit element, such as a chip component, and a conductor pattern. In a state in which no circuit component is disposed in the second mounting region 22, the second conductor element 5 and the inner side portion electrode 31 are not electrically connected. In a state in which no circuit component is disposed in the third mounting region 23, the second conductor element 5 and the outer side portion electrode 32 are not electrically connected. The size of the second mounting region 22 is set as appropriate depending on the size of the circuit component scheduled to be disposed in the second mounting region 22. The size of the third mounting region 23 is set as appropriate depending on the size of the circuit component scheduled to be disposed in the third mounting region 23. In the present embodiment, the second mounting region 22 is a region between the fifth end 5*a* of the second conductor element 5 and the first extension portion 31*a* of the inner side portion electrode 31 on the substrate 2. In the present embodiment, the third mounting region 23 is a region between the fifth end 5*a* of the second conductor element 5 and the second extension portion 32*a* of the outer side portion electrode 32 on the substrate 2.

In the present embodiment, the antenna board 1 is configured to perform wireless communication in two frequency bands. The two frequency bands are a first frequency band and a second frequency band lower than the first frequency band, for example. Examples of the first frequency band include a frequency band around 5 GHz (for example, 5.15 GHz to 5.80 GHz). Examples of the second frequency band include a frequency band around 2.4 GHz (for example, 2.40 GHz to 2.50 GHz). The coaxial cable 9 is used for transmitting a signal in the first frequency band and a signal in the second frequency band lower than the first frequency band.

The first conductor element 4 corresponds to the first frequency band and the second frequency band. In the present embodiment, a length of the first conductor portion 41 corresponds to a quarter of a wavelength corresponding to the first frequency band. The total of the length of the first conductor portion 41 and a length of the second conductor portion 42 corresponds to a quarter of a wavelength corresponding to the second frequency band. The length of the first conductor portion 41 corresponds to an electrical length between the first end 41*a* and the second end 41*b* of the first conductor portion 41. The length of the second conductor portion 42 corresponds to an electrical length between the third end 42*a* and the fourth end 42*b* of the second conductor portion 42.

The second conductor element 5 corresponds to the first frequency band. In the present embodiment, a length of the second conductor element 5 corresponds to a quarter of the wavelength corresponding to the first frequency band. The length of the second conductor element 5 corresponds to an electrical length between the fifth end 5*a* and the sixth end 5*b* of the second conductor element 5. That is, the electrical length between the first end 41*a* and the second end 41*b* of the first conductor portion 41 is equal to the electrical length between the fifth end 5*a* and the sixth end 5*b* of the second conductor element 5. However, strictly speaking, it is not required that the electrical length between the first end 41*a* and the second end 41*b* of the first conductor portion 41 is equal to the electrical length between the fifth end 5*a* and the sixth end 5*b* of the second conductor element 5. For example, a difference between the electrical length between the first end 41*a* and the second end 41*b* of the first conductor portion 41 and the electrical length between the fifth end 5*a* and the sixth end 5*b* of the second conductor element 5 need only be 10% or less of a longer electrical length out of the electrical length between the first end 41*a* and the second end 41*b* of the first conductor portion 41 and the electrical length between the fifth end 5*a* and the sixth end 5*b* of the second conductor element 5. In other words, the electrical length of the first conductor portion 41 need only be equal to the electrical length of the second conductor element 5 to the extent that the first conductor portion 41 and the second conductor element 5 can function as a dipole antenna in a desired frequency band.

The antenna board 1 described above can be used for manufacturing the antenna device 11 illustrated in FIG. 2 and manufacturing the antenna device 12 illustrated in FIG. 3. The antenna device 11 of FIG. 2 and the antenna device 12 of FIG. 3 can be manufactured by using the same antenna board 1.

Then, the antenna device 11 of FIG. 2 will be described. The antenna device 11 of FIG. 2 includes the antenna board 1 (substrate 2, connection portion 3, first conductor element 4, and second conductor element 5), a short circuit element 61, and a circuit element 71.

The short circuit element 61 is located in the first mounting region 21, and connects the second end 41*b* and the third end 42*a*. The short circuit element 61 is, for example, a resistance element (resistor) of 0Ω. The short circuit element 61 is not limited to the resistance element of 0Ω, and may be solder, a conductor pattern, a conductive adhesive, or the like as long as the short circuit between the second end 41*b* and the third end 42*a* can be performed.

The circuit element 71 is located in the second mounting region 22, and connects the fifth end 5*a* and the inner side portion electrode 31. The circuit element 71 includes, for example, one or more inductors or one or more capacitors. The circuit element 71 can be used for adjusting a resonant frequency of the second conductor element 5. The configuration of the circuit element 71 can be determined in consideration of a length of the coaxial cable 9 and an initial resonant frequency of the second conductor element 5. As an example, in a case in which an initial resonant frequency in the first frequency band is relatively high, the circuit element 71 includes the inductor. The circuit element 71 includes the capacitor in a case in which the initial resonant frequency in the first frequency band is relatively low.

In the antenna device 11, no circuit component is disposed in the third mounting region 23. That is, the fifth end 5*a* is not connected to the outer side portion electrode 32. Therefore, the fifth end 5*a* of the second conductor element 5 is connected to the inner side portion electrode 31, but not connected to the outer side portion electrode 32.

In the antenna device 11 of FIG. 2, the short circuit between the first conductor portion 41 and the second conductor portion 42 is performed in the first conductor element 4. As a result, the electrical length of the first conductor element 4 no longer corresponds to the first frequency band, and only corresponds to the second frequency band. Accordingly, the first conductor element 4 functions as a monopole antenna for the second frequency band. The second conductor element 5 is connected to the inner side portion electrode 31 instead of the outer side portion electrode 32. Accordingly, the second conductor element 5 functions as a monopole antenna for the first frequency band. As described above, the antenna device 11 of FIG. 2 functions as the monopole antenna for both the first frequency band and the second frequency band.

The antenna device 11 of FIG. 2 enables wireless communication using the monopole antenna formed by the first conductor element 4, and wireless communication using the monopole antenna formed by the second conductor element 5 to enable the improvement of the change in the antenna characteristics caused by the frequency in a case in which the coaxial cable 9 is relatively short.

Then, the antenna device 12 of FIG. 3 will be described. The antenna device 12 of FIG. 3 includes the antenna board 1 (substrate 2, connection portion 3, first conductor element 4, and second conductor element 5), an inductor 62, and a circuit element 72.

The inductor 62 is located in the first mounting region 21, and connects the second end 41*b* and the third end 42*a*. The inductance of the inductor 62 is set to cut off a signal in a frequency band corresponding to four times the length of the first conductor portion 41 and pass a signal in a frequency band corresponding to four times the total length of the first conductor portion 41 and the second conductor portion 42. In the present embodiment, the inductor 62 forms a low pass filter that cuts off a signal in the first frequency band and passes a signal in the second frequency band. A circuit element forming the low pass filter together with the inductor 62 may be disposed in the first mounting region 21.

The circuit element 72 is located in the third mounting region 23, and connects the fifth end 5*a* and the outer side portion electrode 32. The circuit element 72 is, for example, a short circuit element. The short circuit element may be, for example, a resistance element (resistor) of 0Ω. The short circuit element is not limited to the resistance element of 0Ω, and may be solder, a conductor pattern, a conductive adhesive, or the like as long as the short circuit can be performed.

In the antenna device 12, no circuit component is disposed in the second mounting region 22. That is, the fifth end 5*a* is not connected to the inner side portion electrode 31. Therefore, the fifth end 5*a* of the second conductor element 5 is connected to the outer side portion electrode 32, but not connected to the inner side portion electrode 31.

In the antenna device 12 of FIG. 3, the inductor 62 is disposed between the first conductor portion 41 and the second conductor portion 42 in the first conductor element 4. The inductor 62 cuts off the signal in the first frequency band. As a result, since the substantial electrical length of the first conductor element 4 is determined by the length of the first conductor portion 41, the substantial electrical length corresponds to the first frequency band. Further, the second conductor element 5 is connected to the outer side portion electrode 32 instead of the inner side portion electrode 31. Accordingly, for the first frequency band, the first conductor portion 41 is connected to a feed point, and the second conductor element 5 is connected to a ground. Therefore, the first conductor element 4 and the second conductor element 5 function as a dipole antenna for the first frequency band. On the other hand, the inductor 62 passes the signal in the second frequency band. As a result, since the substantial electrical length of the first conductor element 4 is determined by the total of the length of the first conductor portion 41 and the length of the second conductor portion 42, the substantial electrical length corresponds to the second frequency band. Accordingly, the first conductor element 4 functions as the monopole antenna for the second frequency band. As described above, the antenna device 12 of FIG. 3 functions as the dipole antenna for the first frequency band and functions as the monopole antenna for the second frequency band.

The antenna device 12 of FIG. 3 enables wireless communication using the monopole antenna formed by the first conductor element 4, and wireless communication using the dipole antenna formed by the first conductor element 4 and the second conductor element 5 to enable the improvement of the antenna characteristics even in a case in which the coaxial cable 9 is relatively long.

1.1.2 Evaluation

Then, the antenna characteristics of the antenna devices (antenna devices 11 and 12) of Embodiment 1 described above and an antenna device of a comparative example are evaluated. In the antenna device of the comparative example, the second conductor portion 42 is continuously and integrally connected to the first conductor portion 41, and the second conductor element 5 is continuously and integrally connected to the inner side portion electrode 31. As a result, an antenna device of Comparative Example 1 functions as a monopole antenna for both the first frequency band and the second frequency band.

In the evaluation of the antenna characteristics, the first frequency band is, for example, the frequency band around 5 GHz (for example, 5.15 GHz to 5.8 GHz), and the second frequency band is the frequency band around 2.4 GHz (for example, 2.4 GHz to 2.5 GHz).

Table 1 below illustrates the antenna efficiency [dB] in the first frequency band and the second frequency band of Embodiment 1 and the comparative example in a case in which the external environment is different, for example, in a case in which the coaxial cable 9 is relatively short and in a case in which the coaxial cable 9 is relatively long. A case in which the coaxial cable 9 is relatively short is, for example, a case in which the length of the coaxial cable 9 is less than the quarter of the wavelength corresponding to the second frequency band. A case in which the coaxial cable 9 is relatively long is, for example, a case in which the length of the coaxial cable 9 is the quarter or more of the wavelength corresponding to the second frequency band. The antenna efficiency of Embodiment 1 in a case in which the coaxial cable 9 is relatively short indicates the antenna efficiency of the antenna device 11, and the antenna efficiency of Embodiment 1 in a case in which the coaxial cable 9 is relatively long indicates the antenna efficiency of the antenna device 12.

TABLE 1

| | Coaxial cable 9 is relatively short | | Coaxial cable 9 is relatively long | |
|---|---|---|---|---|
| | First frequency band | Second frequency band | First frequency band | Second frequency band |
| Embodiment 1 | −0.7 | −5.0 | −1.2 | −2.0 |
| Comparative Example | −0.8 | −5.5 | −1.3 | −2.1 |

From Table 1, in the comparative example, the antenna efficiency in the second frequency band deteriorates by 3.4 dB when a case in which the coaxial cable 9 is relatively long is changed to a case in which the coaxial cable 9 is relatively short. In a case in which the coaxial cable 9 is relatively short, a difference in the antenna efficiency between the first frequency band and the second frequency band is 4.7 dB.

On the other hand, in Embodiment 1, when a case in which the coaxial cable 9 is relatively long is changed to a case in which the coaxial cable 9 is relatively short, the antenna efficiency in the second frequency band deteriorates by 3.0 dB, but an amount of deterioration is smaller than in the comparative example. In Embodiment 1, in a case in which the coaxial cable 9 is relatively short, the difference in the antenna efficiency between the first frequency band and the second frequency band is 4.3 dB, but the difference is smaller than in the comparative example.

From Table 1, in both a case in which the coaxial cable 9 is relatively long and a case in which the coaxial cable 9 is relatively short, the antenna efficiency in the first and second frequency bands of Embodiment 1 is larger than the antenna efficiency in the first and second frequency bands of the comparative example.

As described above, Embodiment 1 enables the improvement of the change in the antenna characteristics caused by the external environment, particularly the length of the coaxial cable 9. In addition, Embodiment 1 enables wireless communication using the monopole antenna formed by the first conductor element 4, and wireless communication using the monopole antenna formed by the second conductor element 5 to enable the improvement of the change in the antenna characteristics caused by the frequency in a case in which the coaxial cable 9 is relatively short. In addition, Embodiment 1 enables wireless communication using the monopole antenna formed by the first conductor element 4, and wireless communication using the dipole antenna formed by the first conductor element 4 and the second conductor element 5 to enable the improvement of the antenna characteristics even in a case in which the coaxial cable 9 is relatively long. A change in the external environment other than the length of the coaxial cable 9 can occur, and Embodiment 1 enables the selection of one of the antenna device 11 and the antenna device 12, which has more suitable antenna characteristics, depending on the external environment. Therefore, Embodiment 1 enables the improvement of the change in the antenna characteristics caused by the external environment.

1.1.3 Effects

The antenna devices (antenna devices 11 and 12) described above include the substrate 2, the connection portion 3 located on the substrate 2 and having the inner side portion electrode 31 and the outer side portion electrode 32 that are respectively connected to the inner side portion conductor 91 and the outer side portion conductor 92 of the coaxial cable 9, the first conductor element 4 located on the substrate 2, and the second conductor element 5 located on the substrate 2. The first conductor element 4 includes the first conductor portion 41 having the first end 41*a* and the second end 41*b* and connected to the inner side portion electrode 31 at the first end 41*a*, and the second conductor portion 42 having the third end 42*a* and the fourth end 42*b* and disposed such that the first mounting region 21 is present between the second end 41*b* and the third end 42*a*. The second conductor element 5 has the fifth end 5*a* and the sixth end 5*b* and is disposed such that the second mounting region 22 is present between the fifth end 5*a* and the inner side portion electrode 31 and the third mounting region 23 is present between the fifth end 5*a* and the outer side portion electrode 32. The electrical length between the first end 41*a* and the second end 41*b* of the first conductor portion 41 is equal to the electrical length between the fifth end 5*a* and the sixth end 5*b* of the second conductor element 5. This configuration enables the improvement of the change in the antenna characteristics caused by the external environment, particularly the length of the coaxial cable 9.

The antenna device 11 includes the short circuit element 61 and the circuit element 71. The short circuit element 61 is located in the first mounting region 21, and connects the second end 41*b* and the third end 42*a*. The circuit element 71 is located in the second mounting region 22, and connects the fifth end 5*a* and the inner side portion electrode 31. The fifth end 5*a* is not connected to the outer side portion electrode 32. This configuration enables wireless communication using the monopole antenna formed by the first conductor element 4, and wireless communication using the monopole antenna formed by the second conductor element 5 to enable the improvement of the change in the antenna characteristics caused by the frequency in a case in which the coaxial cable 9 is relatively short.

The antenna device 12 includes the inductor 62 and the circuit element 72. The inductor 62 is located in the first mounting region 21, and connects the second end 41*b* and the third end 42*a*. The circuit element 72 is located in the third mounting region 23, and connects the fifth end 5*a* and the outer side portion electrode 32. The fifth end 5*a* is not connected to the inner side portion electrode 31. This configuration enables wireless communication using the monopole antenna formed by the first conductor element 4, and wireless communication using the dipole antenna formed by the first conductor element 4 and the second conductor element 5 to enable the improvement of the antenna characteristics even in a case in which the coaxial cable 9 is relatively long.

In the antenna devices (antenna devices 11 and 12), the coaxial cable 9 is used for transmitting the signal in the first frequency band and the signal in the second frequency band lower than the first frequency band. The electrical length between the first end 41*a* and the second end 41*b* of the first conductor portion 41 corresponds to the quarter of the wavelength corresponding to the first frequency band. The total of the electrical length between the first end 41*a* and the second end 41*b* of the first conductor portion 41 and the electrical length between the third end 42*a* and the fourth end 42*b* of the second conductor portion 42 corresponds to the quarter of the wavelength corresponding to the second frequency band lower than the first frequency band. This configuration enables the improvement of the change in the antenna characteristics caused by the external environment, particularly the length of the coaxial cable 9.

In the antenna device 11, the circuit element 71 includes one or more inductors or one or more capacitors. This configuration enables the improvement of the antenna efficiency in wireless communication using the second conductor element 5.

In the antenna devices (antenna devices 11 and 12), the second conductor portion 42 has a bent shape. This configuration can reduce the length of the substrate 2 as compared to a case in which the second conductor portion 42 has a linear shape.

In the antenna devices (antenna devices 11 and 12), the second conductor portion 42 extends in the direction intersecting the first conductor portion 41 from the second end 41*b* of the first conductor portion 41. This configuration can reduce the length of the substrate 2 as compared to a case in which both the first conductor portion and the second conductor portion are aligned.

In the antenna devices (antenna devices 11 and 12), the first conductor portion 41 and the second conductor element 5 extend in directions opposite to each other with respect to the connection portion 3. This configuration enables the improvement of the antenna efficiency.

In the antenna devices (antenna devices 11 and 12), the first conductor element 4 and the second conductor element 5 are located on the same surface (main surface 2*a*) of the substrate 2. This configuration enables the improvement of the change in the antenna characteristics caused by the external environment, particularly the length of the coaxial cable 9.

The antenna board 1 described above includes the substrate 2, the connection portion 3 located on the substrate 2 and having the inner side portion electrode 31 and the outer side portion electrode 32 that are respectively connected to the inner side portion conductor 91 and the outer side portion conductor 92 of the coaxial cable 9, the first conductor element 4 located on the substrate 2, and the second conductor element 5 located on the substrate 2. The first conductor element 4 includes the first conductor portion 41 having the first end 41*a* and the second end 41*b* and connected to the inner side portion electrode 31 at the first end 41*a*, and the second conductor portion 42 having the third end 42*a* and the fourth end 42*b* and disposed such that the first mounting region 21 is present between the second end 41*b* and the third end 42*a*. The second conductor element 5 has the fifth end 5*a* and the sixth end 5*b* and is disposed such that the second mounting region 22 is present between the fifth end 5*a* and the inner side portion electrode 31 and the third mounting region 23 is present between the fifth end 5*a* and the outer side portion electrode 32. The electrical length between the first end 41*a* and the second end 41*b* of the first conductor portion 41 is equal to the electrical length between the fifth end 5*a* and the sixth end 5*b* of the second conductor element 5. This configuration enables the improvement of the change in the antenna characteristics caused by the external environment, particularly the length of the coaxial cable 9.

1.2 Embodiment 2

1.2.1 Configuration

Figure 4:
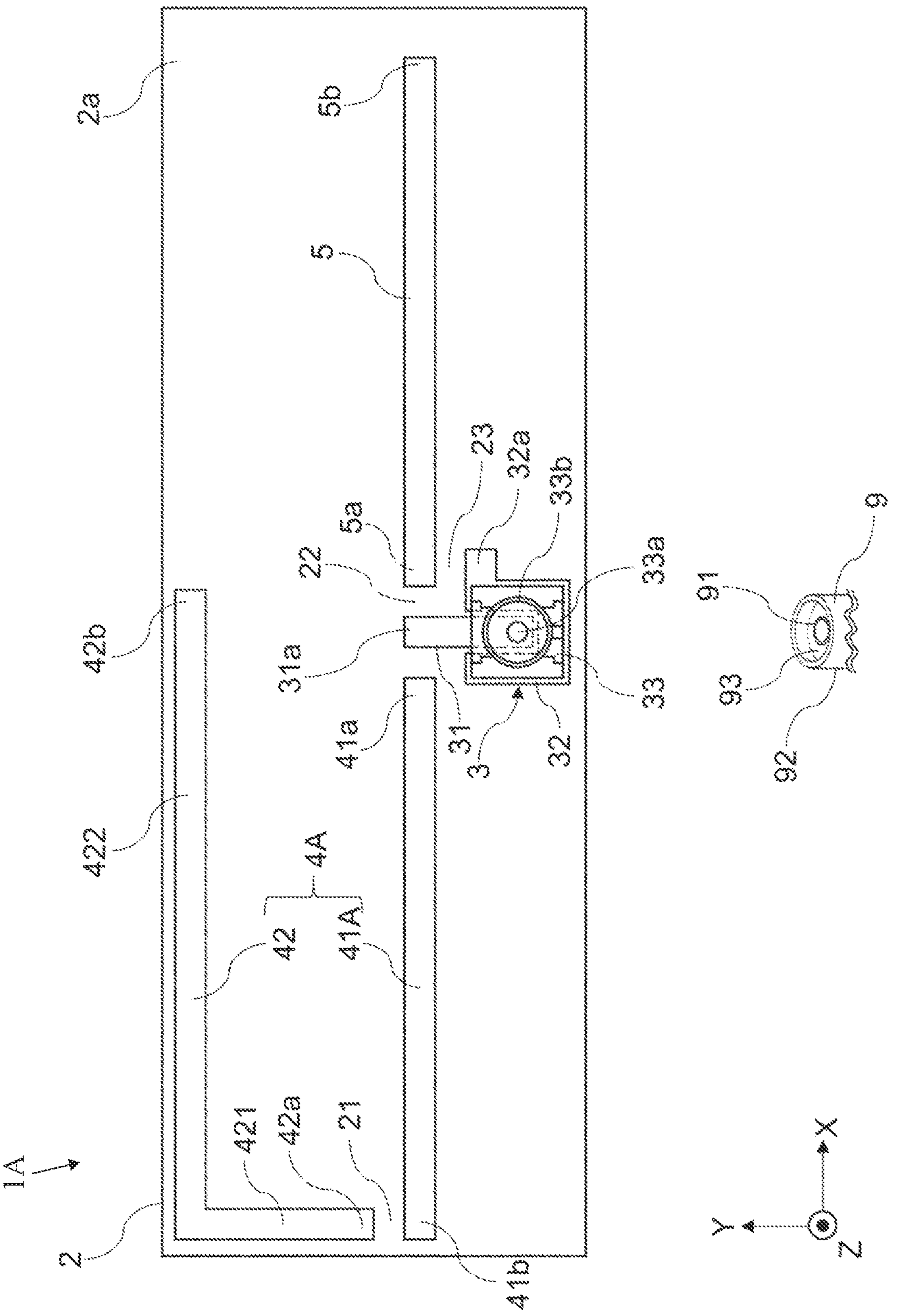
FIG. 4 is a plan view of a configuration example of an antenna board according to Embodiment 2.
Figure 5:
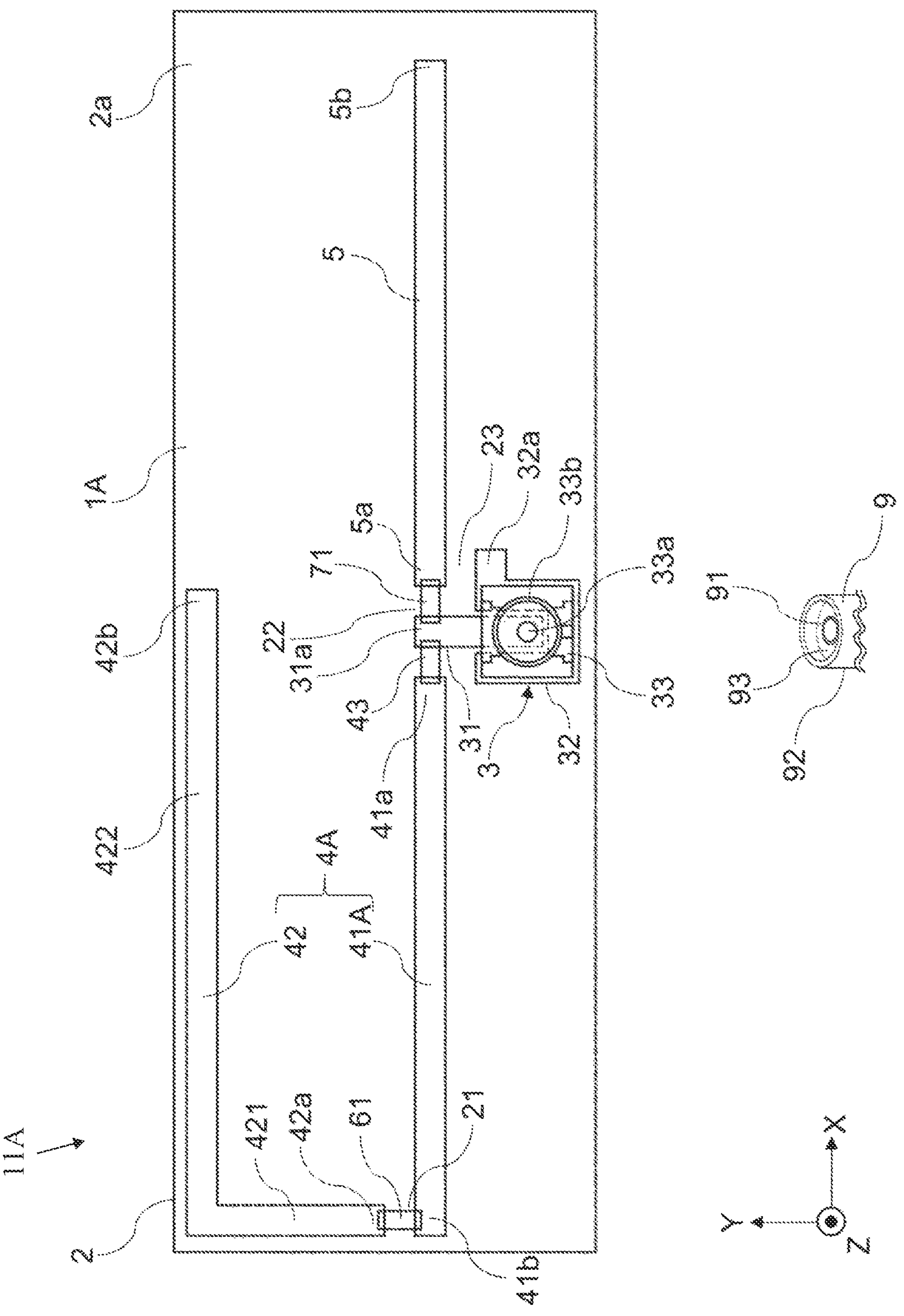
FIG. 5 is a plan view of Configuration Example 1 of an antenna device including the antenna board of FIG. 4.
Figure 6:
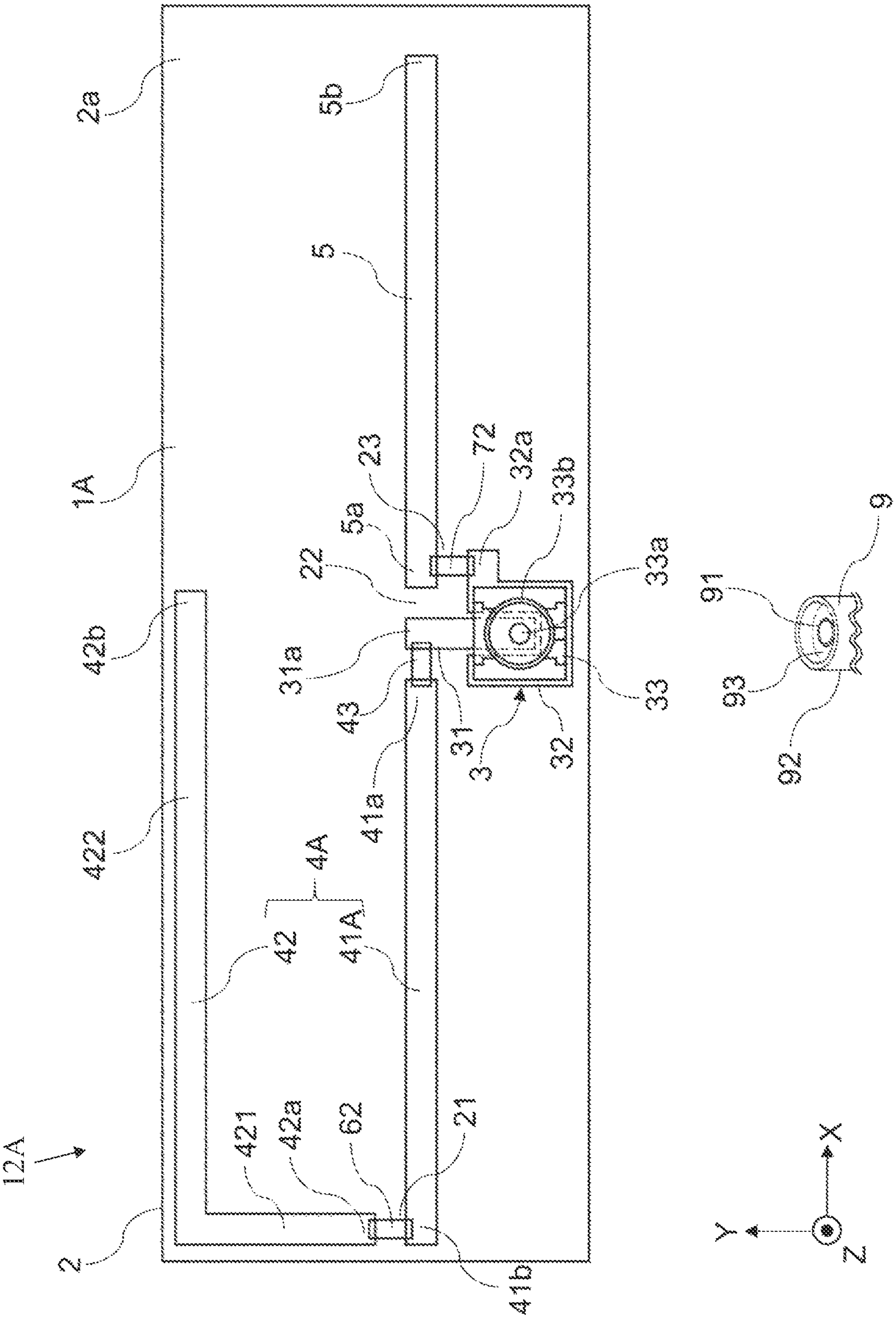
FIG. 6 is a plan view of Configuration Example 2 of the antenna device including the antenna board of FIG. 4.

FIG. 4 is a plan view of a configuration example of an antenna board 1A according to Embodiment 2. FIG. 5 is a plan view of Configuration Example 1 (hereinafter, referred to as antenna device 11A) of an antenna device including the antenna board 1A of FIG. 4. FIG. 6 is a plan view of Configuration Example 2 (hereinafter, referred to as antenna device 12A) of the antenna device including the antenna board 1A of FIG. 4.

The antenna board 1A of FIG. 4 will be described first. The antenna board 1A of FIG. 4 includes a substrate 2, a connection portion 3, a first conductor element 4A, and a second conductor element 5.

The first conductor element 4A includes a first conductor portion 41A and a second conductor portion 42. The first conductor portion 41A and the second conductor portion 42 are formed by conductor patterns formed on a main surface 2*a* of the substrate 2.

The first conductor portion 41A has a first end 41*a* and a second end 41*b*. In the present embodiment, the first conductor portion 41A has a linear shape. The first conductor portion 41A of FIG. 4 extends along a direction opposite to the first direction X (left direction of FIG. 4) with respect to a first extension portion 31*a* of an inner side portion electrode 31. The first end 41*a* is an end of the first conductor portion 41A on a side of the first extension portion 31*a* of the inner side portion electrode 31, and the second end 41*b* is an end of the first conductor portion 41A on an opposite side to the first extension portion 31*a* of the inner side portion electrode 31. The first conductor portion 41A is connected to the inner side portion electrode 31.

As illustrated in FIGS. 5 and 6, the antenna board 1A includes a frequency adjusting element 43 connected to the first conductor portion 41A. The first conductor portion 41A is connected to the inner side portion electrode 31 with the frequency adjusting element 43 interposed therebetween. In more detail, the first end 41*a* of the first conductor portion 41A is connected to the first extension portion 31*a* of the inner side portion electrode 31 with the frequency adjusting element 43 interposed therebetween.

The frequency adjusting element 43 connects the first end 41*a* and the inner side portion electrode 31. The frequency adjusting element 43 includes, for example, one or more inductors or one or more capacitors. The frequency adjusting element 43 can be used for adjusting a resonant frequency of the first conductor element 4A. The configuration of the frequency adjusting element 43 can be determined in consideration of a length of the coaxial cable 9 and an initial resonant frequency of the first conductor element 4A. As an example, in a case in which the coaxial cable 9 is relatively long and an initial resonant frequency in a first frequency band is relatively high, the frequency adjusting element 43 includes the inductor. As an example, in a case in which the coaxial cable 9 is relatively long and the initial resonant frequency in the first frequency band is relatively low, the frequency adjusting element 43 includes the capacitor. As an example, in a case in which an initial resonant frequency in a second frequency band is relatively high, the frequency adjusting element 43 includes the inductor. As an example, in a case in which an initial resonant frequency in the second frequency band is relatively low, the frequency adjusting element 43 includes the capacitor.

The antenna board 1A described above can be used for manufacturing the antenna device 11A illustrated in FIG. 5 and manufacturing the antenna device 12A illustrated in FIG. 6. The antenna device 11A of FIG. 5 and the antenna device 12A of FIG. 6 can be manufactured by using the same antenna board 1A.

Then, the antenna device 11A of FIG. 5 will be described. The antenna device 11A of FIG. 5 includes the antenna board 1A (substrate 2, connection portion 3, first conductor element 4A, second conductor element 5, and frequency adjusting element 43), a short circuit element 61, and a circuit element 71.

In the antenna device 11A of FIG. 5, the short circuit between the first conductor portion 41A and the second conductor portion 42 is performed in the first conductor element 4A. As a result, an electrical length of the first conductor element 4A no longer corresponds to the first frequency band, and only corresponds to the second frequency band. Accordingly, the first conductor element 4A functions as a monopole antenna for the second frequency band. The second conductor element 5 is connected to the inner side portion electrode 31 instead of an outer side portion electrode 32. Accordingly, the second conductor element 5 functions as a monopole antenna for the first frequency band. As described above, the antenna device 11A of FIG. 5 functions as the monopole antenna for both the first frequency band and the second frequency band.

The antenna device 11A of FIG. 5 enables wireless communication using the monopole antenna formed by the first conductor element 4A, and wireless communication using the monopole antenna formed by the second conductor element 5 to enable the improvement of the change in the antenna characteristics caused by the frequency in a case in which the coaxial cable 9 is relatively short.

Then, the antenna device 12A of FIG. 6 will be described. The antenna device 12A of FIG. 6 includes the antenna board 1A (substrate 2, connection portion 3, first conductor element 4A, second conductor element 5, and frequency adjusting element 43), an inductor 62, and a circuit element 72.

In the antenna device 12A of FIG. 6, the inductor 62 is disposed between the first conductor portion 41A and the second conductor portion 42 in the first conductor element 4A. The inductor 62 cuts off the signal in the first frequency band. As a result, since the substantial electrical length of the first conductor element 4A is determined by the length of the first conductor portion 41A, the substantial electrical length corresponds to the first frequency band. Further, the second conductor element 5 is connected to the outer side portion electrode 32 instead of the inner side portion electrode 31. Accordingly, for the first frequency band, the first conductor portion 41A is connected to a feed point, and the second conductor element 5 is connected to a ground. Therefore, the first conductor element 4A and the second conductor element 5 function as a dipole antenna for the first frequency band. On the other hand, the inductor 62 passes the signal in the second frequency band. As a result, since the substantial electrical length of the first conductor element 4A is determined by the total of the length of the first conductor portion 41A and the length of the second conductor portion 42, the substantial electrical length corresponds to the second frequency band. Accordingly, the first conductor element 4A functions as the monopole antenna for the second frequency band. As described above, the antenna device 12A of FIG. 6 functions as the dipole antenna for the first frequency band and functions as the monopole antenna for the second frequency band.

The antenna device 12A of FIG. 6 enables wireless communication using the monopole antenna formed by the first conductor element 4A, and wireless communication using the dipole antenna formed by the first conductor element 4A and the second conductor element 5 to enable the improvement of the antenna characteristics even in a case in which the coaxial cable 9 is relatively long.

1.2.2 Evaluation

Then, the antenna characteristics of the antenna devices (antenna devices 11A and 12A) of Embodiment 2 described above are evaluated.

In the evaluation of the antenna characteristics, the first frequency band is, for example, the frequency band around 5 GHz (for example, 5.15 GHz to 5.8 GHz), and the second frequency band is the frequency band around 2.4 GHz (for example, 2.4 GHz to 2.5 GHz).

Table 2 below illustrates the antenna efficiency [dB] in the first frequency band and the second frequency band of Embodiment 1 and Embodiment 2 in a case in which the external environment is different, for example, in a case in which the coaxial cable 9 is relatively short and in a case in which the coaxial cable 9 is relatively long. A case in which the coaxial cable 9 is relatively short is, for example, a case in which the length of the coaxial cable 9 is less than the quarter of the wavelength corresponding to the second frequency band. A case in which the coaxial cable 9 is relatively long is, for example, a case in which the length of the coaxial cable 9 is the quarter or more of the wavelength corresponding to the second frequency band. The antenna efficiency of Embodiment 1 and Embodiment 2 in a case in which the coaxial cable 9 is relatively short indicates the antenna efficiency of the antenna devices 11 and 11A, and the antenna efficiency of Embodiment 1 and Embodiment 2 in a case in which the coaxial cable 9 is relatively long indicates the antenna efficiency of the antenna devices 12 and 12A.

TABLE 2

| | Coaxial cable 9 is relatively short | | Coaxial cable 9 is relatively long | |
|---|---|---|---|---|
| | First frequency band | Second frequency band | First frequency band | Second frequency band |
| Embodiment 1 | −0.7 | −5.0 | −1.2 | −2.0 |
| Embodiment 2 | −0.8 | −4.4 | −1.4 | −1.7 |

From Table 2, in both a case in which the coaxial cable 9 is relatively long and a case in which the coaxial cable 9 is relatively short, it is confirmed that the antenna efficiency in the second frequency band is improved in Embodiment 2 as compared to Embodiment 1.

1.2.3 Effects

The antenna devices (11A and 12A) and the antenna board 1A described above include the frequency adjusting element 43 connected to the first conductor portion 41A. The frequency adjusting element 43 includes one or more inductors or one or more capacitors. This configuration enables the improvement of the antenna efficiency in wireless communication using the first conductor portion 41A.

1.3 Embodiment 3

1.3.1 Configuration

Figure 7:
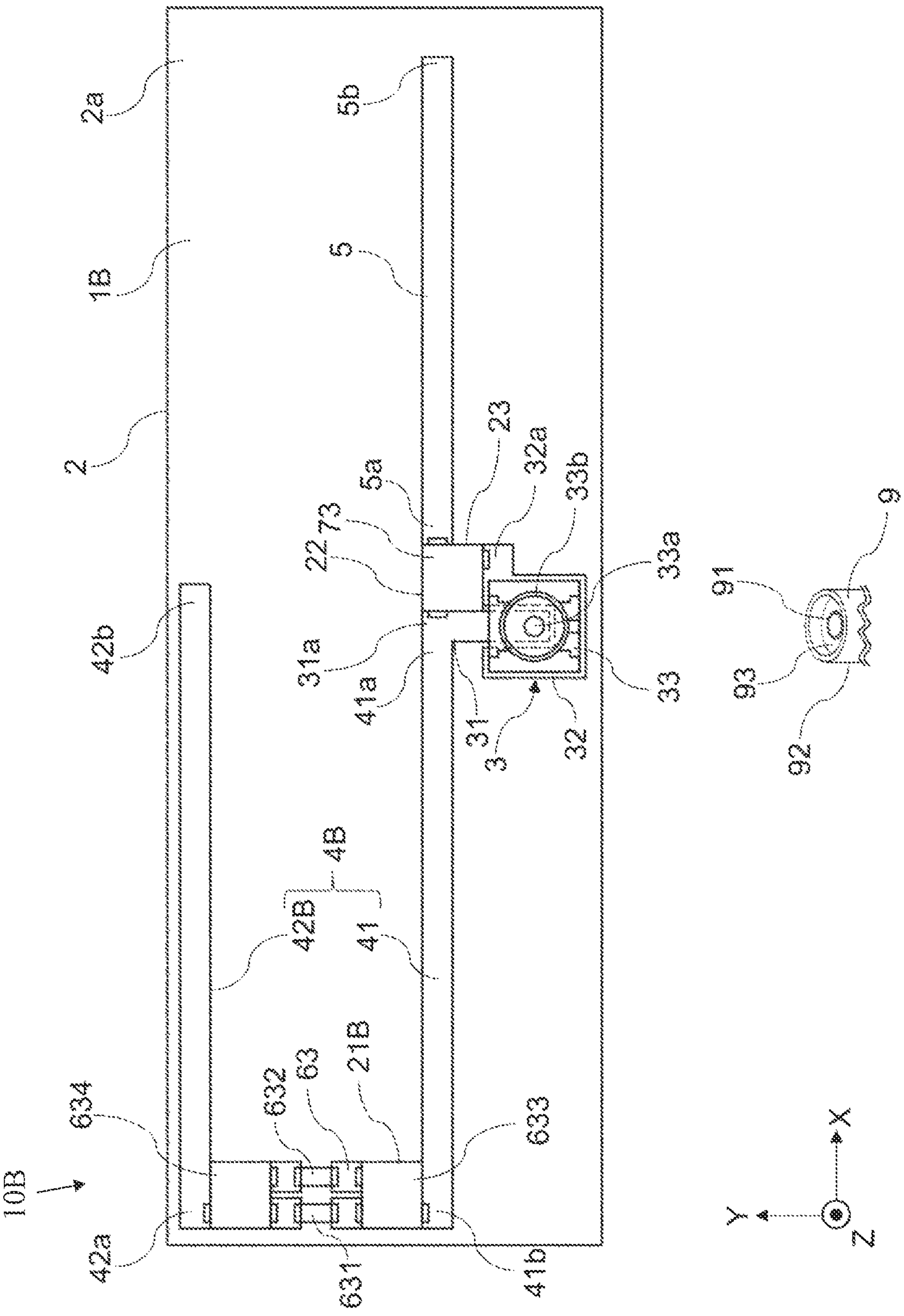
FIG. 7 is a plan view of a configuration example of an antenna device according to Embodiment 3.

FIG. 7 is a plan view of a configuration example of an antenna device 10B according to Embodiment 3. The antenna device 10B of FIG. 7 includes an antenna board 1B, a first switching unit 63, and a second switching unit 73.

The antenna board 1B of FIG. 7 includes a substrate 2, a connection portion 3, a first conductor element 4B, and a second conductor element 5.

The first conductor element 4B of FIG. 7 is configured to function as an antenna element. The first conductor element 4 includes a first conductor portion 41 and a second conductor portion 42B. The first conductor portion 41 and the second conductor portion 42B are formed by conductor patterns formed on a main surface 2*a* of the substrate 2.

The second conductor portion 42B has a third end 42*a* and a fourth end 42*b*. In the present embodiment, the second conductor portion 42B has a linear shape. The second conductor portion 42B extends along the first direction X toward a first extension portion 31*a* of an inner side portion electrode 31. The third end 42*a* is an end of the second conductor portion 42B on an opposite side to the first extension portion 31*a* of the inner side portion electrode 31, and the fourth end 42*b* is an end of the second conductor portion 42B on a side of the first extension portion 31*a* of the inner side portion electrode 31.

The second conductor portion 42B is disposed with a gap in the second direction Y from the first conductor portion 41. In more detail, the second conductor portion 42B is disposed such that a first mounting region 21B is present between the first conductor portion 41 and the second conductor portion 42B. In more detail, the second conductor portion 42B is disposed such that the first mounting region 21B is present between a second end 41*b* and the third end 42*a*.

The first switching unit 63 is disposed in the first mounting region 21B. The first switching unit 63 can switch between a first state and a second state. The first state is a state in which a short circuit element 631 is connected between the second end 41*b* and the third end 42*a*. The second state is a state in which the inductor 632 is connected between the second end 41*b* and the third end 42*a*. In the present embodiment, the first switching unit 63 includes the short circuit element 631, an inductor 632, a first switch 633 and a second switch 634. The substrate 2 can include a conductor pattern for wiring the short circuit element 631 of the first switching unit 63, the inductor 632, the first switch 633, and the second switch 634, as needed.

The short circuit element 631 is located in the first mounting region 21B, and can connect the second end 41*b* and the third end 42*a*. The short circuit element 631 is, for example, a resistance element (resistor) of 0Ω. The short circuit element 631 is not limited to the resistance element of 0Ω, and may be solder, a conductor pattern, a conductive adhesive, or the like as long as the short circuit between the second end 41*b* and the third end 42*a* can be performed.

The inductor 632 is located in the first mounting region 21B, and can connect the second end 41*b* and the third end 42*a*. The inductance of the inductor 632 is set to cut off a signal in a frequency band corresponding to four times the length of the first conductor portion 41 and pass a signal in a frequency band corresponding to four times the total length of the first conductor portion 41 and the second conductor portion 42B. In the present embodiment, the inductor 632 forms a low pass filter that cuts off a signal in a first frequency band and passes a signal in a second frequency band. A circuit element forming the low pass filter together with the inductor 632 may be disposed in the first mounting region 21B.

The first switch 633 is disposed between the first conductor portion 41, and the short circuit element 631 and the inductor 632 in the first mounting region 21B. In the present embodiment, the first switch 633 includes one common terminal, first and second switching terminals, and a contact configuration that connects the common terminal to any one of the first and second switching terminals. The first switch 633 is, for example, a single-pole double-throw switch. In the present embodiment, the common terminal of the first switch 633 is connected to the second end 41*b* of the first conductor portion 41. The first and second switching terminals of the first switch 633 are respectively connected to the short circuit element 631 and the inductor 632.

The second switch 634 is disposed between the second conductor portion 42B, and the short circuit element 631 and the inductor 632 in the first mounting region 21B. In the present embodiment, the second switch 634 has one common terminal, first and second switching terminals, and a contact configuration that connects the common terminal to any one of the first and second switching terminals. The second switch 634 is, for example, a single-pole double-throw switch. In the present embodiment, the common terminal of the second switch 634 is connected to the third end 42*a* of the second conductor portion 42B. The first and second switching terminals of the second switch 634 are respectively connected to the short circuit element 631 and the inductor 632.

In the first state, the common terminal of the first switch 633 is connected to the first switching terminal, and the common terminal of the second switch 634 is connected to the first switching terminal. As a result, the short circuit element 631 is connected between the second end 41*b* and the third end 42*a* with the first switch 633 and the second switch 634 interposed therebetween. In this case, the inductor 632 is not connected between the second end 41*b* and the third end 42*a*.

In the second state, the common terminal of the first switch 633 is connected to the second switching terminal, and the common terminal of the second switch 634 is connected to the second switching terminal. As a result, the inductor 632 is connected between the second end 41*b* and the third end 42*a* with the first switch 633 and the second switch 634 interposed therebetween. In this case, the short circuit element 631 is not connected between the second end 41*b* and the third end 42*a*.

The first switching unit 63 may be configured to switch between the first state and the second state, for example, in response to a control signal from the external circuit. The first switching unit 63 may be configured to switch between the first state and the second state, for example, in response to a manual operation.

The second switching unit 73 is disposed in a second mounting region 22 and a third mounting region 23. In the present embodiment, the second switching unit 73 is disposed in a region including the second mounting region 22 and the third mounting region 23. The second switching unit 73 can switch between a third state and a fourth state. The third state is a state in which the fifth end 5*a* and the inner side portion electrode 31 are connected. The fourth state is a state in which the fifth end 5*a* and an outer side portion electrode 32 are connected.

In the present embodiment, the second switching unit 73 has one common terminal, first and second switching terminals, and a contact configuration that connects the common terminal to any one of the first and second switching terminals. The second switching unit 73 is, for example, a single-pole double-throw switch. In the present embodiment, the common terminal of the second switching unit 73 is connected to the fifth end 5*a* of the second conductor element 5. The first and second switching terminals of the second switching unit 73 are respectively connected to the inner side portion electrode 31 and the outer side portion electrode 32.

In the third state, the common terminal of the second switching unit 73 is connected to the first switching terminal. As a result, the fifth end 5*a* is connected to the inner side portion electrode 31 with the second switching unit 73 interposed therebetween. In this case, the outer side portion electrode 32 is not connected to the fifth end 5*a*.

In the fourth state, the common terminal of the second switching unit 73 is connected to the second switching terminal. As a result, the fifth end 5*a* is connected to the outer side portion electrode 32 with the second switching unit 73 interposed therebetween. In this case, the inner side portion electrode 31 is not connected to the fifth end 5*a*.

The second switching unit 73 may be configured to switch between the third state and the fourth state, for example, in response to a control signal from the external circuit. The second switching unit 73 may be configured to switch between the third state and the fourth state, for example, in response to a manual operation.

The antenna device 10B described above has two switchable operation modes, a first operation mode and a second operation mode.

In the first operation mode, the first switching unit 63 is set to the first state, and the second switching unit 73 is set to the third state. In the first operation mode, the short circuit between the first conductor portion 41 and the second conductor portion 42B is performed in the first conductor element 4B. As a result, an electrical length of the first conductor element 4B no longer corresponds to the first frequency band, and only corresponds to the second frequency band. Accordingly, the first conductor element 4B functions as a monopole antenna for the second frequency band. The second conductor element 5 is connected to the inner side portion electrode 31 instead of the outer side portion electrode 32. Accordingly, the second conductor element 5 functions as a monopole antenna for the first frequency band. As described above, in the first operation mode, the antenna device 10B functions as the monopole antenna for both the first frequency band and the second frequency band.

In the first operation mode, the antenna device 10B enables wireless communication using the monopole antenna formed by the first conductor element 4B, and wireless communication using the monopole antenna formed by the second conductor element 5 to enable the improvement of the change in the antenna characteristics caused by the frequency in a case in which the coaxial cable 9 is relatively short.

In the second operation mode, the first switching unit 63 is set to the second state, and the second switching unit 73 is set to the fourth state. In the second operation mode, the inductor 632 is disposed between the first conductor portion 41 and the second conductor portion 42B in the first conductor element 4B. The inductor 632 cuts off the signal in the first frequency band. As a result, since the substantial electrical length of the first conductor element 4B is determined by the length of the first conductor portion 41, the substantial electrical length corresponds to the first frequency band. Further, the second conductor element 5 is connected to the outer side portion electrode 32 instead of the inner side portion electrode 31. Accordingly, for the first frequency band, the first conductor portion 41 is connected to a feed point, and the second conductor element 5 is connected to a ground. Therefore, the first conductor element 4B and the second conductor element 5 function as a dipole antenna for the first frequency band. On the other hand, the inductor 632 passes the signal in the second frequency band. As a result, since the substantial electrical length of the first conductor element 4B is determined by the total of the length of the first conductor portion 41 and the length of the second conductor portion 42B, the substantial electrical length corresponds to the second frequency band. Accordingly, the first conductor element 4B functions as the monopole antenna for the second frequency band. As described above, in the second operation mode, the antenna device 10B functions as the dipole antenna for the first frequency band and functions as the monopole antenna for the second frequency band.

In the second operation mode, the antenna device 10B enables wireless communication using the monopole antenna formed by the first conductor element 4B, and wireless communication using the dipole antenna formed by the first conductor element 4B and the second conductor element 5 to enable the improvement of the antenna characteristics even in a case in which the coaxial cable 9 is relatively long.

1.3.2 Effects

The antenna device 10B described above includes the first switching unit 63 disposed in the first mounting region 21B and the second switching unit 73 disposed in the second mounting region 22 and the third mounting region 23. The first switching unit 63 can switch between the first state in which the short circuit element 631 is connected between the second end 41*b* and the third end 42*a*, and the second state in which the inductor 632 is connected between the second end 41*b* and the third end 42*a*. The second switching unit 73 can switch between the third state in which the fifth end 5*a* and the inner side portion electrode 31 are connected, and the fourth state in which the fifth end 5*a* and the outer side portion electrode 32 are connected. This configuration enables wireless communication using the monopole antenna formed by the first conductor element 4B, and wireless communication using the monopole antenna formed by the second conductor element 5 to enable the improvement of the change in the antenna characteristics caused by the frequency band in a case in which the coaxial cable 9 is relatively short. This configuration enables wireless communication using the monopole antenna formed by the first conductor element 4B, and wireless communication using the dipole antenna formed by the first conductor element 4B and the second conductor element 5 to enable the improvement of the antenna characteristics even in a case in which the coaxial cable 9 is relatively long.

1.4 Embodiment 4

1.4.1 Configuration

Figure 8:
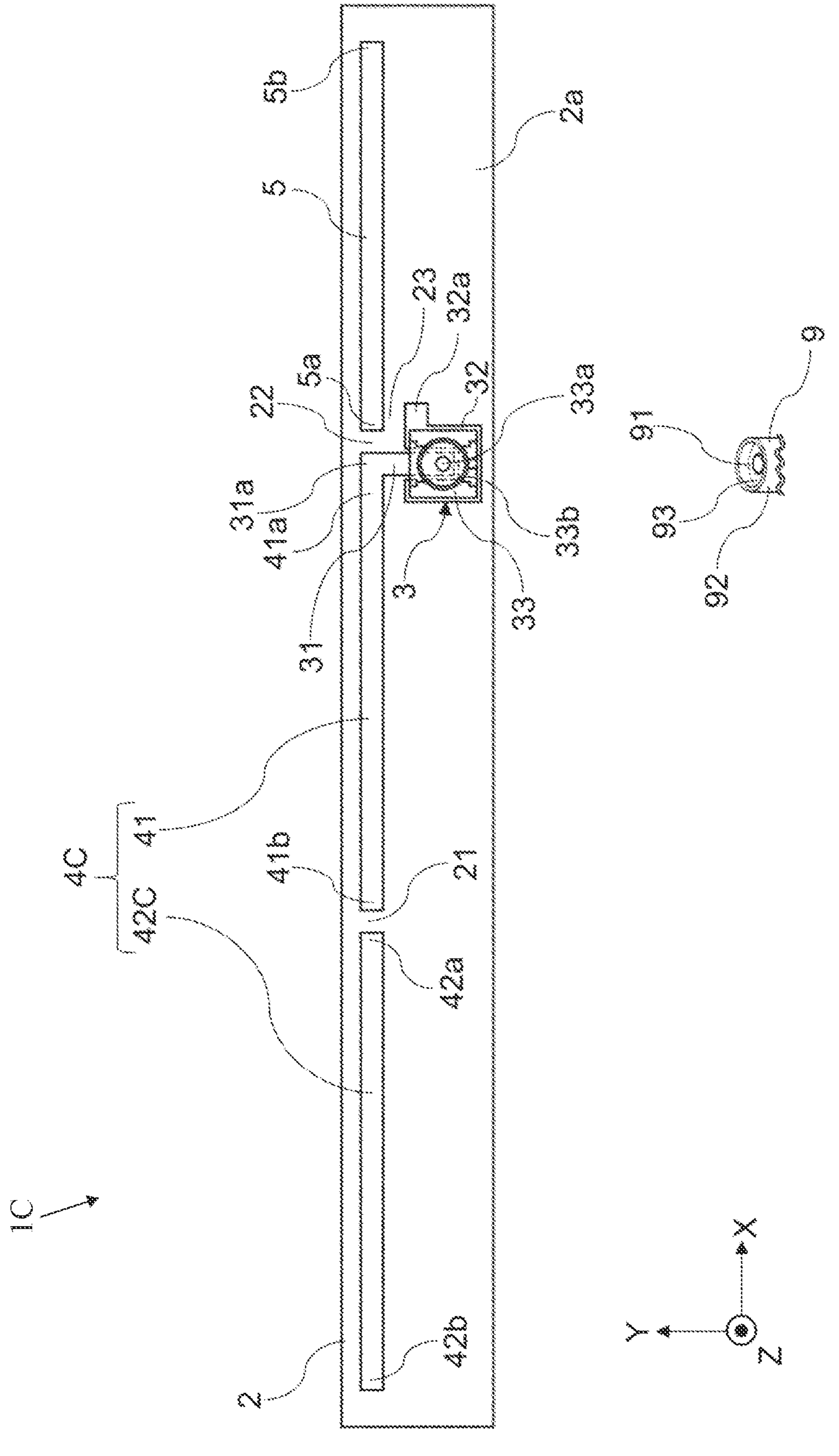
FIG. 8 is a plan view of a configuration example of an antenna board according to Embodiment 4.
Figure 9:
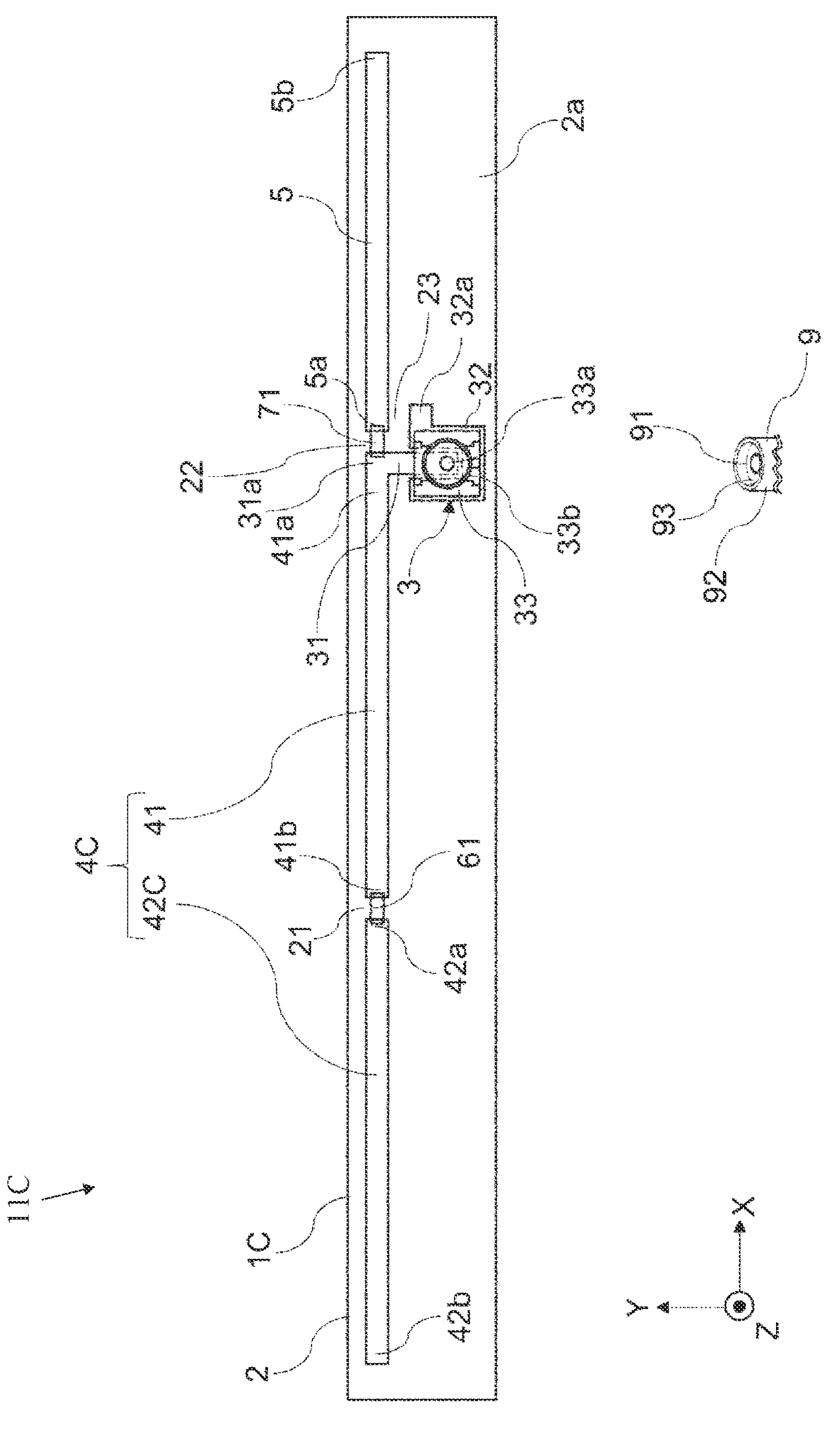
FIG. 9 is a plan view of Configuration Example 1 of an antenna device including the antenna board of FIG. 8.
Figure 10:
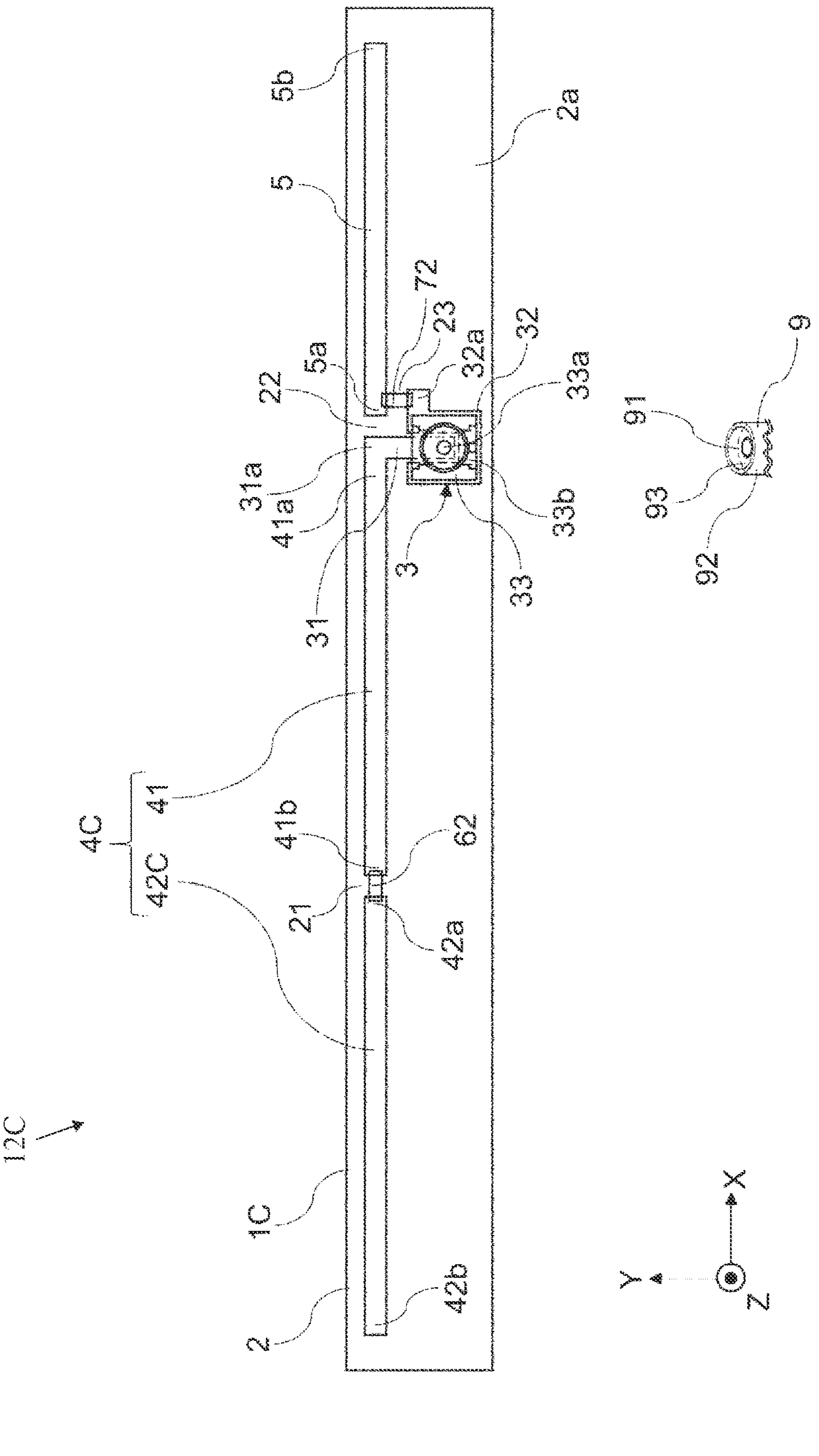
FIG. 10 is a plan view of Configuration Example 2 of the antenna device including the antenna board of FIG. 8.

FIG. 8 is a plan view of a configuration example of an antenna board 1C according to Embodiment 4. FIG. 9 is a plan view of Configuration Example 1 (hereinafter, referred to as antenna device 11C) of an antenna device including the antenna board 1C of FIG. 8. FIG. 10 is a plan view of Configuration Example 2 (hereinafter, referred to as antenna device 12C) of the antenna device including the antenna board 1C of FIG. 8.

The antenna board 1C of FIG. 8 will be described first. The antenna board 1C of FIG. 8 includes a substrate 2, a connection portion 3, a first conductor element 4C, and a second conductor element 5.

The first conductor element 4C includes a first conductor portion 41 and a second conductor portion 42C. The first conductor portion 41 and the second conductor portion 42C are formed by conductor patterns formed on a main surface 2*a* of the substrate 2.

The second conductor portion 42C has a third end 42*a* and a fourth end 42*b*. In the present embodiment, the second conductor portion 42C has a linear shape. The second conductor portion 42C of FIG. 8 extends along a direction opposite to the first direction X (left direction of FIG. 8) with respect to a first extension portion 31*a* of an inner side portion electrode 31. The third end 42*a* is an end of the second conductor portion 42C on a side of the first extension portion 31*a* of the inner side portion electrode 31, and the fourth end 42*b* is an end of the second conductor portion 42C on an opposite side to the first extension portion 31*a* of the inner side portion electrode 31.

The second conductor portion 42C has a linear shape instead of a bent shape. Accordingly, the improvement of the antenna efficiency can be more expected in a case in which the second conductor portion 42C is used than in a case in which the second conductor portion 42 of FIG. 1 is used.

The second conductor portion 42C is disposed to be aligned with the first conductor portion 41. In more detail, the second conductor portion 42C is aligned with the first conductor portion 41 in the first direction X. The second conductor portion 42C is disposed such that a first mounting region 21 is present between the first conductor portion 41 and the second conductor portion 42C. In more detail, the second conductor portion 42C is disposed such that the first mounting region 21 is present between a second end 41*b* and the third end 42*a*.

In the present embodiment, the first conductor portion 41 and the second conductor portion 42C have a linear shape and are aligned with each other.

The antenna board 1C described above can be used for manufacturing the antenna device 11C illustrated in FIG. 9 and manufacturing the antenna device 12C illustrated in FIG. 10. The antenna device 11C of FIG. 9 and the antenna device 12C of FIG. 10 can be manufactured by using the same antenna board 1C.

Then, the antenna device 11C of FIG. 9 will be described. The antenna device 11C of FIG. 9 includes the antenna board 1C (substrate 2, connection portion 3, first conductor element 4C, and second conductor element 5), a short circuit element 61, and a circuit element 71.

In the antenna device 11C of FIG. 9, the short circuit between the first conductor portion 41 and the second conductor portion 42C is performed in the first conductor element 4C. As a result, an electrical length of the first conductor element 4C no longer corresponds to a first frequency band, and only corresponds to a second frequency band. Accordingly, the first conductor element 4C functions as a monopole antenna for the second frequency band. The second conductor element 5 is connected to the inner side portion electrode 31 instead of an outer side portion electrode 32. Accordingly, the second conductor element 5 functions as a monopole antenna for the first frequency band. As described above, the antenna device 11C of FIG. 9 functions as the monopole antenna for both the first frequency band and the second frequency band.

The antenna device 11C of FIG. 9 enables wireless communication using the monopole antenna formed by the first conductor element 4C, and wireless communication using the monopole antenna formed by the second conductor element 5 to enable the improvement of the change in the antenna characteristics caused by the frequency in a case in which the coaxial cable 9 is relatively short.

Then, the antenna device 12C of FIG. 10 will be described. The antenna device 12C of FIG. 10 includes the antenna board 1C (substrate 2, connection portion 3, first conductor element 4C, and second conductor element 5), an inductor 62, and a circuit element 72.

In the antenna device 12C of FIG. 10, the inductor 62 is disposed between the first conductor portion 41 and the second conductor portion 42C in the first conductor element 4C. The inductor 62 cuts off the signal in the first frequency band. As a result, since the substantial electrical length of the first conductor element 4C is determined by the length of the first conductor portion 41, the substantial electrical length corresponds to the first frequency band. Further, the second conductor element 5 is connected to the outer side portion electrode 32 instead of the inner side portion electrode 31. Accordingly, for the first frequency band, the first conductor portion 41 is connected to a feed point, and the second conductor element 5 is connected to a ground. Therefore, the first conductor element 4C and the second conductor element 5 function as a dipole antenna for the first frequency band. On the other hand, the inductor 62 passes the signal in the second frequency band. As a result, since the substantial electrical length of the first conductor element 4C is determined by the total of the length of the first conductor portion 41 and the length of the second conductor portion 42C, the substantial electrical length corresponds to the second frequency band. Accordingly, the first conductor element 4C functions as the monopole antenna for the second frequency band. As described above, the antenna device 12C of FIG. 10 functions as the dipole antenna for the first frequency band and functions as the monopole antenna for the second frequency band.

The antenna device 12C of FIG. 10 enables wireless communication using the monopole antenna formed by the first conductor element 4C, and wireless communication using the dipole antenna formed by the first conductor element 4C and the second conductor element 5 to enable the improvement of the antenna characteristics even in a case in which the coaxial cable 9 is relatively long.

1.4.2 Effects

In the antenna devices (11C and 12C) and the antenna board 1C described above, the first conductor portion 41 and the second conductor portion 42C have a linear shape and are aligned with each other. The second conductor element 5 has a linear shape. This configuration enables the improvement of the antenna efficiency.

1.5 Embodiment 5

1.5.1 Configuration

Figure 11:
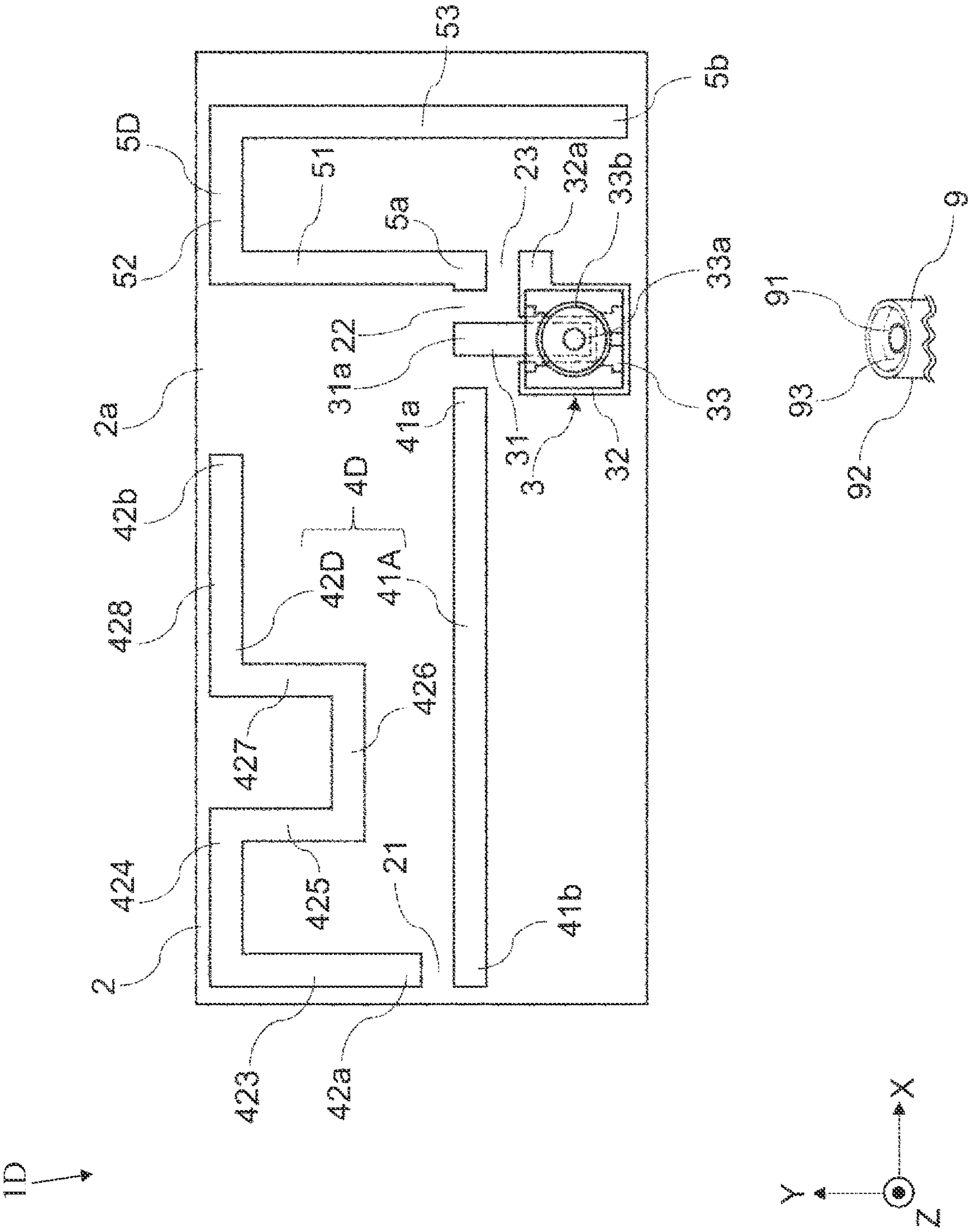
FIG. 11 is a plan view of a configuration example of an antenna board according to Embodiment 5.
Figure 12:
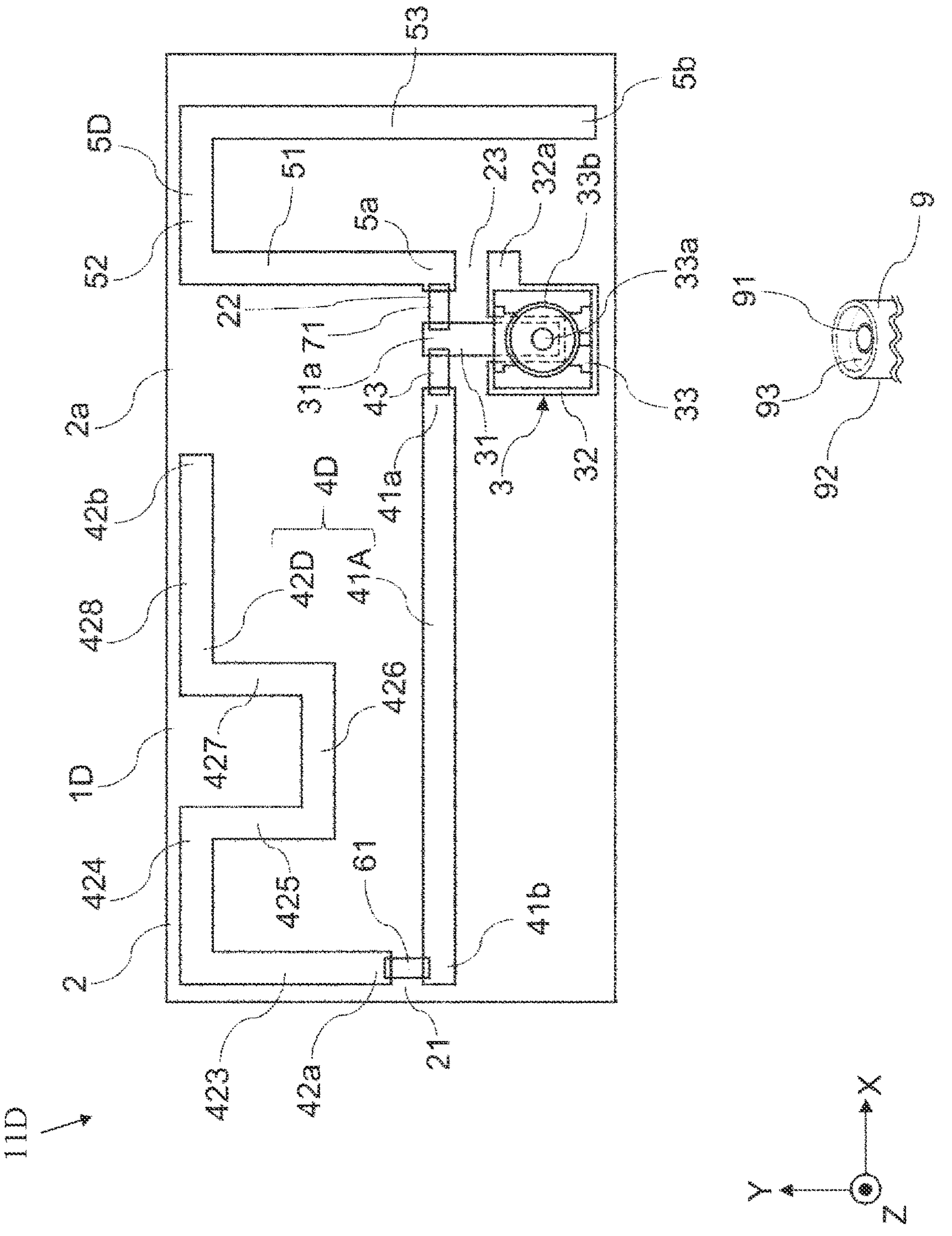
FIG. 12 is a plan view of Configuration Example 1 of an antenna device including the antenna board of FIG. 11.
Figure 13:
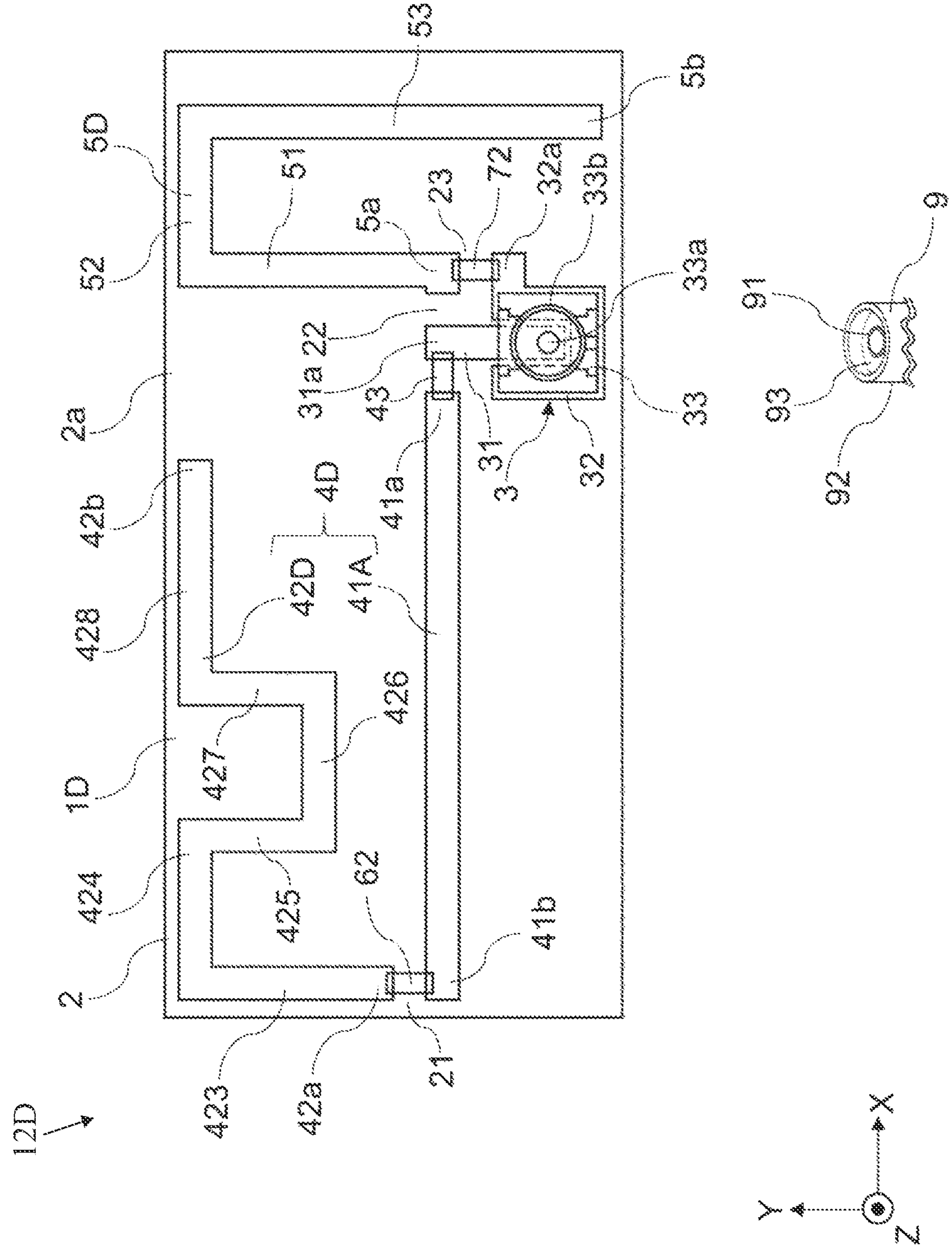
FIG. 13 is a plan view of Configuration Example 2 of the antenna device including the antenna board of FIG. 11.

FIG. 11 is a plan view of a configuration example of an antenna board 1D according to Embodiment 5. FIG. 12 is a plan view of Configuration Example 1 (hereinafter, referred to as antenna device 11D) of an antenna device including the antenna board 1D of FIG. 5. FIG. 13 is a plan view of Configuration Example 2 (hereinafter, referred to as antenna device 12D) of the antenna device including the antenna board 1D of FIG. 11.

The antenna board 1D of FIG. 11 will be described first. The antenna board 1D of FIG. 11 includes a substrate 2, a connection portion 3, a first conductor element 4D, and a second conductor element 5D.

The first conductor element 4D includes a first conductor portion 41A and a second conductor portion 42D. The first conductor portion 41A and the second conductor portion 42D are formed by conductor patterns formed on a main surface 2*a* of the substrate 2.

The second conductor portion 42D has a third end 42*a* and a fourth end 42*b*. In the present embodiment, the second conductor portion 42D does not have a linear shape. The second conductor portion 42D has a bent shape. The second conductor portion 42D of FIG. 11 has a meandering shape. In more detail, the second conductor portion 42D includes a first portion 423, a second portion 424, a third portion 425, a fourth portion 426, a fifth portion 427, and a sixth portion 428. The first portion 423 extends along the second direction Y with respect to a second end 41*b* of the first conductor portion 41A. Here, as described above, the first conductor portion 41A extends along the direction opposite to the first direction X with respect to a first extension portion 31*a* of an inner side portion electrode 31. Accordingly, the second conductor portion 42D extends in a direction intersecting the first conductor portion 41A from the second end 41*b* of the first conductor portion 41A. The second portion 424 extends along the first direction X with respect to a distal end of the first portion 423. The third portion 425 extends along a direction opposite to the second direction Y with respect to a distal end of the second portion 424. The fourth portion 426 extends along the first direction X with respect to a distal end of the third portion 425. The fifth portion 427 extends along the second direction Y with respect to a distal end of the fourth portion 426. The sixth portion 428 extends along the first direction X with respect to a distal end of the fifth portion 427.

The second conductor portion 42D is disposed such that a first mounting region 21 is present between the first conductor portion 41A and the second conductor portion 42D. In more detail, the second conductor portion 42D is disposed such that the first mounting region 21 is present between the second end 41*b* and the third end 42*a*.

In the first conductor element 4D of FIG. 11, the second conductor portion 42D has a bent shape instead of a linear shape. Accordingly, in the first direction X of the substrate 2, the dimension needed for disposing the second conductor portion 42D can be made smaller than the dimension needed for disposing the second conductor portion 42C of FIG. 8. Therefore, the size of the substrate 2 can be reduced in the first direction X. That is, the length of the substrate 2 can be reduced. On the other hand, the improvement of the antenna efficiency can be more expected in a case in which the second conductor portion 42C is used than in a case in which the second conductor portion 42D is used.

The second conductor element 5D is formed by a conductor pattern formed on the main surface 2*a* of the substrate 2. The second conductor element 5D has a fifth end 5*a* and a sixth end 5*b*. In the present embodiment, the second conductor element 5D does not have a linear shape. The second conductor element 5D has a bent shape. The second conductor element 5D of FIG. 11 has an inverted J-shape. In more detail, the second conductor element 5D includes a first portion 51, a second portion 52, and a third portion 53. The first portion 51 extends along the second direction Y with respect to the connection portion 3. Here, as described above, the first conductor portion 41A extends along the direction opposite to the first direction X with respect to the first extension portion 31*a* of the inner side portion electrode 31. Accordingly, the second conductor element 5D extends in a direction intersecting the first conductor portion 41A. The second portion 52 extends along the first direction X with respect to a distal end of the first portion 51. The third portion 53 extends along a direction opposite to the second direction Y with respect to a distal end of the second portion 52.

The second conductor element 5D is disposed such that a second mounting region 22 is present between the inner side portion electrode 31 and the second conductor element 5D and a third mounting region 23 is present between an outer side portion electrode 32 and the second conductor element 5D. In more detail, the second conductor element 5D is disposed such that the second mounting region 22 and the third mounting region 23 are respectively present between a portion of the second conductor element 5D on a side of the connection portion 3, and the inner side portion electrode 31 and the outer side portion electrode 32. In the present embodiment, the second conductor element 5D is disposed such that the second mounting region 22 is present between the fifth end 5*a* and the inner side portion electrode 31 and the third mounting region 23 is present between the fifth end 5*a* and the outer side portion electrode 32.

The second conductor element 5D of FIG. 11 has a bent shape instead of a linear shape. Accordingly, in the first direction X of the substrate 2, the dimension needed for disposing the second conductor element 5D can be made smaller than the dimension needed for disposing the second conductor element 5 of FIG. 8. Therefore, the size of the substrate 2 can be reduced in the first direction X. That is, the length of the substrate 2 can be reduced. On the other hand, the improvement of the antenna efficiency can be more expected in a case in which the second conductor element 5 is used than in a case in which the second conductor element 5D is used.

The antenna board 1D described above can be used for manufacturing the antenna device 11D illustrated in FIG. 12 and manufacturing the antenna device 12D illustrated in FIG. 13. The antenna device 11D of FIG. 12 and the antenna device 12D of FIG. 13 can be manufactured by using the same antenna board 1D.

Then, the antenna device 11D of FIG. 12 will be described. The antenna device 11D of FIG. 12 includes the antenna board 1D (substrate 2, connection portion 3, first conductor element 4D, second conductor element 5D, and frequency adjusting element 43), a short circuit element 61, and a circuit element 71.

In the antenna device 11D of FIG. 5, the short circuit between the first conductor portion 41A and the second conductor portion 42D is performed in the first conductor element 4D. As a result, an electrical length of the first conductor element 4D no longer corresponds to a first frequency band, and only corresponds to a second frequency band. Accordingly, the first conductor element 4D functions as a monopole antenna for the second frequency band. The second conductor element 5D is connected to the inner side portion electrode 31 instead of the outer side portion electrode 32. Accordingly, the second conductor element 5D functions as a monopole antenna for the first frequency band. As described above, the antenna device 11D of FIG. 12 functions as the monopole antenna for both the first frequency band and the second frequency band.

The antenna device 11D of FIG. 12 enables wireless communication using the monopole antenna formed by the first conductor element 4D, and wireless communication using the monopole antenna formed by the second conductor element 5D to enable the improvement of the change in the antenna characteristics caused by the frequency in a case in which the coaxial cable 9 is relatively short.

Then, the antenna device 12D of FIG. 13 will be described. The antenna device 12D of FIG. 13 includes the antenna board 1D (substrate 2, connection portion 3, first conductor element 4D, second conductor element 5D, and frequency adjusting element 43), an inductor 62, and a circuit element 72.

In the antenna device 12D of FIG. 13, the inductor 62 is disposed between the first conductor portion 41A and the second conductor portion 42D in the first conductor element 4D. The inductor 62 cuts off the signal in the first frequency band. As a result, since the substantial electrical length of the first conductor element 4D is determined by the length of the first conductor portion 41D, the substantial electrical length corresponds to the first frequency band. Further, the second conductor element 5D is connected to the outer side portion electrode 32 instead of the inner side portion electrode 31. Accordingly, for the first frequency band, the first conductor portion 41D is connected to a feed point, and the second conductor element 5D is connected to a ground. Therefore, the first conductor element 4D and the second conductor element 5D function as a dipole antenna for the first frequency band. On the other hand, the inductor 62 passes the signal in the second frequency band. As a result, since the substantial electrical length of the first conductor element 4D is determined by the total of the length of the first conductor portion 41A and the length of the second conductor portion 42D, the substantial electrical length corresponds to the second frequency band. Accordingly, the first conductor element 4D functions as the monopole antenna for the second frequency band. As described above, the antenna device 12D of FIG. 13 functions as the dipole antenna for the first frequency band and functions as the monopole antenna for the second frequency band.

The antenna device 12D of FIG. 13 enables wireless communication using the monopole antenna formed by the first conductor element 4D, and wireless communication using the dipole antenna formed by the first conductor element 4D and the second conductor element 5D to enable the improvement of the antenna characteristics even in a case in which the coaxial cable 9 is relatively long.

1.5.2 Effects

In the antenna devices (antenna devices 11D and 12D) and the antenna board 1D described above, the second conductor portion 42D has a bent shape. This configuration can reduce the length of the substrate 2 as compared to a case in which the second conductor portion 42D has a linear shape.

In the antenna devices (antenna devices 11D and 12D) and the antenna board 1D, the second conductor portion 42D extends in the direction intersecting the first conductor portion 41A from the second end 41*b* of the first conductor portion 41A. This configuration can reduce the length of the substrate 2 as compared to a case in which both the first conductor portion 41A and the second conductor portion 42D are aligned with each other.

In the antenna devices (antenna devices 11D and 12D) and the antenna board 1D, the second conductor element 5D has a bent shape. This configuration can reduce the length of the substrate 2 as compared to a case in which the second conductor element 5D has a linear shape.

1.6 Embodiment 6

1.6.1 Configuration

Figure 14:
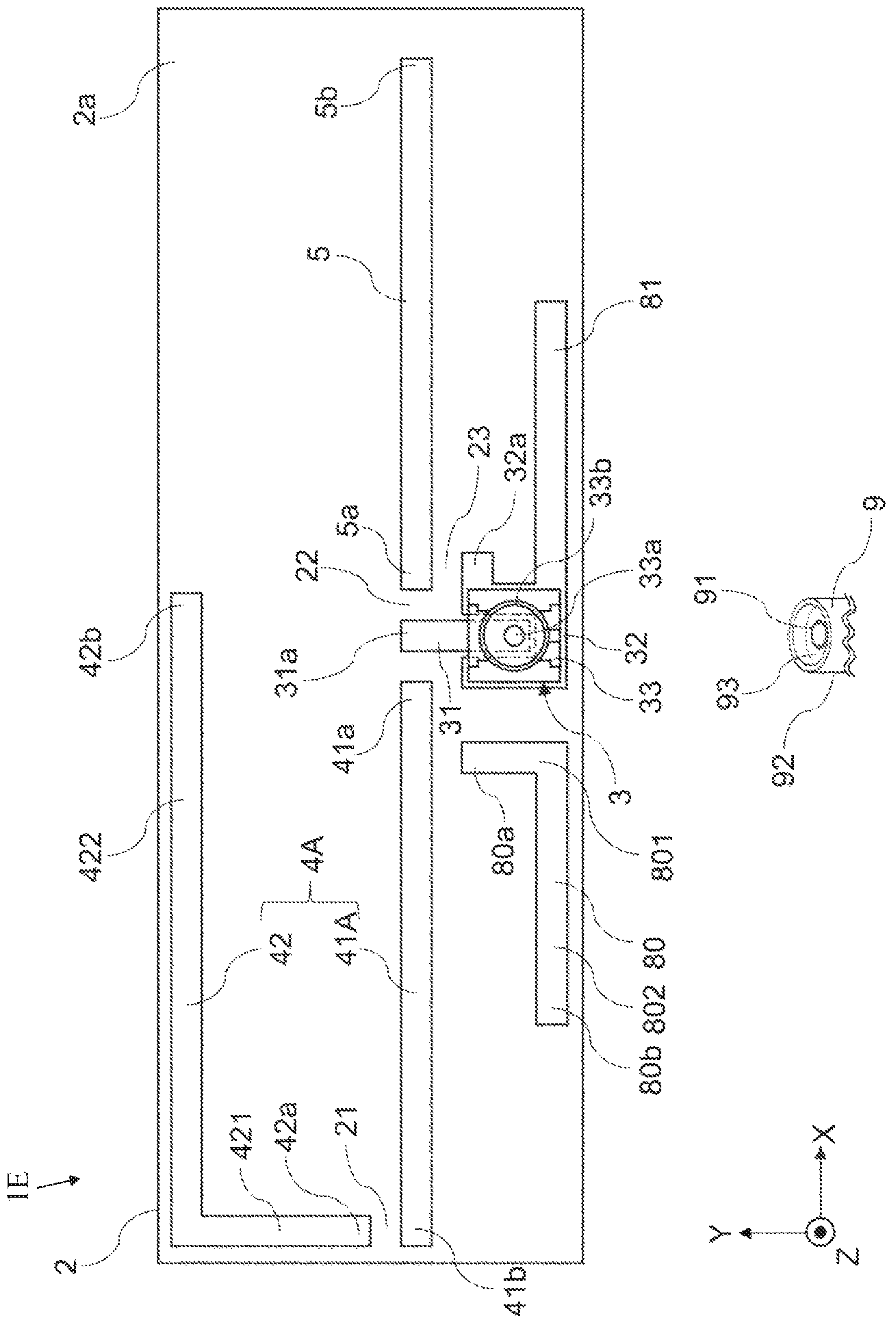
FIG. 14 is a plan view of a configuration example of an antenna board according to Embodiment 6.
Figure 15:
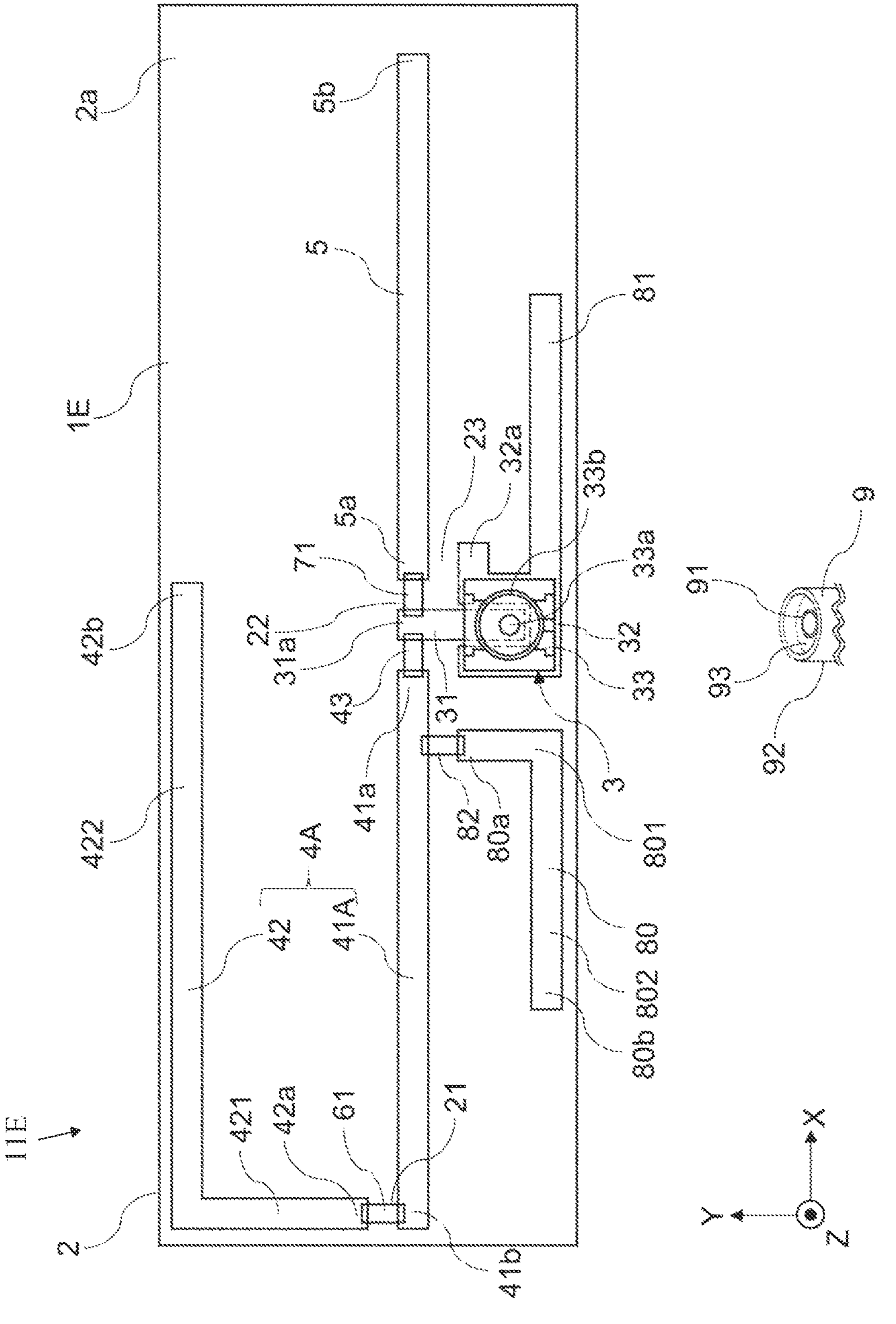
FIG. 15 is a plan view of Configuration Example 1 of an antenna device including the antenna board of FIG. 14.
Figure 16:
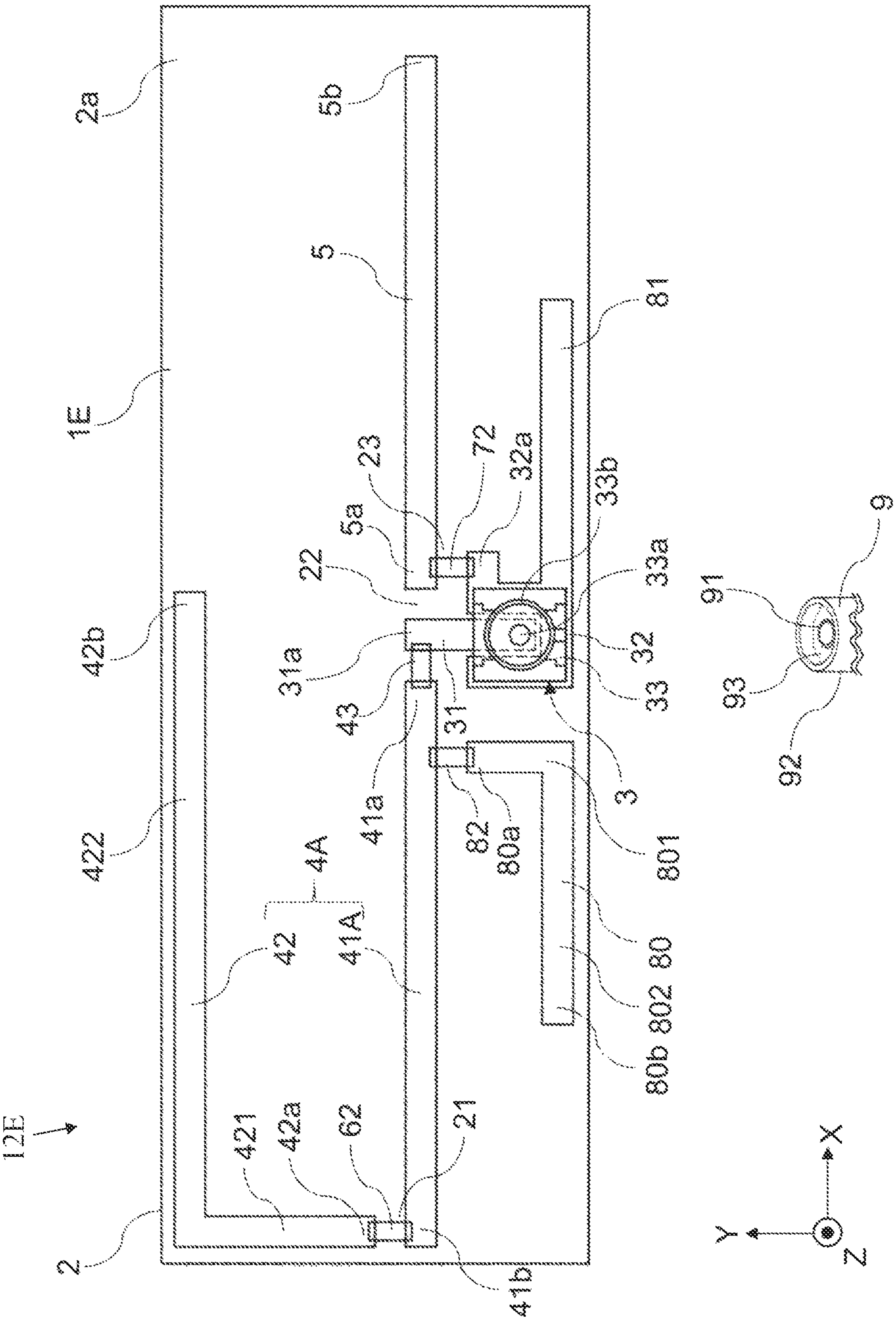
FIG. 16 is a plan view of Configuration Example 2 of the antenna device including the antenna board of FIG. 14.

FIG. 14 is a plan view of a configuration example of an antenna board 1E according to Embodiment 6. FIG. 15 is a plan view of Configuration Example 1 (hereinafter, referred to as antenna device 11E) of an antenna device including the antenna board 1E of FIG. 14. FIG. 16 is a plan view of Configuration Example 2 (hereinafter, referred to as antenna device 12E) of the antenna device including the antenna board 1E of FIG. 14.

The antenna board 1E of FIG. 14 will be described first. The antenna board 1E of FIG. 14 includes a substrate 2, a connection portion 3, a first conductor element 4A, a second conductor element 5, a third conductor element 80, and a fourth conductor element 81.

The third conductor element 80 and the fourth conductor element 81 are configured to function as a dipole antenna corresponding to a third frequency band. In the present embodiment, the third frequency band is higher than a first frequency band. Examples of the third frequency band include a frequency band around 6.5 GHz (for example, 5.935 GHz to 7.125 GHz).

The third conductor element 80 is formed by a conductor pattern formed on a main surface 2*a* of the substrate 2. The fourth conductor element 81 is formed by a conductor pattern formed on the main surface 2*a* of the substrate 2.

The third conductor element 80 is connected to an inner side portion electrode 31 with at least a part of a first conductor portion 41A interposed therebetween. In the present embodiment, as illustrated in FIGS. 15 and 16, the third conductor element 80 is connected to the first conductor portion 41A with the circuit element 82 interposed therebetween, and thereby connected to the inner side portion electrode 31.

In the present embodiment, the third conductor element 80 does not have a linear shape. The third conductor element 80 has a bent shape. The third conductor element 80 of FIG. 14 has an L-shape. In more detail, the third conductor element 80 includes a first portion 801 and a second portion 802. The first portion 801 extends along a direction opposite to the second direction Y with respect to the first conductor portion 41A. Here, the first conductor portion 41A extends along a direction opposite to the first direction X with respect to a first extension portion 31*a* of the inner side portion electrode 31. Accordingly, the first portion 801 extends from the first conductor portion 41A in a direction intersecting the first conductor portion 41A. The second portion 802 extends along the direction opposite to the first direction X with respect to a distal end of the first portion 801. The third conductor element 80 has a seventh end 80*a* and an eighth end 80*b*. The seventh end 80*a* is an end of the first portion 801 of the third conductor element 80 on a side of the first conductor portion 41A, and the eighth end 80*b* is a distal end of the second portion 802 of the third conductor element 80.

The fourth conductor element 81 is connected to an outer side portion electrode 32. In the present embodiment, the fourth conductor element 81 is connected to the outer side portion electrode 32 continuously and integrally. In the present embodiment, the fourth conductor element 81 has a linear shape. In FIG. 14, the fourth conductor element 81 extends along the first direction X with respect to the outer side portion electrode 32 of the connection portion 3. In FIG. 14, the fourth conductor element 81 is disposed to be aligned with the second portion 802 of the third conductor element 80. In more detail, the fourth conductor element 81 is aligned with the second portion 802 of the third conductor element 80 in the first direction X.

In the antenna board 1E, an electrical length defined by the third conductor element 80 and a portion of the first conductor portion 41A between the third conductor element 80 and the inner side portion electrode 31 is equal to an electrical length of the fourth conductor element 81. The electrical length defined by the third conductor element 80 and the portion of the first conductor portion 41A between the third conductor element 80 and the inner side portion electrode 31 corresponds to a quarter of a wavelength corresponding to the third frequency band. The electrical length defined by the third conductor element 80 and the portion of the first conductor portion 41A between the third conductor element 80 and the inner side portion electrode 31 can correspond to, for example, the total of an electrical length of the first conductor portion 41A between the first extension portion 31*a* of the inner side portion electrode 31 and the circuit element 82, and an electrical length between the seventh end 80*a* and the eighth end 80*b* of the third conductor element 80.

However, the electrical length defined by the third conductor element 80 and the portion of the first conductor portion 41A between the third conductor element 80 and the inner side portion electrode 31 is different from both the total of an electrical length between a first end 41$a$ and a second end 41$b$ of the first conductor portion 41A and an electrical length between a third end 42$a$ and a fourth end 42$b$ of a second conductor portion 42, and an electrical length between a fifth end 5$a$ and a sixth end 5$b$ of the second conductor element 5. In the present embodiment, the electrical length defined by the third conductor element 80 and the portion of the first conductor portion 41A between the third conductor element 80 and the inner side portion electrode 31 is shorter than both the total of the electrical length between the first end 41$a$ and the second end 41$b$ of the first conductor portion 41A and the electrical length between a third end 42$a$ and the fourth end 42$b$ of the second conductor portion 42, and the electrical length between the fifth end 5$a$ and the sixth end 5$b$ of the second conductor element 5.

The circuit element 82 is, for example, a capacitor. The capacitance of the circuit element 82 is set, for example, to pass a signal in the third frequency band and cut off a signal in first and second frequency bands. In the present embodiment, the circuit element 82 forms a high pass filter that cuts off the signal in the first and second frequency bands and passes the signal in the third frequency band.

The antenna board 1E described above can be used for manufacturing the antenna device 11E illustrated in FIG. 15 and manufacturing the antenna device 12E illustrated in FIG. 16. The antenna device 11E of FIG. 15 and the antenna device 12E of FIG. 16 can be manufactured by using the same antenna board 1E.

Then, the antenna device 11E of FIG. 15 will be described. The antenna device 11E of FIG. 15 includes the antenna board 1E (substrate 2, connection portion 3, first conductor element 4A, second conductor element 5, third conductor element 80, fourth conductor element 81, frequency adjusting element 43, and circuit element 82), a short circuit element 61, and a circuit element 71.

In the antenna device 11E of FIG. 15, the short circuit between the first conductor portion 41A and the second conductor portion 42 is performed in the first conductor element 4A. As a result, an electrical length of the first conductor element 4A no longer corresponds to the first frequency band, and only corresponds to the second frequency band. Accordingly, the first conductor element 4A functions as a monopole antenna for the second frequency band. The second conductor element 5 is connected to the inner side portion electrode 31 instead of the outer side portion electrode 32. Accordingly, the second conductor element 5 functions as a monopole antenna for the first frequency band. As described above, the antenna device 11E of FIG. 15 functions as the monopole antenna for both the first frequency band and the second frequency band. The third conductor element 80 is connected to the first conductor portion 41A with the circuit element 82 interposed therebetween, but the electrical length defined by the third conductor element 80 and the portion of the first conductor portion 41A between the third conductor element 80 and the inner side portion electrode 31 does not correspond to the first frequency band and the second frequency band. Accordingly, the third conductor element 80 does not prevent the antenna device 11E from functioning as the monopole antenna for the first and second frequency bands.

The antenna device 11E of FIG. 15 enables wireless communication using the monopole antenna formed by the first conductor element 4A, and wireless communication using the monopole antenna formed by the second conductor element 5 to enable the improvement of the change in the antenna characteristics caused by the frequency in a case in which the coaxial cable 9 is relatively short.

Then, the antenna device 12E of FIG. 16 will be described. The antenna device 12E of FIG. 16 includes the antenna board 1E (substrate 2, connection portion 3, first conductor element 4A, second conductor element 5, third conductor element 80, fourth conductor element 81, frequency adjusting element 43, and circuit element 82), an inductor 62, and a circuit element 72.

In the antenna device 12E of FIG. 16, the inductor 62 is disposed between the first conductor portion 41A and the second conductor portion 42 in the first conductor element 4A. The inductor 62 cuts off the signal in the first frequency band. As a result, since the substantial electrical length of the first conductor element 4A is determined by the length of the first conductor portion 41A, the substantial electrical length corresponds to the first frequency band. Further, the second conductor element 5 is connected to the outer side portion electrode 32 instead of the inner side portion electrode 31. Accordingly, for the first frequency band, the first conductor portion 41A is connected to a feed point, and the second conductor element 5 is connected to a ground. Therefore, the first conductor element 4A and the second conductor element 5 function as a dipole antenna for the first frequency band. On the other hand, the inductor 62 passes the signal in the second frequency band. As a result, since the substantial electrical length of the first conductor element 4A is determined by the total of the length of the first conductor portion 41A and the length of the second conductor portion 42, the substantial electrical length corresponds to the second frequency band. Accordingly, the first conductor element 4A functions as the monopole antenna for the second frequency band. As described above, the antenna device 12E of FIG. 16 functions as the dipole antenna for the first frequency band and functions as the monopole antenna for the second frequency band. Although the third conductor element 80 is connected to the first conductor portion 41A with the circuit element 82 interposed therebetween, the circuit element 82 does not pass the signal in the first frequency band. Accordingly, the third conductor element 80 does not prevent the antenna device 12E from functioning as the dipole antenna for the first frequency band. In addition, the electrical length defined by the third conductor element 80 and the portion of the first conductor portion 41A between the third conductor element 80 and the inner side portion electrode 31 does not correspond to the second frequency band. Accordingly, the third conductor element 80 does not prevent the antenna device 12E from functioning as the monopole antenna for the second frequency band.

The antenna device 12E of FIG. 16 enables wireless communication using the monopole antenna formed by the first conductor element 4A, and wireless communication using the dipole antenna formed by the first conductor element 4A and the second conductor element 5 to enable the improvement of the antenna characteristics even in a case in which the coaxial cable 9 is relatively long.

The antenna device 11E of FIG. 15 and the antenna device 12E of FIG. 16 both include the third conductor element 80 and the fourth conductor element 81. The third conductor element 80 is connected to the inner side portion electrode 31 with the circuit element 82 and the first conductor portion 41A interposed therebetween. The fourth conductor element 81 is connected to an outer side portion electrode 32. The circuit element 82 passes the signal in the third frequency band. The electrical length defined by the third conductor element 80 and the portion of the first conductor portion 41A between the third conductor element 80 and the inner side portion electrode 31 and the electrical length of the fourth conductor element 81 are equal to each other, and correspond to the quarter of the wavelength corresponding to the third frequency band. Accordingly, the third conductor element 80 and the fourth conductor element 81 function as a dipole antenna for the third frequency band. Therefore, the antenna device 11E of FIG. 15 and the antenna device 12E of FIG. 16 enable wireless communication by the dipole antenna formed by the third conductor element 80 and the fourth conductor element 81.

1.6.2 Effects

The antenna devices (antenna devices 11E and 12E) and the antenna board 1E described above include the third conductor element 80 located on the substrate 2 and connected to the inner side portion electrode 31 with at least a part of the first conductor portion 41A interposed therebetween, and the fourth conductor element 81 located on the substrate 2 and connected to the outer side portion electrode 32. The electrical length defined by the third conductor element 80 and the portion of the first conductor portion 41A between the third conductor element 80 and the inner side portion electrode 31 is equal to the electrical length of the fourth conductor element, but different from both the total of the electrical length between the first end 41*a* and the second end 41*b* of the first conductor portion 41A and the electrical length between the third end 42*a* and the fourth end 42*b* of the second conductor portion 42, and the electrical length between the fifth end 5*a* and the sixth end 5*b* of the second conductor element 5. This configuration enables wireless communication by the dipole antenna formed by the third conductor element 80 and the fourth conductor element 81.

1.7 Embodiment 7

1.7.1 Configuration

Figure 17:
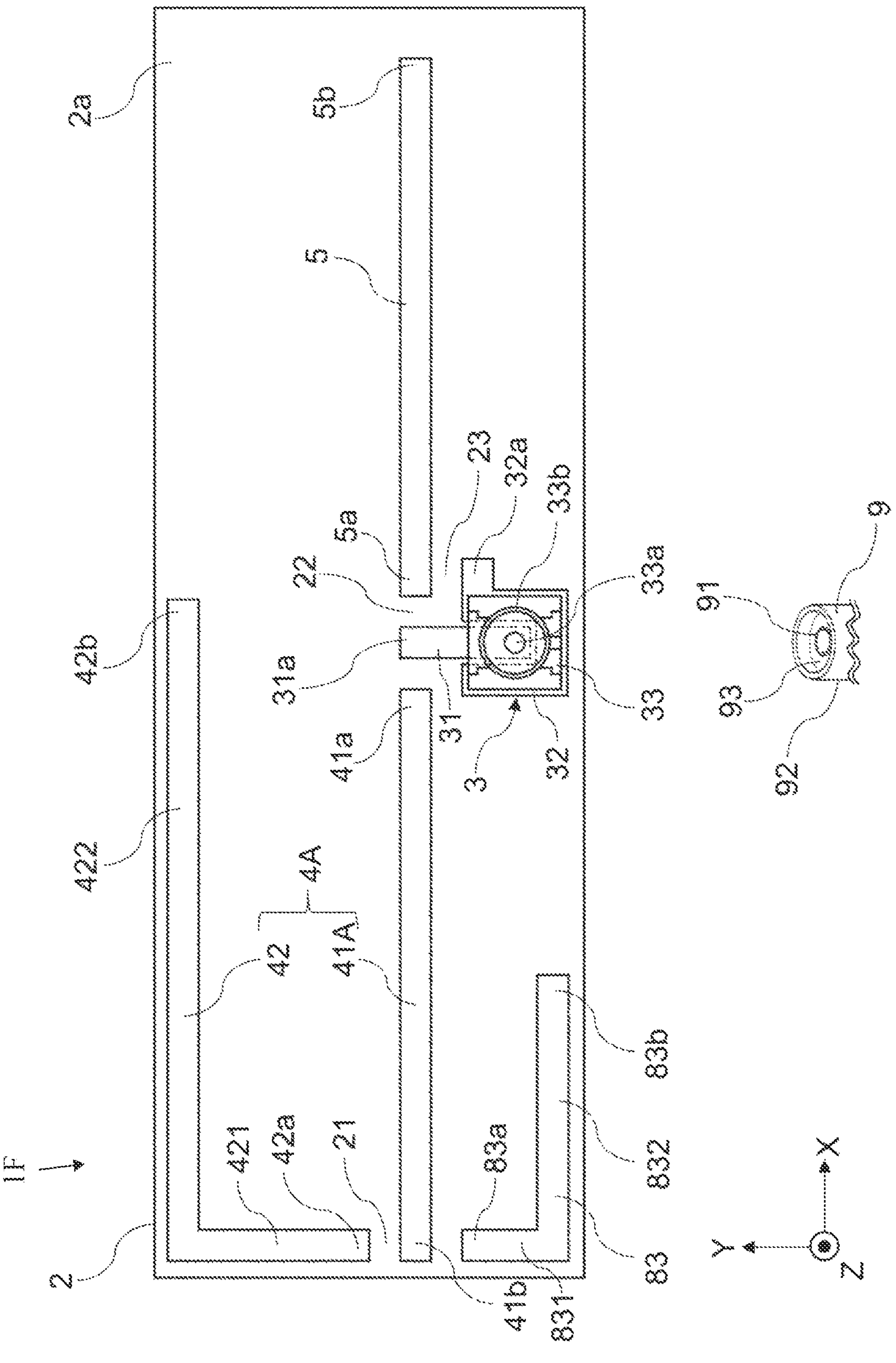
FIG. 17 is a plan view of a configuration example of an antenna board according to Embodiment 7.
Figure 18:
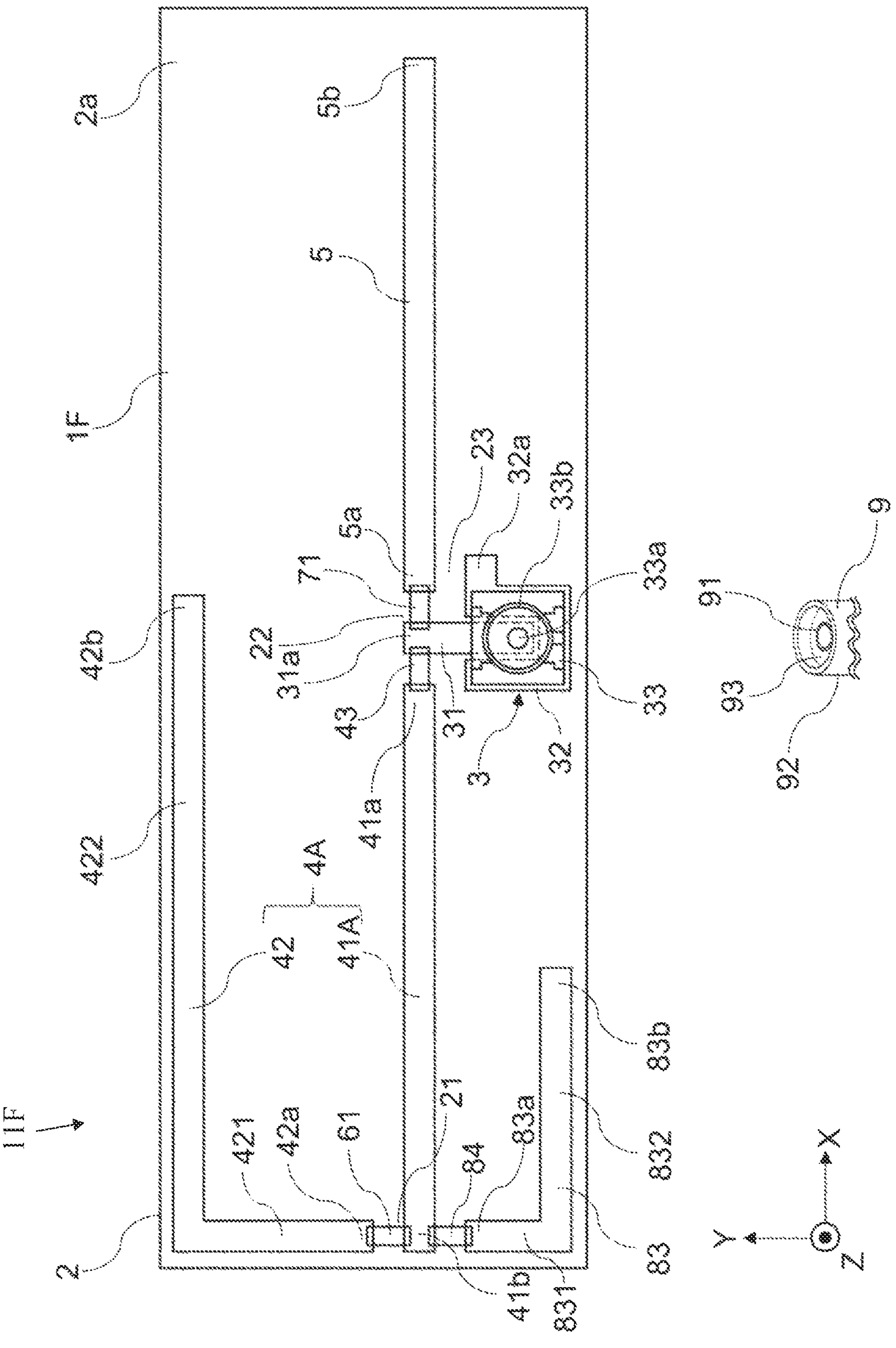
FIG. 18 is a plan view of Configuration Example 1 of an antenna device including the antenna board of FIG. 17.
Figure 19:
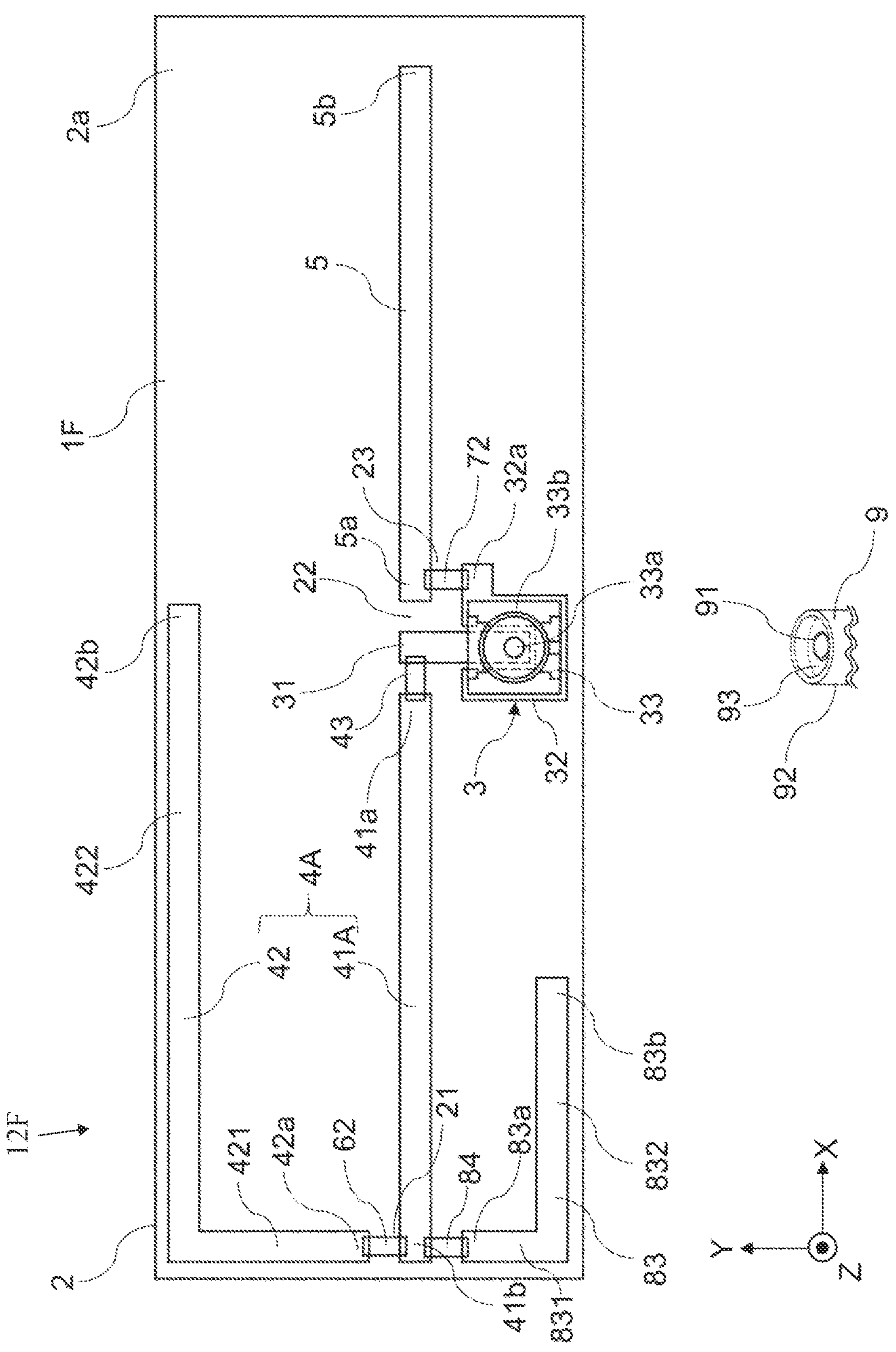
FIG. 19 is a plan view of Configuration Example 2 of the antenna device including the antenna board of FIG. 17.

FIG. 17 is a plan view of a configuration example of an antenna board 1F according to Embodiment 7. FIG. 18 is a plan view of Configuration Example 1 (hereinafter, referred to as antenna device 11F) of an antenna device including the antenna board 1F of FIG. 17. FIG. 19 is a plan view of Configuration Example 2 (hereinafter, referred to as antenna device 12F) of the antenna device including the antenna board 1F of FIG. 17.

The antenna board 1F of FIG. 17 will be described first. The antenna board 1F of FIG. 17 includes a substrate 2, a connection portion 3, a first conductor element 4A, a second conductor element 5, and a third conductor element 83.

The third conductor element 83 is configured to function as a dipole antenna corresponding to a third frequency band. In the present embodiment, the third frequency band is lower than a first frequency band, but higher than a second frequency band. In the present embodiment, examples of the first frequency band include a frequency band around 6.5 GHz (for example, 5.935 GHz to 7.125 GHz). Examples of the second frequency band include a frequency band around 2.4 GHz (for example, 2.40 GHz to 2.50 GHz). Examples of the third frequency band include a frequency band around 5 GHz (for example, 5.15 GHz to 5.80 GHz).

The third conductor element 83 is formed by a conductor pattern formed on a main surface 2*a* of the substrate 2. The third conductor element 83 is connected to an inner side portion electrode 31 with at least a part of the first conductor portion 41A interposed therebetween. In the present embodiment, as illustrated in FIGS. 18 and 19, the third conductor element 83 is connected to the first conductor portion 41A with a circuit element 84 interposed therebetween, and thereby connected to the inner side portion electrode 31. In more detail, the third conductor element 83 is connected to a second end 41*b* of the first conductor portion 41A with the circuit element 84 interposed therebetween. Therefore, the third conductor element 83 is connected to the inner side portion electrode 31 with the entire first conductor portion 41A interposed therebetween.

In the present embodiment, the third conductor element 83 does not have a linear shape. The third conductor element 83 has a bent shape. The third conductor element 83 of FIG. 17 has an L-shape. In more detail, the third conductor element 83 includes a first portion 831 and a second portion 832. The first portion 831 extends along a direction opposite to the second direction Y with respect to the first conductor portion 41A. Here, the first conductor portion 41A extends along a direction opposite to the first direction X with respect to a first extension portion 31*a* of the inner side portion electrode 31. Accordingly, the first portion 831 extends from the first conductor portion 41A in a direction intersecting the first conductor portion 41A. The second portion 832 extends along the first direction X with respect to a distal end of the first portion 831. The third conductor element 83 has a seventh end 83*a* and an eighth end 83*b*. The seventh end 83*a* is an end of the first portion 831 of the third conductor element 83 on a side of the first conductor portion 41A, and the eighth end 83*b* is a distal end of the second portion 832 of the third conductor element 83.

In the antenna board 1F, an electrical length defined by the third conductor element 83 and a portion of the first conductor portion 41A between the third conductor element 83 and the inner side portion electrode 31 corresponds to a quarter of a wavelength corresponding to the third frequency band. The electrical length defined by the third conductor element 83 and the portion of the first conductor portion 41A between the third conductor element 83 and the inner side portion electrode 31 can correspond to, for example, the total of an electrical length between a first end 41*a* and the second end 41*b* of the first conductor portion 41A and an electrical length between a seventh end 80*a* and an eighth end 80*b* of the third conductor element 80.

However, the electrical length defined by the third conductor element 83 and the portion of the first conductor portion 41A between the third conductor element 83 and the inner side portion electrode 31 is different from both the total of the electrical length between the first end 41*a* and the second end 41*b* of the first conductor portion 41A and an electrical length between a third end 42*a* and a fourth end 42*b* of the second conductor portion 42, and an electrical length between a fifth end 5*a* and a sixth end 5*b* of the second conductor element 5. In the present embodiment, the electrical length defined by the third conductor element 83 and the portion of the first conductor portion 41A between the third conductor element 83 and the inner side portion electrode 31 is shorter than the total of the electrical length between the first end 41*a* and the second end 41*b* of the first conductor portion 41A and the electrical length between the third end 42*a* and the fourth end 42*b* of the second conductor portion 42, and is longer than the electrical length between the fifth end 5*a* and the sixth end 5*b* of the second conductor element 5.

The circuit element 84 is, for example, an inductor. The inductance of the circuit element 84 is set, for example, to cut off a signal in the first frequency band and pass a signal in the third frequency band. In the present embodiment, the circuit element 84 forms a low pass filter that cuts off the signal in the first frequency band and passes the signal in the third frequency band.

The antenna board 1F described above can be used for manufacturing the antenna device 11F illustrated in FIG. 18 and manufacturing the antenna device 12F illustrated in FIG. 19. The antenna device 11F of FIG. 18 and the antenna device 12F of FIG. 19 can be manufactured by using the same antenna board 1F.

Then, the antenna device 11F of FIG. 18 will be described. The antenna device 11F of FIG. 18 includes the antenna board 1F (substrate 2, connection portion 3, first conductor element 4A, second conductor element 5, third conductor element 80, frequency adjusting element 43, and circuit element 84), a short circuit element 61, and a circuit element 71.

In the antenna device 11F of FIG. 18, the short circuit between the first conductor portion 41A and the second conductor portion 42 is performed in the first conductor element 4A. As a result, an electrical length of the first conductor element 4A no longer corresponds to the first frequency band, and only corresponds to the second frequency band. Accordingly, the first conductor element 4A functions as a monopole antenna for the second frequency band. The second conductor element 5 is connected to the inner side portion electrode 31 instead of the outer side portion electrode 32. Accordingly, the second conductor element 5 functions as a monopole antenna for the first frequency band. As described above, the antenna device 11F of FIG. 18 functions as the monopole antenna for both the first frequency band and the second frequency band. The third conductor element 83 is connected to the first conductor portion 41A with the circuit element 84 interposed therebetween, but the electrical length defined by the third conductor element 83 and the portion of the first conductor portion 41A between the third conductor element 83 and the inner side portion electrode 31 does not correspond to the first frequency band and the second frequency band. Accordingly, the third conductor element 83 does not prevent the antenna device 11F from functioning as the monopole antenna for the first and second frequency bands.

The antenna device 11F of FIG. 18 enables wireless communication using the monopole antenna formed by the first conductor element 4A, and wireless communication using the monopole antenna formed by the second conductor element 5 to enable the improvement of the change in the antenna characteristics caused by the frequency in a case in which the coaxial cable 9 is relatively short.

Then, the antenna device 12F of FIG. 19 will be described. The antenna device 12F of FIG. 19 includes the antenna board 1F (substrate 2, connection portion 3, first conductor element 4A, second conductor element 5, third conductor element 83, frequency adjusting element 43, and circuit element 84), an inductor 62, and a circuit element 72.

In the antenna device 12F of FIG. 19, the inductor 62 is disposed between the first conductor portion 41A and the second conductor portion 42 in the first conductor element 4A. The inductor 62 cuts off the signal in the first frequency band. As a result, since the substantial electrical length of the first conductor element 4A is determined by the length of the first conductor portion 41A, the substantial electrical length corresponds to the first frequency band. Further, the second conductor element 5 is connected to the outer side portion electrode 32 instead of the inner side portion electrode 31. Accordingly, for the first frequency band, the first conductor portion 41A is connected to a feed point, and the second conductor element 5 is connected to a ground. Therefore, the first conductor element 4A and the second conductor element 5 function as a dipole antenna for the first frequency band. On the other hand, the inductor 62 passes the signal in the second frequency band. As a result, since the substantial electrical length of the first conductor element 4A is determined by the total of the length of the first conductor portion 41A and the length of the second conductor portion 42, the substantial electrical length corresponds to the second frequency band. Accordingly, the first conductor element 4A functions as the monopole antenna for the second frequency band. As described above, the antenna device 12F of FIG. 19 functions as the dipole antenna for the first frequency band and functions as the monopole antenna for the second frequency band. Although the third conductor element 83 is connected to the first conductor portion 41A with the circuit element 84 interposed therebetween, the circuit element 84 does not pass the signal in the first frequency band. Accordingly, the third conductor element 83 does not prevent the antenna device 12F from functioning as the dipole antenna for the first frequency band. In addition, the electrical length defined by the third conductor element 83 and the portion of the first conductor portion 41A between the third conductor element 83 and the inner side portion electrode 31 does not correspond to the second frequency band. Accordingly, the third conductor element 83 does not prevent the antenna device 12F from functioning as the monopole antenna for the second frequency band.

The antenna device 12F of FIG. 19 enables wireless communication using the monopole antenna formed by the first conductor element 4A, and wireless communication using the dipole antenna formed by the first conductor element 4A and the second conductor element 5 to enable the improvement of the antenna characteristics even in a case in which the coaxial cable 9 is relatively long.

The antenna device 11F of FIG. 18 and the antenna device 12F of FIG. 19 both include the third conductor element 83. The third conductor element 83 is connected to the inner side portion electrode 31 with the circuit element 84 and the first conductor portion 41A interposed therebetween. The circuit element 84 passes the signal in the third frequency band. The electrical length defined by the third conductor element 83 and the portion of the first conductor portion 41A between the third conductor element 83 and the inner side portion electrode 31 corresponds to the quarter of the wavelength corresponding to the third frequency band. Accordingly, the third conductor element 83 functions as a monopole antenna for the third frequency band. Therefore, the antenna device 11F of FIG. 18 and the antenna device 12F of FIG. 19 enable wireless communication by the monopole antenna formed by the third conductor element 83.

1.7.2 Effects

The antenna devices (antenna devices 11F and 12F) and the antenna board 1F described above include the third conductor element 83 located on the substrate 2 and connected to the inner side portion electrode 31 with at least a part of the first conductor portion 41A interposed therebetween. The electrical length defined by the third conductor element 83 and the portion of the first conductor portion 41A between the third conductor element 83 and the inner side portion electrode 31 is different from both the total of the electrical length between the first end 41*a* and the second end 41*b* of the first conductor portion 41A and an electrical length between a third end 42*a* and a fourth end 42*b* of the second conductor portion 42, and an electrical length between a fifth end 5*a* and a sixth end 5*b* of the second conductor element 5. This configuration enables wireless communication with the monopole antenna formed by the third conductor element 83.

1.8 Embodiment 8

1.8.1 Configuration

Figure 20:
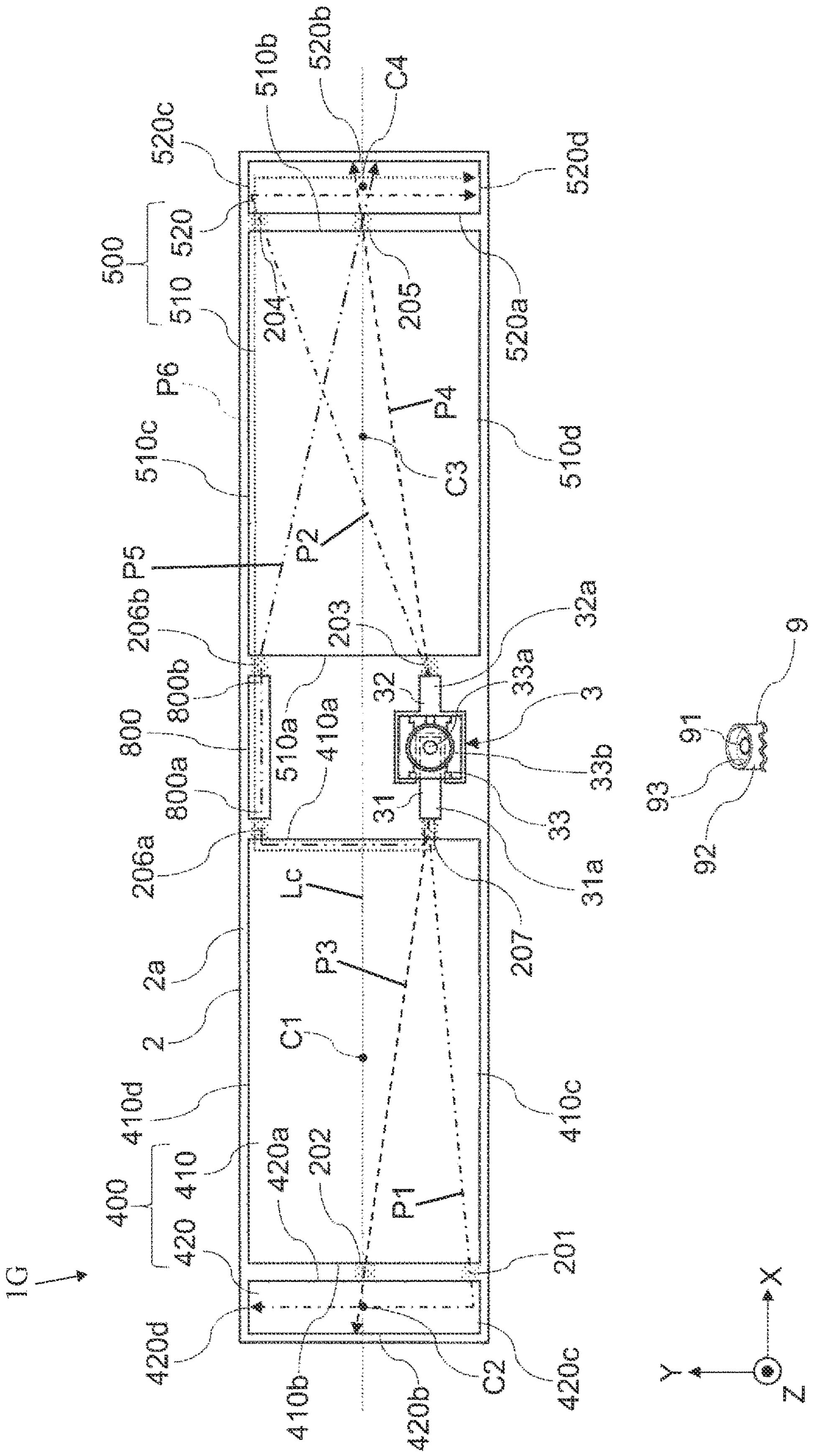
FIG. 20 is a plan view of a configuration example of an antenna board according to Embodiment 8.
Figure 21:
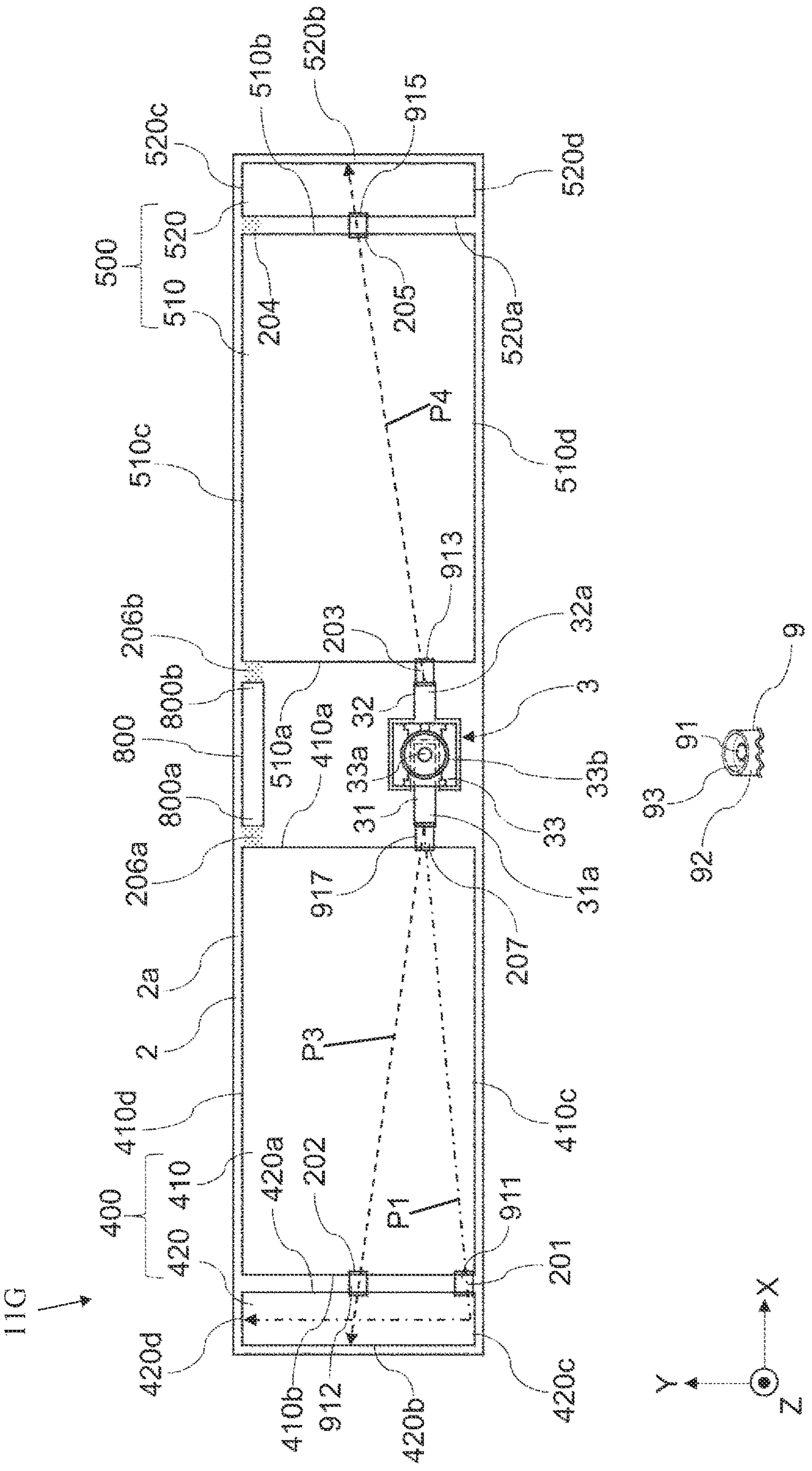
FIG. 21 is a plan view of Configuration Example 1 of an antenna device including the antenna board of FIG. 20.
Figure 22:
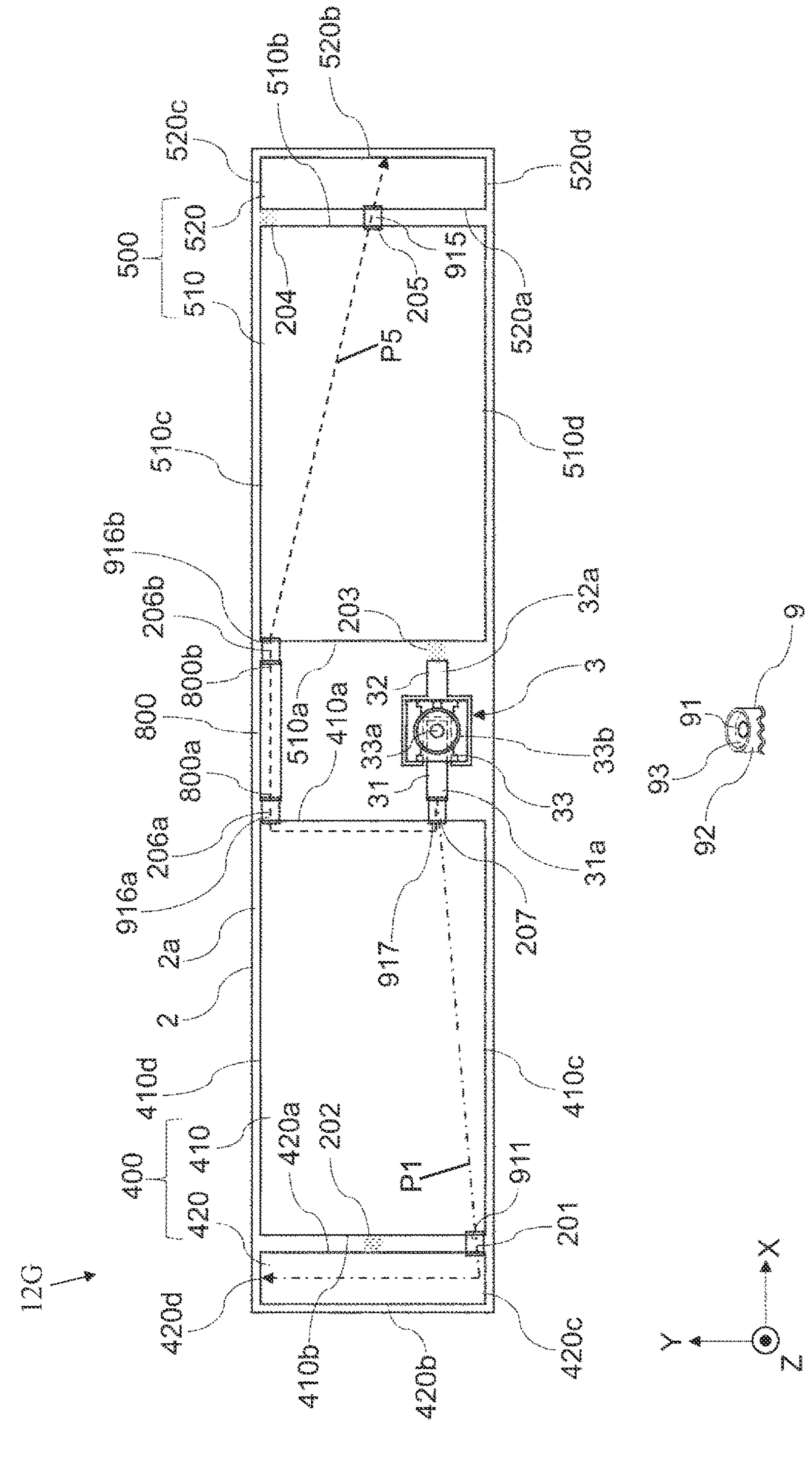
FIG. 22 is a plan view of Configuration Example 2 of the antenna device including the antenna board of FIG. 20.
Figure 23:
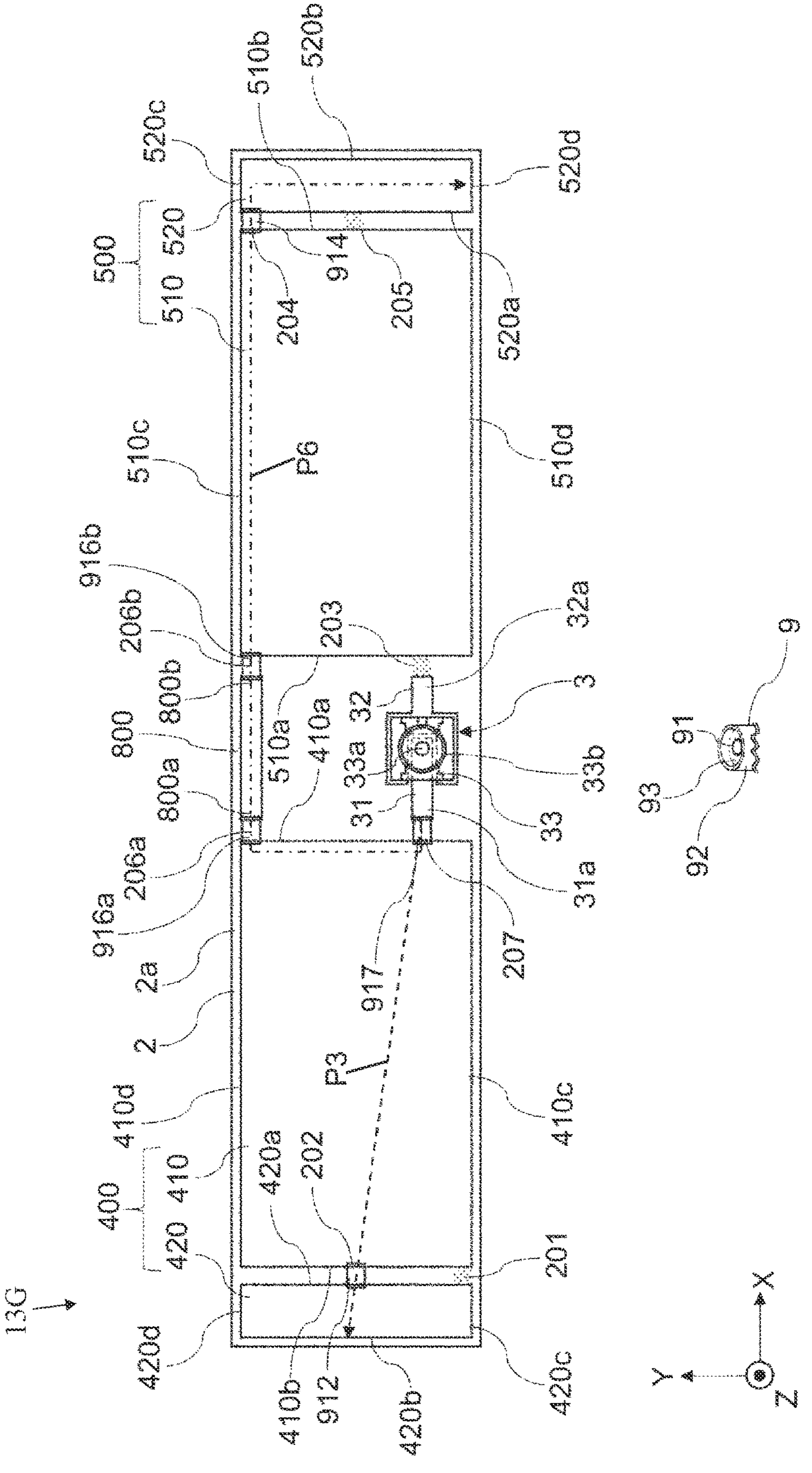
FIG. 23 is a plan view of Configuration Example 3 of the antenna device including the antenna board of FIG. 20.
Figure 24:
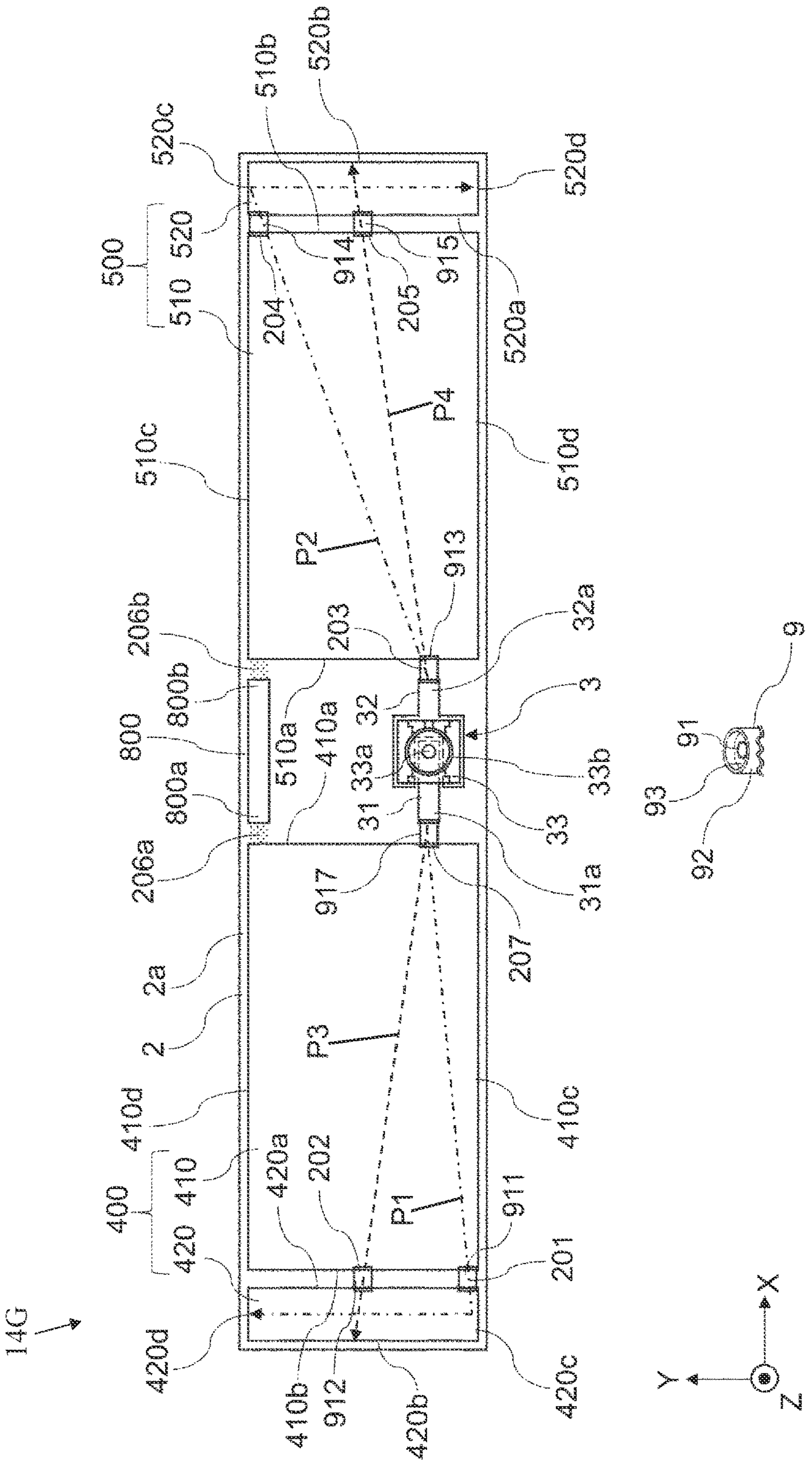
FIG. 24 is a plan view of Configuration Example 4 of the antenna device including the antenna board of FIG. 20.

FIG. 20 is a plan view of a configuration example of an antenna board 1G according to Embodiment 8. FIG. 21 is a plan view of Configuration Example 1 (hereinafter, referred to as antenna device 11G) of an antenna device including the antenna board 1G of FIG. 20. FIG. 22 is a plan view of Configuration Example 2 (hereinafter, referred to as antenna device 12G) of the antenna device including the antenna board 1G of FIG. 20. FIG. 23 is a plan view of Configuration Example 3 (hereinafter, referred to as antenna device 13G) of the antenna device including the antenna board 1G of FIG. 20. FIG. 24 is a plan view of Configuration Example 4 (hereinafter, referred to as antenna device 14G) of the antenna device including the antenna board 1G of FIG. 20.

The antenna board 1G of FIG. 20 will be described first. The antenna board 1G of FIG. 20 includes a substrate 2, a connection portion 3, a first conductor element 400, a second conductor element 500, and a third conductor element 800.

The connection portion 3, the first conductor element 400, the second conductor element 500, and the third conductor element 800 are located on the substrate 2. The first conductor element 400, the second conductor element 500, and the third conductor element 800 are located on the same surface (main surface) 2*a* of the substrate 2.

In particular, the second conductor element 500 is disposed on the substrate 2 to face the first conductor element 400. The second conductor element 500 faces the first conductor element 400 in the first direction X. With respect to the center of the substrate 2, the first conductor element 400 is on a side of a direction opposite to the first direction X, and the second conductor element 500 is on a side of the first direction X. The connection portion 3 and the third conductor element 800 are located between the first conductor element 400 and the second conductor element 500. With respect to the center of the substrate 2, the connection portion 3 is on a side of a direction opposite to the second direction Y, and the third conductor element 800 is on a side of the second direction Y. In a view seen in the first direction X, the connection portion 3 and the third conductor element 800 do not protrude outward from the first conductor element 400 or the second conductor element 500.

The connection portion 3 is located between the first conductor element 400 and the second conductor element 500. The connection portion 3 includes an inner side portion electrode 31, an outer side portion electrode 32, and a coaxial connector 33. The inner side portion electrode 31 has a first extension portion 31*a* that extends from the coaxial connector 33 in a direction opposite to the first direction X and does not overlap the coaxial connector 33 in plan view. The outer side portion electrode 32 has a second extension portion 32*a* that extends from the coaxial connector 33 in the first direction X and does not overlap the coaxial connector 33 in plan view.

The first conductor element 400 is configured to function as an antenna element. The first conductor element 400 includes a first conductor portion 410 and a second conductor portion 420. The first conductor portion 410 and the second conductor portion 420 are formed by conductor patterns formed on the main surface 2*a* of the substrate 2.

The first conductor portion 410 has a first end 410*a* and a second end 410*b*. The first end 410*a* is an end facing the second conductor element 500. The second end 410*b* is an end on an opposite side to the second conductor element 500 with respect to the first end 410*a*. In the present embodiment, the second end 410*b* faces the first end 410*a*. In the present embodiment, the first conductor portion 410 has a planar shape rather than a linear shape. The first conductor portion 410 has a rectangular shape in a view seen in the thickness direction Z. In the first conductor portion 410, the dimension in the first direction X is larger than the dimension in the second direction Y. The first end 410*a* and the second end 410*b* are two sides facing each other in the first direction X. The first conductor portion 410 has a thirteenth end 410*c* and a fourteenth end 410*d*. The thirteenth end 410*c* and the fourteenth end 410*d* are two sides facing each other in the second direction Y. The thirteenth end 410*c* is an end on a side of a direction opposite to the second direction Y, and the fourteenth end 410*d* is an end on a side of the second direction Y.

The second conductor portion 420 has a third end 420*a*, a fourth end 420*b*, a fifth end 420*c*, and a sixth end 420*d*. The third end 420*a* faces the second end 410*b* of the first conductor portion 410. In the present embodiment, the third end 420*a* is parallel to the second end 410*b*. The fourth end 420*b* faces the third end 420*a*. The fifth end 420*c* and the sixth end 420*d* are respective ends in a direction (second direction Y) along the second end 410*b*. In the present embodiment, the second conductor portion 420 has a planar shape rather than a linear shape. The second conductor portion 420 has a rectangular shape in a view seen in the thickness direction Z. In the second conductor portion 420, the dimension in the first direction X is smaller than the dimension in the second direction Y. The third end 420*a* and the fourth end 420*b* are two sides facing each other in the first direction X. The fifth end 420*c* and the sixth end 420*d* are two sides facing each other in the second direction Y. The fifth end 420*c* is an end on a side of a direction opposite to the second direction Y, and the sixth end 420*d* is an end on a side of the second direction Y.

The second conductor element 500 is configured to function as an antenna element. The second conductor element 500 includes a third conductor portion 510 and a fourth conductor portion 520. The third conductor portion 510 and the fourth conductor portion 520 are formed by conductor patterns formed on the main surface 2*a* of the substrate 2.

The third conductor portion 510 has a seventh end 510*a* and an eighth end 510*b*. The seventh end 510*a* is an end facing the first conductor element 400. The eighth end 510*b* is an end on an opposite side to the first conductor element 400 with respect to the seventh end 510*a*. In the present embodiment, the eighth end 510*b* faces the seventh end 510*a*. In the present embodiment, the third conductor portion 510 has a planar shape rather than a linear shape. The third conductor portion 510 has a rectangular shape in a view seen in the thickness direction Z. In the third conductor portion 510, the dimension in the first direction X is larger than the dimension in the second direction Y. The seventh end 510*a* and the eighth end 510*b* are two sides facing each other in the first direction X. The third conductor portion 510 has a fifteenth end 510*c* and a sixteenth end 510*d*. The fifteenth end 510*c* and the sixteenth end 510*d* are two sides facing each other in the second direction Y. The fifteenth end 510*c* is an end on a side of the second direction Y, and the sixteenth end 510*d* is an end on a side of a direction opposite to the second direction Y.

The fourth conductor portion 520 has a ninth end 520*a*, a tenth end 520*b*, an eleventh end 520*c* and a twelfth end 520*d*. The ninth end 520*a* faces the eighth end 510*b* of the third conductor portion 510. In the present embodiment, the ninth end 520*a* is parallel to the eighth end 510*b*. The tenth end 520*b* faces the ninth end 520*a*. The eleventh end 520*c* and the twelfth end 520*d* are respective ends in a direction (second direction Y) along the eighth end 510*b*. In the present embodiment, the fourth conductor portion 520 has a planar shape rather than a linear shape. The fourth conductor portion 520 has a rectangular shape in a view seen in the thickness direction Z. In the fourth conductor portion 520, the dimension in the first direction X is smaller than the dimension in the second direction Y. The ninth end 520*a* and the tenth end 520*b* are two sides facing each other in the first direction X. The eleventh end 520*c* and the twelfth end 520*d* are two sides facing each other in the second direction Y. The eleventh end 520*c* is an end on a side of the second direction Y, and the twelfth end 520*d* is an end on a side of a direction opposite to the second direction Y.

In the present embodiment, the first conductor portion 410 and the third conductor portion 510 have the same shape in a view seen in the thickness direction Z. The second conductor portion 420 and the fourth conductor portion 520 have the same shape in a view seen in the thickness direction Z. Centers C1 to C4 of the first to fourth conductor portions 410, 420, 510, and 520 are aligned with each other along the first direction X. The first to fourth conductor portions 410, 420, 510, and 520 have shapes symmetrical with respect to a straight line along the first direction X.

The third conductor element 800 is used for connecting the first conductor element 400 and the second conductor element 500. In the present embodiment, the third conductor element 800 has a seventeenth end 800*a* and an eighteenth end 800*b*. The third conductor element 800 has a linear shape extending in the first direction X. The seventeenth end 800*a* is an end on a side of the first conductor portion 410, and the eighteenth end 800*b* is an end on a side of the third conductor portion 510.

The connection portion 3, the first conductor element 400, the second conductor element 500, and the third conductor element 600 are disposed on the substrate 2 such that first to seventh mounting regions 201 to 205, 206*a*, 206*b*, and 207 are present. In FIG. 20, the first to seventh mounting regions 201 to 205, 206*a*, 206*b*, and 207 are indicated by hatching dots. The first to seventh mounting regions 201 to 205, 206*a*, 206*b*, and 207 are regions reserved to enable the disposition of the circuit component. The circuit component can be used for connecting the conductors. The circuit component can include, for example, at least one of a circuit element, such as a chip component, and a conductor pattern. The sizes of the first to seventh mounting regions 201 to 205, 206*a*, 206*b*, and 207 are set as appropriate depending on the sizes of the circuit components scheduled to be disposed in the first to seventh mounting regions 201 to 205, 206*a*, 206*b*, and 207.

The second conductor portion 420 is disposed on the substrate 2 such that the first mounting region 201 and the second mounting region 202 on a side of the sixth end 420*d* with respect to the first mounting region 201 are present between the second end 410*b* and the third end 420*a*. The first and second mounting regions 201 and 202 are arranged in the direction (second direction Y) along the second end 410*b*. In the present embodiment, the first mounting region 201 is located at the fifth end 420*c* in the second direction Y. In the present embodiment, the second mounting region 202 is located at the center of the second conductor portion 420 in the second direction Y. In a state in which no circuit component is disposed in both the first and second mounting regions 201 and 202, the first conductor portion 410 and the second conductor portion 420 are not electrically connected.

The third conductor portion 510 is disposed on the substrate 2 such that the third mounting region 203 is present between the seventh end 510*a* and the second extension portion 32*a* of the outer side portion electrode 32. In a state in which no circuit component is disposed in the third mounting region 203, the third conductor portion 510 and the outer side portion electrode 32 are not electrically connected.

The fourth conductor portion 520 is disposed on the substrate 2 such that the fourth mounting region 204 and the fifth mounting region 205 on a side of the twelfth end 520*d* with respect to the fourth mounting region 204 are present between the eighth end 510*b* and the ninth end 520*a*. The fourth and fifth mounting regions 204 and 205 are arranged in the direction (second direction Y) along the eighth end 510*b*. In the present embodiment, the fourth mounting region 204 is located at the eleventh end 520*c* in the second direction Y. In the present embodiment, the fifth mounting region 205 is located at the center of the fourth conductor portion 520 in the second direction Y. In a state in which no circuit component is disposed in both the fourth and fifth mounting regions 204 and 205, the third conductor portion 510 and the fourth conductor portion 520 are not electrically connected.

In the present embodiment, the first mounting region 201 and the fourth mounting region 204 are located on opposite sides with respect to a straight line Lc connecting the center C1 of the first conductor portion 410 and the center C3 of the third conductor portion 510. In the present embodiment, the second mounting region 202 and the fifth mounting region 205 are located on the straight line Lc connecting the center C1 of the first conductor portion 410 and the center C3 of the third conductor portion 510.

The antenna board 1G is configured to perform wireless communication in two frequency bands. The two frequency bands are a first frequency band and a second frequency band lower than the first frequency band, for example. Examples of the first frequency band include a frequency band around 5 GHz (for example, 5.15 GHz to 5.80 GHz). Examples of the second frequency band include a frequency band around 2.4 GHz (for example, 2.40 GHz to 2.50 GHz).

The antenna board 1 defines a plurality of paths to enable wireless communication in the two frequency bands. The plurality of paths includes first to sixth paths P1 to P6.

The first path P1 and the third path P3 are formed by using the first conductor element 400. The first path P1 is a path connecting the inner side portion electrode 31, the first mounting region 201, and the sixth end 420*d*. The third path P3 is a path connecting the inner side portion electrode 31, the second mounting region 202, and the fourth end 420*b*. In the present embodiment, since the seventh mounting region 207 is present between the inner side portion electrode 31 and the first conductor portion 410, the first path P1 is a path connecting the seventh mounting region 207, the first mounting region 201, and the sixth end 420*d*. Similarly, the third path P3 is also a path connecting the seventh mounting region 207, the second mounting region 202, and the fourth end 420*b*. The first path P1 can be used by disposing the circuit components in the first and seventh mounting regions 201 and 207. The third path P3 can be used by disposing the circuit components in the second and seventh mounting regions 202 and 207.

The second path P2 and the fourth path P4 are formed by using the second conductor element 500. The second path P2 is a path connecting the third mounting region 203, the fourth mounting region 204, and the twelfth end 520*d*. The fourth path P4 is a path connecting the third mounting region 203, the fifth mounting region 205, and the tenth end 520*b*. The second path P2 can be used by disposing the circuit components in the third and fourth mounting regions 203 and 204 and not disposing the circuit components in the sixth mounting regions 206*a* and 206*b*. The fourth path P4 can be used by disposing the circuit components in the third and fifth mounting regions 203 and 205 and not disposing the circuit components in the sixth mounting regions 206*a* and 206*b*.

The fifth path P5 and the sixth path P6 are formed by using the first conductor element 400, the second conductor element 500, and the third conductor element 600. The fifth path P5 is a path connecting the inner side portion electrode 31, the third conductor element 800, the fifth mounting region 205, and the tenth end 520*b*. The sixth path P6 is a path connecting the inner side portion electrode 31, the third conductor element 800, the fourth mounting region 204, and the twelfth end 520*d*. In the present embodiment, since the seventh mounting region 207 is present between the inner side portion electrode 31 and the first conductor portion 410, the fifth path P5 is also a path connecting the seventh mounting region 207, the third conductor element 800, the fifth mounting region 205, and the tenth end 520*b*. The sixth path P6 is also a path connecting the seventh mounting region 207, the third conductor element 800, the fourth mounting region 204, and the twelfth end 520*d*. The fifth path P5 can be used by disposing the circuit components in the fifth, sixth, and seventh mounting regions 205, 206*a*, 206*b*, and 207 and not disposing the circuit components in the third mounting region 203. The sixth path P6 can be used by disposing the circuit components in the fourth, sixth, and seventh mounting regions 204, 206*a*, 206*b*, and 207 and not disposing the circuit components in the third mounting region 203.

The first to sixth paths P1 to P6 have relationships described below. An electrical length of the first path P1 is equal to an electrical length of the second path P2. An electrical length of the third path P3 is equal to an electrical length of the fourth path P4. The electrical lengths of the first path 1P1 and the second path P2 are longer than the electrical lengths of the third path P3 and the fourth path P4. In the present embodiment, the electrical lengths of the first path P1 and the second path P2 correspond to a quarter of a wavelength corresponding to the second frequency band. The electrical lengths of the third path P3 and the fourth path P4 correspond to a quarter of a wavelength corresponding to the first frequency band. The fifth path P5 and the third path P3 include a common resonant frequency band. Although the fifth path P5 is longer than the quarter of the wavelength corresponding to the first frequency band, since the second conductor element 500 has a planar shape, a band width of the resonant frequency is widened, and the fifth path P5 can also correspond to the first frequency band. Therefore, the fifth path P5 corresponds to the first frequency band. The sixth path P6 and the first path P1 include a common resonant frequency band. Therefore, the sixth path P6 corresponds to the second frequency band.

The antenna board 1G described above can be used for manufacturing the antenna devices 11G to 14G respectively illustrated in FIGS. 21 to 24. The antenna devices 11G to 14G can be manufactured by using the same antenna board 1G.

Then, the antenna device 11G will be described. The antenna device 11G includes the antenna board 1G (substrate 2, connection portion 3, first conductor element 400, second conductor element 500, and third conductor element 800), an inductor 911, a capacitor 912, a short circuit element 913, a capacitor 915, and a frequency adjusting element 917.

The frequency adjusting element 917 is located in the seventh mounting region 207, and connects the first end 410*a* and the inner side portion electrode 31. The frequency adjusting element 917 is the same as the frequency adjusting element 43.

The inductor 911 is located in the first mounting region 201, and connects the second end 410*b* and the third end 420*a*. In the present embodiment, the inductor 911 forms a low pass filter that cuts off a signal in the first frequency band and passes a signal in the second frequency band. A circuit element forming the low pass filter together with the inductor 911 may be disposed in the first mounting region 201.

The capacitor 912 is located in the second mounting region 202, and connects the second end 410*b* and the third end 420*a*. In the present embodiment, the capacitor 912 forms a high pass filter that cuts off the signal in the second frequency band and passes the signal in the first frequency band. A circuit element forming the high pass filter together with the capacitor 912 may be disposed in the second mounting region 202.

The short circuit element 913 is located in the third mounting region 203, and connects the seventh end 510*a* and the outer side portion electrode 32. The short circuit element 913 is, for example, a resistance element (resistor) of 0Ω. The short circuit element 913 is not limited to the resistance element of 0Ω, and may be solder, a conductor pattern, a conductive adhesive, or the like as long as the short circuit between the seventh end 510*a* and the outer side portion electrode 32 can be performed.

The capacitor 915 is located in the fifth mounting region 205, and connects the eighth end 510*b* and the ninth end 520*a*. In the present embodiment, the capacitor 915 forms a high pass filter that cuts off the signal in the second frequency band and passes the signal in the first frequency band. A circuit element forming the high pass filter together with the capacitor 915 may be disposed in the fifth mounting region 205.

In the antenna device 11G, no circuit component is disposed in the fourth mounting region 204 and the sixth mounting regions 206*a* and 206*b*. In the first conductor element 400, the first conductor portion 410 is connected to the second conductor portion 420 at the first and second mounting regions 201 and 202. In the second conductor element 500, the third conductor portion 510 is connected to the fourth conductor portion 520 in the fifth mounting region 205, but not connected to the fourth conductor portion 520 in the fourth mounting region 204. The third conductor element 800 does not connect the first conductor element 400 and the second conductor element 500.

Therefore, in the antenna device 11G, the first path P1, the third path P3, and the fourth path P4 can be used. The first path P1 and the third path P3 are connected to a feed point (inner side portion electrode 31), and the fourth path P4 is connected to a ground (outer side portion electrode 32). The electrical lengths of the third path P3 and the fourth path P4 are equal to each other. As described above, the antenna device 11G enables wireless communication using a monopole antenna defined by the first path P1, and wireless communication using a dipole antenna defined by the third path P3 and the fourth path P4. That is, the antenna device 11G functions as the dipole antenna for the first frequency band, and functions as the monopole antenna for the second frequency band.

Then, the antenna device 12G will be described. The antenna device 12G includes the antenna board 1G (substrate 2, connection portion 3, first conductor element 400, second conductor element 500, and third conductor element 800), an inductor 911, a capacitor 915, circuit elements 916*a* and 916*b*, and a frequency adjusting element 917.

The circuit element 916*a* is located in the sixth mounting region 206*a*, and connects the first conductor portion 410 and the third conductor element 800. The circuit element 916*b* is located in the sixth mounting region 206*b*, and connects the third conductor portion 510 and the third conductor element 800. The circuit elements 916*a* and 916*b* are short circuit elements. The short circuit element is, for example, a resistance element (resistor) of 0Ω. The short circuit element is not limited to the resistance element of 0Ω, and may be solder, a conductor pattern, a conductive adhesive, or the like as long as the short circuit between the seventh end 510*a* and the outer side portion electrode 32 can be performed. The circuit elements 916*a* and 916*b* may include, for example, one or more inductors or one or more capacitors. The circuit elements 916*a* and 916*b* can be used for adjusting the resonant frequency of the fifth path P5 or the sixth path P6.

In the antenna device 12G, no circuit component is disposed in the second mounting region 202, the third mounting region 203, and the fourth mounting region 204. In the first conductor element 400, the first conductor portion 410 is connected to the second conductor portion 420 in the first mounting region 201, but not connected to the second conductor portion 420 in the second mounting region 202. In the second conductor element 500, the third conductor portion 510 is connected to the fourth conductor portion 520 in the fifth mounting region 205, but not connected to the fourth conductor portion 520 in the fourth mounting region 204. The second conductor element 500 is not connected to the outer side portion electrode 32, but connected to the inner side portion electrode 31 with the third conductor element 800 and the first conductor portion 410 interposed therebetween.

Therefore, in the antenna device 12G, the first path P1 and the fifth path P5 can be used. The first path P1 and the fifth path P5 are connected to the feed point (inner side portion electrode 31). The outer side portion conductor of the coaxial cable 9 functions as the ground for the first path P1 and the fifth path P5. As described above, the antenna device 12G enables wireless communication corresponding to the second frequency band using the monopole antenna defined by the first path P1, and wireless communication corresponding to the first frequency band using the monopole antenna defined by the fifth path P5. That is, the antenna device 12G functions as the monopole antenna for both the first frequency band and the second frequency band.

Then, the antenna device 13G will be described. The antenna device 13G includes the antenna board 1G (substrate 2, connection portion 3, first conductor element 400, second conductor element 500, and third conductor element 800), a capacitor 912, an inductor 914, circuit elements 916*a* and 916*b*, and a frequency adjusting element 917.

The inductor 914 is located in the fourth mounting region 204, and connects the eighth end 510*b* and the ninth end 520*a*. In the present embodiment, the inductor 914 forms a low pass filter that cuts off a signal in the first frequency band and passes a signal in the second frequency band. A circuit element forming the low pass filter together with the inductor 914 may be disposed in the fourth mounting region 204.

In the antenna device 13G, no circuit component is disposed in the first mounting region 201, the third mounting region 203, and the fifth mounting region 205. In the first conductor element 400, the first conductor portion 410 is connected to the second conductor portion 420 in the second mounting region 202, but not connected to the second conductor portion 420 in the first mounting region 201. In the second conductor element 500, the third conductor portion 510 is connected to the fourth conductor portion 520 in the fourth mounting region 204, but not connected to the fourth conductor portion 520 in the fifth mounting region 205. The second conductor element 500 is not connected to the outer side portion electrode 32, but connected to the inner side portion electrode 31 with the third conductor element 800 and the first conductor portion 410 interposed therebetween.

Therefore, in the antenna device 13G, the third path P3 and the sixth path P6 can be used. The third path P3 and the sixth path P6 are connected to the feed point (inner side portion electrode 31). The outer side portion conductor of the coaxial cable 9 functions as the ground for the third path P3 and the sixth path P6. As described above, the antenna device 13G enables wireless communication corresponding to the first frequency band using the monopole antenna defined by the third path P3, and wireless communication corresponding to the second frequency band using the monopole antenna defined by the sixth path P6. That is, the antenna device 13G functions as the monopole antenna for both the first frequency band and the second frequency band.

Then, the antenna device 14G will be described. The antenna device 14G includes the antenna board 1G (substrate 2, connection portion 3, first conductor element 400, second conductor element 500, and third conductor element 800), an inductor 911, a capacitor 912, a short circuit element 913, an inductor 914, a capacitor 915, and a frequency adjusting element 917.

In the antenna device 14G, no circuit component is disposed in the sixth mounting regions 206*a* and 206*b*. In the first conductor element 400, the first conductor portion 410 is connected to the second conductor portion 420 at the first and second mounting regions 201 and 202. In the second conductor element 500, the third conductor portion 510 is connected to the fourth conductor portion 520 at the fourth and fifth mounting regions 204 and 205. The third conductor element 800 does not connect the first conductor element 400 and the second conductor element 500.

Therefore, in the antenna device 14G, the first path P1, the second path P2, the third path P3, and the fourth path P4 can be used. The first path P1 and the third path P3 are connected to the feed point (inner side portion electrode 31), and the second path P2 and the fourth path P4 are connected to the ground (outer side portion electrode 32). The electrical lengths of the first path P1 and the second path P2 are equal to each other, and the electrical lengths of the third path P3 and the fourth path P4 are equal to each other. As described above, the antenna device 14G enables wireless communication corresponding to the second frequency band using the dipole antenna defined by the first path P1 and the second path P2, and wireless communication corresponding to the first frequency band using the dipole antenna defined by the third path P3 and the fourth path P4. That is, the antenna device 14G functions as the dipole antenna for both the first frequency band and the second frequency band.

Tables 3 and 4 below summarize the configurations of the antenna devices 11G to 14G that can be manufactured by using the antenna board 1G.

TABLE 3

| Mounting region | Antenna device 11G | Antenna device 12G | Antenna device 13G | Antenna device 14G |
|---|---|---|---|---|
| First | Inductor | Inductor | None | Inductor |
| Second | Capacitor | None | Capacitor | Capacitor |
| Third | Short circuit | None | None | Short circuit |
| Fourth | None | None | Inductor | Inductor |
| Fifth | Capacitor | Capacitor | None | Capacitor |
| Sixth | None | Short circuit | Short circuit | None |
| Seventh | Frequency adjusting element | Frequency adjusting element | Frequency adjusting element | Frequency adjusting element |

TABLE 4

| Frequency | Antenna device 11G | Antenna device 12G | Antenna device 13G | Antenna device 14G |
|---|---|---|---|---|
| First | Dipole | Monopole | Monopole | Dipole |
| Second | Monopole | Monopole | Monopole | Dipole |

Therefore, with the antenna board 1G, it is possible to manufacture an antenna device having an appropriate combination of antennas depending on the external environment.

As the combination, there is also a case in which the inductor 911 is disposed in the first mounting region 201, the capacitor 912 is disposed in the second mounting region 202, the short circuit element 913 is disposed in the third mounting region 203, the inductor 914 is disposed in the fourth mounting region 204, the frequency adjusting element 917 is disposed in the seventh mounting region 207, and no circuit component is disposed in the fifth mounting region 205 and the sixth mounting regions 206*a* and 206*b*. In this case, the first path P1, the second path P2, and the third path P3 can be used. The antenna device in this case enables wireless communication corresponding to the second frequency band using the dipole antenna defined by the first path P1 and the second path P2, and wireless communication corresponding to the first frequency band using the monopole antenna defined by the third path P3.

1.8.2 Effects

The antenna devices (antenna devices 11G, 12G, 13G, and 14G) described above include the substrate 2, the connection portion 3 located on the substrate 2 and having the inner side portion electrode 31 and the outer side portion electrode 32 that are respectively connected to the inner side portion conductor 91 and the outer side portion conductor 92 of the coaxial cable 9, the first conductor element 400 located on the substrate 2, and the second conductor element 500 disposed on the substrate 2 to face the first conductor element 400. The first conductor element 400 includes the first conductor portion 410 having the first end 410*a* facing the second conductor element 500 and the second end 410*b* on an opposite side to the second conductor element 500 with respect to the first end 410*a*, and connected to the inner side portion electrode 31 at the first end 410*a*, and the second conductor portion 420 having the third end 420*a* facing the second end 410*b*, the fourth end 420*b* facing the third end 420*a*, and the fifth end 420*c* and the sixth end 420*d* that are respective ends in a direction along the second end 410*b*, and disposed such that the first mounting region 201 and the second mounting region 202 on a side of the sixth end 420*d* with respect to the first mounting region 201 are present between the second end 410*b* and the second conductor portion 420. The second conductor element 500 includes the third conductor portion 510 having the seventh end 510*a* facing the first conductor element 400 and the eighth end 510*b* on an opposite side to the first conductor element 400 with respect to the seventh end 510*a*, and disposed such that the third mounting region 203 is present between the seventh end 510*a* and the outer side portion electrode 32, and the fourth conductor portion 520 having the ninth end 520*a* facing the eighth end 510*b*, the tenth end 520*b* facing the ninth end 520*a*, and the eleventh end 520*c* and the twelfth end 520*d* that are respective ends in a direction along the eighth end 510*b*, and disposed such that the fourth mounting region 204 and the fifth mounting region 205 on a side of the twelfth end with respect to the fourth mounting region 204 are present between the eighth end 510*b* and the fourth conductor portion 520. The electrical length of the first path P1 connecting the inner side portion electrode 31, the first mounting region 201, and the sixth end 420*d* is equal to the electrical length of the second path P2 connecting the third mounting region 203, the fourth mounting region 204, and the twelfth end 520*d*. The electrical length of the third path P3 connecting the inner side portion electrode 31, the second mounting region 202, and the fourth end 420*b* is equal to the electrical length of the fourth path P4 connecting the third mounting region 203, the fifth mounting region 205, and the tenth end 520*b*. This aspect enables the improvement of the change in the antenna characteristics caused by the change in the external environment.

In the antenna devices (antenna devices 11G, 12G, 13G, and 14G), the first mounting region 201 and the fourth mounting region 204 are located on opposite sides with respect to the straight line Lc connecting the center C1 of the first conductor portion 410 and the center C3 of the third conductor portion 510. This aspect enables the improvement of the antenna efficiency.

The antenna devices (antenna devices 11G, 12G, 13G, and 14G) further include the third conductor element 800 disposed on the substrate 2 such that the sixth mounting regions 206*a* and 206*b* are present between at least one of the first conductor portion 410 or the third conductor portion 510 and the third conductor element 800. This aspect enables the improvement of the change in the antenna characteristics caused by the change in the external environment.

In the antenna devices (antenna devices 11G, 12G, 13G, and 14G), the third conductor element 800 is disposed such that the sixth mounting regions 206*a* and 206*b* are respectively present between the first conductor portion 410 and the third conductor element 800 and between the third conductor portion 510 and the third conductor element 800. This aspect enables the improvement of the change in the antenna characteristics caused by the change in the external environment.

In the antenna devices (antenna devices 11G, 12G, 13G, 14G), the fifth path P5 connecting the inner side portion electrode 31, the third conductor element 800, the fifth mounting region 205, and the tenth end 520*b*, and the third path P3 include the common resonant frequency band. The sixth path P6 connecting the inner side portion electrode 31, the third conductor element 800, the fourth mounting region 204, and the twelfth end 520*d*, and the first path P1 include the common resonant frequency band. This aspect enables the improvement of the change in the antenna characteristics caused by the change in the external environment.

The antenna board 1G described above includes the substrate 2, the connection portion 3 located on the substrate 2 and having the inner side portion electrode 31 and the outer side portion electrode 32 that are respectively connected to the inner side portion conductor 91 and the outer side portion conductor 92 of the coaxial cable 9, the first conductor element 400 located on the substrate 2, and the second conductor element 500 disposed on the substrate 2 to face the first conductor element 400. The first conductor element 400 includes the first conductor portion 410 having the first end 410*a* facing the second conductor element 500 and the second end 410*b* on an opposite side to the second conductor element 500 with respect to the first end 410*a*, and connected to the inner side portion electrode 31 at the first end 410*a*, and the second conductor portion 420 having the third end 420*a* facing the second end 410*b*, the fourth end 420*b* facing the third end 420*a*, and the fifth end 420*c* and the sixth end 420*d* that are respective ends in a direction along the second end 410*b*, and disposed such that the first mounting region 201 and the second mounting region 202 on a side of the sixth end 420*d* with respect to the first mounting region 201 are present between the second end 410*b* and the second conductor portion 420. The second conductor element 500 includes the third conductor portion 510 having the seventh end 510*a* facing the first conductor element 400 and the eighth end 510*b* on an opposite side to the first conductor element 400 with respect to the seventh end 510*a*, and disposed such that the third mounting region 203 is present between the seventh end 510*a* and the outer side portion electrode 32, and the fourth conductor portion 520 having the ninth end 520*a* facing the eighth end 510*b*, the tenth end 520*b* facing the ninth end 520*a*, and the eleventh end 520*c* and the twelfth end 520*d* that are respective ends in a direction along the eighth end 510*b*, and disposed such that the fourth mounting region 204 and the fifth mounting region 205 on a side of the twelfth end with respect to the fourth mounting region 204 are present between the eighth end 510*b* and the fourth conductor portion 520. The electrical length of the first path P1 connecting the inner side portion electrode 31, the first mounting region 201, and the sixth end 420*d* is equal to the electrical length of the second path P2 connecting the third mounting region 203, the fourth mounting region 204, and the twelfth end 520*d*. The electrical length of the third path P3 connecting the inner side portion electrode 31, the second mounting region 202, and the fourth end 420*b* is equal to the electrical length of the fourth path P4 connecting the third mounting region 203, the fifth mounting region 205, and the tenth end 520*b*. This aspect enables the improvement of the change in the antenna characteristics caused by the change in the external environment.

2. Modification Example

The embodiment of the present disclosure is not limited to the embodiments described above. The embodiments described above can be modified in various ways depending on the design. Modification examples of the embodiments described above are listed below. Modification examples described below can be applied in combination as appropriate.

Hereinafter, the reference numerals used in Embodiment 1 will be referred even in a case in which the following description can also be applied to any of Embodiments 1 to 8, but this reference is merely for simplifying the description, and is not meant to exclude application to Embodiments 2 to 8.

In one modification example, the first frequency band and the second frequency band are not particularly limited. The first frequency band and the second frequency band may be selected from among well-known frequency bands, such as a frequency band of wireless communication using UWB, a frequency band of Bluetooth (registered trademark), a frequency band of wireless communication using Wi-Fi, a mid-band of a second generation mobile communication (2G) standard, a low-band of a fourth generation mobile communication (4G) standard, and a low-band of a fifth generation mobile communication (5G) standard. The 2G standard is, for example, a global system for mobile communications (GSM) (registered trademark) standard. The 4G standard is, for example, a 3GPP (registered trademark) long term evolution (LTE) standard. The 5G standard is, for example, 5G new radio (NR). The first and second frequency bands may be selected from among frequency bands used for various communication standards such as wireless LAN, specified low power radio, and short-range wireless communication. This point is also applied to the third frequency band.

In one modification example, the configuration of the substrate 2 is not always limited. For example, the shape of the substrate 2 is not limited to a rectangular plate shape. The substrate 2 may have a well-known configuration such as a double-sided copper-clad laminate or a multilayer substrate. As an example, in Embodiment 1, the substrate 2 may include a plurality of dielectric layers, and the first conductor element 4 and the second conductor element 5 may be located in different dielectric layers.

In one modification example, the configuration of the connection portion 3 is not always limited. For example, the connection portion 3 does not have to include the coaxial connector 33.

In one modification example, the shapes and the dimensions of the first conductor element 4 and the second conductor element 5 may be changed as appropriate. As an example, at least one of the first conductor portion 41 and the second conductor portion 42 may have a bent shape. This configuration can reduce the length of the substrate 2 as compared to a case in which both the first conductor portion 41 and the second conductor portion 42 have a linear shape. In Embodiments 6 and 7, the first conductor element 4 or the first conductor element 4D may be used instead of the first conductor element 4A, or the second conductor element 5D may be used instead of the second conductor element 5. The first conductor portion 41 and the second conductor portion 42 of the first conductor element 4 may be formed only by the conductor patterns, or may include an element, such as an inductor or a capacitor, which adjusts the electrical length. In a case in which the first conductor portion 41 or the second conductor portion 42 is formed only by the conductor patterns, the electrical length of the first conductor portion 41 or the second conductor portion 42 is substantially equal to its physical length. The second conductor element 5 may be formed only by the conductor patterns, or may include an element, such as an inductor or a capacitor, which adjusts the electrical length. In a case in which the second conductor element 5 is formed only by the conductor patterns, the electrical length of the second conductor element is substantially equal to its physical length.

In one modification example, the circuit element 71 may be the short circuit element. The short circuit element may be, for example, a resistance element (resistor) of 0Ω. The short circuit element is not limited to the resistance element of 0Ω, and may be solder, a conductor pattern, a conductive adhesive, or the like as long as the short circuit can be performed.

In one modification example, the circuit element 72 may include one or more inductors or one or more capacitors. In this case, the circuit element 72 can be used for adjusting the resonant frequency of the second conductor element 5.

In one modification example, the third conductor elements 80 and 83 are not limited to have a bent shape, and may have a linear shape. The third conductor elements 80 and 83 may be formed only by the conductor patterns, or may include an element, such as an inductor or a capacitor, which adjusts the electrical length.

In one modification example, the fourth conductor element 81 is not limited to have a linear shape, and may have a bent shape. The fourth conductor element 81 may be formed only by the conductor patterns, or may include an element, such as an inductor or a capacitor, which adjusts the electrical length.

In one modification example, the circuit element 82 is not particularly limited. The circuit element 82 needs only be set to enable wireless communication by the dipole antenna formed by the third conductor element 80 and the fourth conductor element 81.

In one modification example, the circuit element 84 is not particularly limited. The circuit element 84 needs only be set to enable wireless communication with the monopole antenna formed by the third conductor element 83.

In one modification example, the second end 410*b* is one side of the first conductor portion 410 in the first direction X, and faces the first end 410*a*. The second end 410*b* need only be on an opposite side to the second conductor element 500 with respect to the first end 410*a*, and may be one side (corresponding to thirteenth end 410*c* or fourteenth end 410*d*) of the first conductor portion 410 in the second direction Y. That is, the second conductor portion 420 may be disposed adjacent to the first conductor portion 410 in the second direction Y instead of the first direction X. Similarly, the eighth end 510*b* need only be on an opposite side to the first conductor element 400 with respect to the seventh end 510*a*, and may be one side (corresponding to fifteenth end 510*c* or sixteenth end 510*d*) of the third conductor portion 510 in the second direction Y.

In one modification example, the first mounting region 201 and the second mounting region 202 need only be arranged such that different paths in the direction along the second end 420*b* can be defined, and are not limited to have the positions described in Embodiment 8. This configuration is the same for the fourth mounting region 204 and the fifth mounting region 205 as well.

In one modification example, the seventh mounting region 207 of Embodiment 8 is optional. The first conductor portion 410 of the first conductor element 400 may be continuously and integrally connected to the inner side portion electrode 31.

In one modification example, the shape of the third conductor element 800 of Embodiment 8 is not particularly limited. The third conductor element 800 may have a bent shape such as a meandering shape. The third conductor element 800 does not always have to be located between the first conductor element 400 and the second conductor element 500. The third conductor element 800 may be connectable to any of the second end 410*b*, the thirteenth end 410*c*, or the fourteenth end 410*d* instead of the first end 410*a* of the first conductor element 400. The third conductor element 800 may be connectable to any of the eighth end 510*b*, the fifteenth end 510*c*, or the sixteenth end 510*d* instead of the seventh end 510*a* of the second conductor element 500.

3. Aspect

As is clear from the embodiments and the modification examples described above, the present disclosure includes the following aspects. Hereinafter, the reference numerals are attached with parentheses only for clarifying the correspondence relationship with the embodiments. In consideration of the readability of the text, the description of the reference numerals in parentheses may be omitted from the second time onwards.

A first aspect relates to an antenna device (11, 12; 11A, 12A; 10B; 11C, 12C; 11D, 12D; 11E, 12E; 11F, 12F) including a substrate (2), a connection portion (3) located on the substrate (2) and having an inner side portion electrode (31) and an outer side portion electrode (32) that are respectively connected to an inner side portion conductor (91) and an outer side portion conductor (92) of a coaxial cable (9), a first conductor element (4; 4A to 4D) located on the substrate (2), and a second conductor element (5; 5D) located on the substrate (2). The first conductor element (4; 4A to 4D) includes a first conductor portion (41; 41A) having a first end (41*a*) and a second end (41*b*) and connected to the inner side portion electrode (31) at the first end (41*a*), and A second conductor portion (42; 42B; 42C; 42D) having a third end (42*a*) and a fourth end (42*b*) and disposed such that a first mounting region (21; 21B) is present between the second end (41*b*) and the third end (42*a*). The second conductor element (5; 5D) has a fifth end (5*a*) and a sixth end (5*b*) and is disposed such that a second mounting region (22) is present between the fifth end (5*a*) and the inner side portion electrode (31) and a third mounting region (23) is present between the fifth end (5*a*) and the outer side portion electrode (32). An electrical length between the first end (41*a*) and the second end (41*b*) of the first conductor portion (41; 41A) is equal to an electrical length between the fifth end (5*a*) and the sixth end (5*b*) of the second conductor element (5; 5D). This aspect enables the improvement of the change in the antenna characteristics caused by the change in the external environment.

A second aspect relates to the antenna device (11; 11A; 11C; 11D; 11E; 11F) according to the first aspect. In this aspect, the antenna device (11; 11A; 11C; 11D; 11E; 11F) further includes a short circuit element (61) located in the first mounting region (21) and connecting the second end (41*b*) and the third end (42*a*), and a circuit element (71) located in the second mounting region (22) and connecting the fifth end (5*a*) and the inner side portion electrode (31). The fifth end (5*a*) is not connected to the outer side portion electrode (32). This aspect enables wireless communication using the monopole antenna formed by the first conductor element (4; 4A; 4C; 4D), and wireless communication using the monopole antenna formed by the second conductor element (5; 5D) to enable the improvement of the change in the antenna characteristics caused by the frequency in a case in which the coaxial cable (9) is relatively short.

A third aspect relates to the antenna device (12; 12A; 12C; 12D; 12E; 12F) according to the first aspect. In this aspect, the antenna device (12; 12A; 12C; 12D; 12E; 12F) further includes an inductor (62) located in the first mounting region (21) and connecting the second end (41*b*) and the third end (42*a*), and a circuit element (72) located in the third mounting region (23) and connecting the fifth end (5*a*) and the outer side portion electrode (32). The fifth end (5*a*) is not connected to the inner side portion electrode (31). This aspect enables wireless communication using the monopole antenna formed by the first conductor element (4; 4A; 4C; 4D), and wireless communication using the dipole antenna formed by the first conductor element (4; 4A; 4C; 4D) and the second conductor element (5; 5D) to enable the improvement of the antenna characteristics even in a case in which the coaxial cable (9) is relatively long.

A fourth aspect relates to the antenna device (10B) according to the first aspect. In this aspect, the antenna device (10B) further includes a first switching unit (63) disposed in the first mounting region (21B), and a second switching unit (73) disposed in the second mounting region (22) and the third mounting region (23). The first switching unit (63) is configured to switch between a first state in which a short circuit element (631) is connected between the second end (41*b*) and the third end (42*a*), and a second state in which an inductor (632) is connected between the second end (41*b*) and the third end (42*a*). The second switching unit (73) is configured to switch between a third state in which the fifth end (5*a*) and the inner side portion electrode (31) are connected, and a fourth state in which the fifth end (5*a*) and the outer side portion electrode (32) are connected. This aspect enables wireless communication using the monopole antenna formed by the first conductor element (4B), and wireless communication using the monopole antenna formed by the second conductor element (5; 5D) to enable the improvement of the change in the antenna characteristics caused by the frequency band in a case in which the coaxial cable (9) is relatively short. This aspect enables wireless communication using the monopole antenna formed by the first conductor element (4B), and wireless communication using the dipole antenna formed by the first conductor element (4B) and the second conductor element (5; 5D) to enable the reduction of the deterioration in the antenna characteristics even in a case in which the coaxial cable (9) is relatively long.

A fifth aspect relates to the antenna device (11, 12; 11A, 12A; 10B; 11C, 12C; 11D, 12D; 11E, 12E; 11F, 12F) according to any one of the first to fourth aspects. In this aspect, the coaxial cable (9) is used for transmitting a signal in a first frequency band and a signal in a second frequency band lower than the first frequency band. The electrical length between the first end (41*a*) and the second end (41*b*) of the first conductor portion (41; 41A) corresponds to a quarter of a wavelength corresponding to the first frequency band. A total of the electrical length between the first end (41*a*) and the second end (41*b*) of the first conductor portion (41; 41A) and an electrical length between the third end (42*a*) and the fourth end (42*b*) of the second conductor portion (42; 42B; 42C; 42D) corresponds to a quarter of a wavelength corresponding to the second frequency band. This aspect enables the improvement of the change in the antenna characteristics caused by the change in the external environment.

A sixth aspect relates to the antenna device (11A, 12A; 11D, 12D; 11E, 12E; 11F, 12F) according to any one of the first to fifth aspects. In this aspect, the antenna device (11A, 12A; 11D, 12D; 11E, 12E; 11F, 12F) further includes a frequency adjusting element (43) connected to the first conductor portion (41A). The frequency adjusting element (43) includes one or more inductors or one or more capacitors. This aspect enables the improvement of the antenna efficiency in wireless communication using the first conductor portion (41A).

A seventh aspect relates to the antenna device (11, 12; 11A, 12A; 10B; 11C, 12C; 11D, 12D; 11E, 12E; 11F, 12F) according to the second aspect. In this aspect, the circuit element (71) includes one or more inductors or one or more capacitors. This aspect enables the improvement of the antenna efficiency in wireless communication using the second conductor element (5; 5D).

An eighth aspect relates to the antenna device (11C, 12C) according to any one of the first to seventh aspects. In this aspect, the first conductor portion (41; 41A) and the second conductor portion (42C) have a linear shape and are aligned with each other. The second conductor element (5) has a linear shape. This aspect enables the improvement of the antenna efficiency.

A ninth aspect relates to the antenna device (11C, 12C) according to the eighth aspect. In this aspect, the first conductor portion (41; 41A) and the second conductor element (5) extend in directions opposite to each other with respect to the connection portion (3). This aspect enables the improvement of the antenna efficiency.

A tenth aspect relates to the antenna device (11, 12; 11A, 12A; 10B; 11D, 12D; 11E, 12E; 11F, 12F) according to any one of the first to seventh aspects. In this aspect, at least one of the first conductor portion (41; 41A) and the second conductor portion (42; 42B; 42D) has a bent shape. This aspect can reduce the length of the substrate (2) as compared to the case in which both the first conductor portion and the second conductor portion have a linear shape.

An eleventh aspect relates to the antenna device (11, 12; 11A, 12A; 10B; 11D, 12D; 11E, 12E; 11F, 12F) according to any one of the first to seventh aspects. In this aspect, the second conductor portion (42; 42B; 42D) extends from the second end (41*b*) of the first conductor portion (41; 41A) in a direction intersecting the first conductor portion (41; 41A). This aspect can reduce the length of the substrate (2) as compared to a case in which both the first conductor portion and the second conductor portion are aligned.

A twelfth aspect relates to the antenna device (11D, 12D) according to any one of the first to eleventh aspects. In this aspect, the second conductor element (5D) has a bent shape. This aspect can reduce the length of the substrate (2) as compared to the case in which the second conductor element has a linear shape.

A thirteenth aspect relates to the antenna device (11, 12; 11A, 12A; 10B; 11C, 12C; 11D, 12D; 11E, 12E; 11F, 12F) according to any one of the first to twelfth aspects. In this aspect, the first conductor element (4; 4A to 4D) and the second conductor element (5; 5D) are located on the same surface (2*a*) of the substrate (2). This aspect enables the improvement of the change in the antenna characteristics caused by the change in the external environment.

A fourteenth aspect relates to the antenna device (11E, 12E) according to any one of the first to thirteenth aspects. In this aspect, the antenna device (11E, 12E) further includes a third conductor element (80) located on the substrate (2) and connected to the inner side portion electrode (31) with at least a part of the first conductor portion (41; 41A) interposed therebetween, and a fourth conductor element (81) located on the substrate (2) and connected to the outer side portion electrode (32). An electrical length defined by the third conductor element (80) and a portion of the first conductor portion (41; 41A) between the third conductor element (83) and the inner side portion electrode (31) is equal to an electrical length of the fourth conductor element, but different from both a total of the electrical length between the first end (41*a*) and the second end (41*b*) of the first conductor portion (41; 41A) and an electrical length between the third end (42*a*) and the fourth end (42*b*) of the second conductor portion (42; 42B; 42C; 42D), and the electrical length between the fifth end (5*a*) and the sixth end (5*b*) of the second conductor element (5; 5D). This aspect enables wireless communication by the dipole antenna formed by the third conductor element (80) and the fourth conductor element (81).

A fifteenth aspect relates to the antenna device (11F, 12F) according to any one of the first to fourteenth aspects. In this aspect, the antenna devices (11F, 12F) further include a third conductor element (83) located on the substrate (2) and connected to the inner side portion electrode (31) with at least a part of the first conductor portion (41; 41A) interposed therebetween. An electrical length defined by the third conductor element (83) and a portion of the first conductor portion (41; 41A) between the third conductor element (83) and the inner side portion electrode (31) is different from both a total of the electrical length between the first end (41*a*) and the second end (41*b*) of the first conductor portion (41; 41A) and an electrical length between the third end (42*a*) and the fourth end (42*b*) of the second conductor portion (42; 42B; 42C; 42D), and the electrical length between the fifth end (5*a*) and the sixth end (5*b*) of the second conductor element (5; 5D). This aspect enables wireless communication with the monopole antenna formed by the third conductor element (83).

A sixteenth aspect relates to an antenna board (1; 1A; 1B; 1C; 1D; 1E; 1F) including a substrate (2), a connection portion (3) located on the substrate (2) and having an inner side portion electrode (31) and an outer side portion electrode (32) that are respectively connected to an inner side portion conductor (91) and an outer side portion conductor (92) of a coaxial cable (9), a first conductor element (4; 4A; 4C; 4D) located on the substrate (2), and a second conductor element (5; 5D) located on the substrate (2). The first conductor element (4; 4A; 4C; 4D) includes a first conductor portion (41; 41A) having a first end (41*a*) and a second end (41*b*) and connected to the inner side portion electrode (31) at the first end (41*a*), and A second conductor portion (42; 42C; 42D) having a third end (42*a*) and a fourth end (42*b*) and disposed such that a first mounting region (21; 21B) is present between the second end (41*b*) and the third end (42*a*). The second conductor element (5; 5D) has a fifth end (5*a*) and a sixth end (5*b*) and is disposed such that a second mounting region (22) is present between the fifth end (5*a*) and the inner side portion electrode (31) and a third mounting region (23) is present between the fifth end (5*a*) and the outer side portion electrode (32). An electrical length between the first end (41*a*) and the second end (41*b*) of the first conductor portion (41; 41A) is equal to an electrical length between the fifth end (5*a*) and the sixth end (5*b*) of the second conductor element (5; 5D). This aspect enables the improvement of the change in the antenna characteristics caused by the change in the external environment.

A seventeenth aspect relates to an antenna device (11; 11A; 11C; 11D; 11E; 11F) including the antenna board (1; 1A; 1C; 1D; 1E; 1F) according to the sixteenth aspect, a short circuit element (61) located in the first mounting region (21) and connecting the second end (41*b*) and the third end (42*a*), and a circuit element (71) located in the second mounting region (22) and connecting the fifth end (5*a*) and the inner side portion electrode (31). The fifth end (5*a*) is not connected to the outer side portion electrode (32). This aspect enables wireless communication using the monopole antenna formed by the first conductor element (4; 4A; 4C; 4D), and wireless communication using the monopole antenna formed by the second conductor element (5; 5D) to enable the improvement of the change in the antenna characteristics caused by the frequency in a case in which the coaxial cable (9) is relatively short.

An eighteenth aspect relates to an antenna device (12; 12A; 12C; 12D; 12E; 12F) including the antenna board (1; 1A; 1C; 1D; 1E; 1F) according to the sixteenth aspect, an inductor (62) located in the first mounting region (21) and connecting the second end (41*b*) and the third end (42*a*), and a circuit element (72) located in the third mounting region (23) and connecting the fifth end (5*a*) and the outer side portion electrode (32). The fifth end (5*a*) is not connected to the inner side portion electrode (31). This aspect enables wireless communication using the monopole antenna formed by the first conductor element (4; 4A; 4C; 4D), and wireless communication using the dipole antenna formed by the first conductor element (4; 4A; 4C; 4D) and the second conductor element (5; 5D) to enable the improvement of the antenna characteristics even in a case in which the coaxial cable (9) is relatively long.

A nineteenth aspect relates to an antenna device (10B) including the antenna board (1B) according to the sixteenth aspect, a first switching unit (63) disposed in the first mounting region (21B), and a second switching unit (73) disposed in the second mounting region (22) and the third mounting region (23). The first switching unit (63) is configured to switch between a first state in which a short circuit element (631) is connected between the second end (41*b*) and the third end (42*a*), and a second state in which an inductor (632) is connected between the second end (41*b*) and the third end (42*a*). The second switching unit (73) is configured to switch between a third state in which the fifth end (5*a*) and the inner side portion electrode (31) are connected, and a fourth state in which the fifth end (5*a*) and the outer side portion electrode (32) are connected. This aspect enables wireless communication using the monopole antenna formed by the first conductor element (4B), and wireless communication using the monopole antenna formed by the second conductor element (5; 5D) to enable the improvement of the change in the antenna characteristics caused by the frequency band in a case in which the coaxial cable (9) is relatively short. This aspect enables wireless communication using the monopole antenna formed by the first conductor element (4B), and wireless communication using the dipole antenna formed by the first conductor element (4B) and the second conductor element (5; 5D) to enable the reduction of the deterioration in the antenna characteristics even in a case in which the coaxial cable (9) is relatively long.

A twentieth aspect relates to an antenna device (11G, 12G, 13G, 14G) including a substrate (2), a connection portion (3) located on the substrate (2) and having an inner side portion electrode (31) and an outer side portion electrode (32) that are respectively connected to an inner side portion conductor (91) and an outer side portion conductor (92) of a coaxial cable (9), a first conductor element (400) located on the substrate (2), and a second conductor element (500) disposed on the substrate (2) to face the first conductor element (400). The first conductor element (400) includes a first conductor portion (410) having a first end (410*a*) facing the second conductor element (500) and a second end (410*b*) on an opposite side to the second conductor element (500) with respect to the first end (410*a*), and connected to the inner side portion electrode (31) at the first end (410*a*), and a second conductor portion (420) having a third end (420*a*) facing the second end (410*b*), a fourth end (420*b*) facing the third end (420*a*), and a fifth end (420*c*) and a sixth end (420*d*) that are respective ends in a direction along the second end (410*b*), and disposed such that a first mounting region (201) is present between the second end (410*b*) and the second conductor portion (420) and a second mounting region (202) is present on a side of the sixth end (420*d*) with respect to the first mounting region (201). The second conductor element (500) includes a third conductor portion (510) having a seventh end (510*a*) facing the first conductor element (400) and an eighth end (510*b*) on an opposite side to the first conductor element (400) with respect to the seventh end (510*a*), and disposed such that a third mounting region (203) is present between the seventh end (510_a_) and the outer side portion electrode (32), and a fourth conductor portion (520) having a ninth end (520_a_) facing the eighth end (510_b_), a tenth end (520_b_) facing the ninth end (520_a_), and an eleventh end (520_c_) and a twelfth end (520_d_) that are respective ends in a direction along the eighth end (510_b_), and disposed such that a fourth mounting region (204) is present between the eighth end (510_b_) and the fourth conductor portion (520) and a fifth mounting region (205) is present on a side of the twelfth end with respect to the fourth mounting region (204). An electrical length of a first path (P1) connecting the inner side portion electrode (31), the first mounting region (201), and the sixth end (420_d_) is equal to an electrical length of a second path (P2) connecting the third mounting region (203), the fourth mounting region (204), and the twelfth end (520_d_). An electrical length of a third path (P3) connecting the inner side portion electrode (32), the second mounting region (202), and the fourth end (420_b_) is equal to an electrical length of a fourth path (P4) connecting the third mounting region (203), the fifth mounting region (205), and the tenth end (520_b_). This aspect enables the improvement of the change in the antenna characteristics caused by the change in the external environment.

In a twenty-first aspect, according to the twentieth aspect, the first mounting region (201) and the fourth mounting region (204) are located on opposite sides with respect to a straight line (Lc) connecting a center (C1) of the first conductor portion (410) and a center (C3) of the third conductor portion (510). This aspect enables the improvement of the antenna efficiency.

A twenty-second aspect relates to the antenna device (11G, 12G, 13G, 14G) according to the twentieth or twenty-first aspect, further including a third conductor element (800) disposed on the substrate (2) such that a sixth mounting region (206_a_, 206_b_) is present between at least one of the first conductor portion (410) or the third conductor portion (510) and the third conductor element (800). This aspect enables the improvement of the change in the antenna characteristics caused by the change in the external environment.

In a twenty-third aspect, according to the twenty-second aspect, the third conductor element (800) is disposed such that the sixth mounting regions (206_a_, 206_b_) are respectively present between the first conductor portion (410) and the third conductor element (800) and between the third conductor portion (510) and the third conductor element (800). This aspect enables the improvement of the change in the antenna characteristics caused by the change in the external environment.

In a twenty-fourth aspect, according to the twenty-second or twenty-third aspect, a fifth path (P5) connecting the inner side portion electrode (31), the third conductor element (800), the fifth mounting region (205), and the tenth end (520_b_), and the third path (P3) include a common resonant frequency band. A sixth path (P6) connecting the inner side portion electrode (31), the third conductor element (800), the fourth mounting region (204), and the twelfth end (520_d_), and the first path (P1) include a common resonant frequency band. This aspect enables the improvement of the change in the antenna characteristics caused by the change in the external environment.

A twenty-fifth aspect relates to an antenna board (1G) including a substrate (2), a connection portion (3) located on the substrate (2) and having an inner side portion electrode (31) and an outer side portion electrode (32) that are respectively connected to an inner side portion conductor (91) and an outer side portion conductor (92) of a coaxial cable (9), a first conductor element (400) located on the substrate (2), and a second conductor element (500) disposed on the substrate (2) to face the first conductor element (400). The first conductor element (400) includes a first conductor portion (410) having a first end (410_a_) facing the second conductor element (500) and a second end (410_b_) on an opposite side to the second conductor element (500) with respect to the first end (410_a_), and connected to the inner side portion electrode (31) at the first end (410_a_), and a second conductor portion (420) having a third end (420_a_) facing the second end (410_b_), a fourth end (420_b_) facing the third end (420_a_), and a fifth end (420_c_) and a sixth end (420_d_) that are respective ends in a direction along the second end (410_b_), and disposed such that a first mounting region (201) is present between the second end (410_b_) and the second conductor portion (420) and a second mounting region (202) is present on a side of the sixth end (420_d_) with respect to the first mounting region (201). The second conductor element (500) includes a third conductor portion (510) having a seventh end (510_a_) facing the first conductor element (400) and an eighth end (510_b_) on an opposite side to the first conductor element (400) with respect to the seventh end (510_a_), and disposed such that a third mounting region (203) is present between the seventh end (510_a_) and the outer side portion electrode (32), and a fourth conductor portion (520) having a ninth end (520_a_) facing the eighth end (510_b_), a tenth end (520_b_) facing the ninth end (520_a_), and an eleventh end (520_c_) and a twelfth end (520_d_) that are respective ends in a direction along the eighth end (510_b_), and disposed such that a fourth mounting region (204) is present between the eighth end (510_b_) and the fourth conductor portion (520) and a fifth mounting region (205) is present on a side of the twelfth end with respect to the fourth mounting region (204). An electrical length of a first path (P1) connecting the inner side portion electrode (31), the first mounting region (201), and the sixth end (420_d_) is equal to an electrical length of a second path (P2) connecting the third mounting region (203), the fourth mounting region (204), and the twelfth end (520_d_). An electrical length of a third path (P3) connecting the inner side portion electrode (32), the second mounting region (202), and the fourth end (420_b_) is equal to an electrical length of a fourth path (P4) connecting the third mounting region (203), the fifth mounting region (205), and the tenth end (520_b_). This aspect enables the improvement of the change in the antenna characteristics caused by the change in the external environment.

A twenty-sixth aspect relates to an antenna device (11G) including the antenna board (1G) according to the twenty-fifth aspect, an inductor (911) located in the first mounting region (201) and connecting the second end (410_b_) and the third end (420_a_), a capacitor (912) located in the second mounting region (202) and connecting the second end (410_b_) and the third end (420_a_), a short circuit element (913) located in the third mounting region (203) and connecting the seventh end (510_a_) and the outer side portion electrode (32), and a capacitor (915) located in the fifth mounting region (205) and connecting the eighth end (510_b_) and the ninth end (520_a_). In the fourth mounting region (204), the ninth end (520_a_) is not connected to the eighth end (510_b_). This aspect enables wireless communication using the monopole antenna defined by the first path (P1), and wireless communication using the dipole antenna defined by the third path (P3) and the fourth path (P4) to enable the improvement of the change in the antenna characteristics caused by the change in the external environment.

A twenty-seventh aspect relates to an antenna device (12G) including the antenna board (1G) according to the twenty-fifth aspect. The antenna board (1G) further includes a third conductor element (800) disposed on the substrate (2) such that a sixth mounting region (206) is present between at least one of the first conductor portion (410) or the third conductor portion (510) and the third conductor element (800). The antenna device (13G) further includes an inductor (911) located in the first mounting region (201) and connecting the second end (410*b*) and the third end (420*a*), a capacitor (915) located in the fifth mounting region (205) and connecting the eighth end (510*b*) and the ninth end (520*a*), and a circuit element (916*a*, 916*b*) located in the sixth mounting region (206*a*, 206*b*) and connecting the first conductor portion (410) and the third conductor portion (510) with the third conductor element (800) interposed therebetween. In the second mounting region (202), the third end (420*a*) is not connected to the second end (410*b*). In the third mounting region (203), the seventh end (510*a*) is not connected to the outer side portion electrode (32). In the fourth mounting region (204), the ninth end (520*a*) is not connected to the eighth end (510*b*). This aspect enables wireless communication using the monopole antenna defined by the first path (P1), and wireless communication using the monopole antenna defined by the fifth path (P5) to enable the improvement of the change in the antenna characteristics caused by the change in the external environment.

A twenty-eighth aspect relates to an antenna device (13G) including the antenna board (1G) according to the twenty-fifth aspect. The antenna board (1G) further includes a third conductor element (800) disposed on the substrate (2) such that a sixth mounting region (206) is present between at least one of the first conductor portion (410) or the third conductor portion (510) and the third conductor element (800). The antenna device (13G) further includes a capacitor (912) located in the second mounting region (202) and connecting the second end (410*b*) and the third end (420*a*), an inductor (914) located in the fourth mounting region (204) and connecting the eighth end (510*b*) and the ninth end (520*a*), and a circuit element (916*a*, 916*b*) located in the sixth mounting region (206*a*, 206*b*) and connecting the first conductor portion (410) and the third conductor portion (510) with the third conductor element (800) interposed therebetween. In the first mounting region (201), the third end (420*a*) is not connected to the second end (410*b*). In the third mounting region (203), the seventh end (510*a*) is not connected to the outer side portion electrode (32). In the fifth mounting region (205), the ninth end (520*a*) is not connected to the eighth end (510*b*). This aspect enables wireless communication using the monopole antenna defined by the third path (P3), and wireless communication using the monopole antenna defined by the sixth path (P6) to enable the improvement of the change in the antenna characteristics caused by the change in the external environment.

A twenty-ninth aspect relates to an antenna device (14G) including the antenna board (1G) according to the twenty-fifth aspect, an inductor (911) located in the first mounting region (201) and connecting the second end (410*b*) and the third end (420*a*), a capacitor (912) located in the second mounting region (202) and connecting the second end (410*b*) and the third end (420*a*), a short circuit element (913) located in the third mounting region (203) and connecting the seventh end (510*a*) and the outer side portion electrode (32), an inductor (914) located in the fourth mounting region (204) and connecting the eighth end (510*b*) and the ninth end (520*a*), and a capacitor (915) located in the fifth mounting region (205) and connecting the eighth end (510*b*) and the ninth end (520*a*). This aspect enables wireless communication using the dipole antenna formed by the first path (P1) and the second path (P2), and wireless communication using the dipole antenna formed by the third path (P3) and the fourth path (P4) to enable the improvement of the change in the antenna characteristics caused by the change in the external environment.

The second to fifteenth, twenty-first to twenty-fourth, and twenty-sixth to twenty-ninth aspects are optional elements. The fifth to fifteenth aspects can be combined with the sixteenth to nineteenth aspects as appropriate.

The present disclosure can be applied to an antenna device. Specifically, the present disclosure can be applied to an antenna device for wireless communication in a plurality of frequency bands.

What is claimed is:

1. An antenna device comprising:

a substrate;

a connection portion located on the substrate and having an inner side portion electrode and an outer side portion electrode that are respectively connected to an inner side portion conductor and an outer side portion conductor of a coaxial cable;

a first conductor element located on the substrate; and a second conductor element disposed on the substrate to face the first conductor element, wherein the first conductor element comprises:

a first conductor portion having a first end facing the second conductor element and a second end on an opposite side to the second conductor element with respect to the first end, the first conductor portion being connected to the inner side portion electrode at the first end, and a second conductor portion having a third end facing the second end, a fourth end facing the third end, and a fifth end and a sixth end that are respective ends in a direction along the second end, the second conductor portion being disposed such that a first mounting region is present between a first portion on a side of the fifth end and the second end, and such that a second mounting region is present between a second portion between the first portion and the sixth end and the second end, wherein the second conductor element comprises:

a third conductor portion having a seventh end facing the first conductor element and an eighth end on an opposite side to the first conductor element with respect to the seventh end, the third conductor portion being disposed such that a third mounting region is present between the seventh end and the outer side portion electrode, and a fourth conductor portion having a ninth end facing the eighth end, a tenth end facing the ninth end, and an eleventh end and a twelfth end that are respective ends in a direction along the eighth end, the fourth conductor portion being disposed such that a fourth mounting region is present between a third portion on a side of the eleventh end and the eighth end, and such that a fifth mounting region is present between a fourth portion between the third portion and the twelfth end and the eighth end, wherein an electrical length of a first path connecting the inner side portion electrode, the first mounting region, and the sixth end is equal to an electrical length of a second path connecting the third mounting region, the fourth mounting region, and the twelfth end, and wherein an electrical length of a third path connecting the inner side portion electrode, the second mounting region, and the fourth end is equal to an electrical length of a fourth path connecting the third mounting region, the fifth mounting region, and the tenth end.

2. The antenna device according to claim 1, wherein the first mounting region and the fourth mounting region are located on opposite sides with respect to a straight line connecting a center of the first conductor portion and a center of the third conductor portion.

3. The antenna device according to claim 1, further comprising:

a third conductor element disposed on the substrate such that a sixth mounting region is present between at least one of the first conductor portion or the third conductor portion and the third conductor element.

4. The antenna device according to claim 3, wherein the third conductor element is disposed such that the sixth mounting region is present between the first conductor portion and the third conductor element and the sixth mounting region is present between the third conductor portion and the third conductor element.

5. The antenna device according to claim 3, wherein a fifth path connecting the inner side portion electrode, the third conductor element, the fifth mounting region, and the tenth end, and the third path have a first common resonant frequency band, and a sixth path connecting the inner side portion electrode, the third conductor element, the fourth mounting region, and the twelfth end, and the first path have a second common resonant frequency band.

* * * * *